United States Patent
Takagi et al.

(10) Patent No.: US 8,296,801 B2
(45) Date of Patent: Oct. 23, 2012

(54) ASSET MANAGEMENT SYSTEM AND ASSET MANAGEMENT METHOD

(75) Inventors: Satoshi Takagi, Tokyo (JP); Noboru Yanagita, Kanagawa (JP); Keiko Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1845 days.

(21) Appl. No.: 10/009,152

(22) PCT Filed: Apr. 10, 2001

(86) PCT No.: PCT/JP01/03100
§ 371 (c)(1), (2), (4) Date: May 7, 2002

(87) PCT Pub. No.: WO01/78385
PCT Pub. Date: Oct. 18, 2001

(65) Prior Publication Data
US 2003/0085997 A1    May 8, 2003

(30) Foreign Application Priority Data

| Apr. 10, 2000 | (JP) | P2000-113279 |
| Apr. 10, 2000 | (JP) | P2000-113281 |
| Apr. 10, 2000 | (JP) | P2000-145726 |
| Apr. 10, 2000 | (JP) | P2000-145728 |
| Apr. 10, 2000 | (JP) | P2000-145729 |
| Apr. 10, 2000 | (JP) | P2000-145731 |
| Apr. 10, 2000 | (JP) | P2000-145732 |
| Apr. 10, 2000 | (JP) | P2000-145734 |
| Apr. 10, 2000 | (JP) | P2000-145735 |

(51) Int. Cl.
*H04N 5/445* (2011.01)

(52) U.S. Cl. ............ 725/44; 725/45; 725/47; 348/143; 348/153; 348/156; 348/159

(58) Field of Classification Search .............. 725/44, 725/45, 47; 348/143, 153, 156, 159
See application file for complete search history.

(56) References Cited

U.S. PATENT DOCUMENTS 5,717,925 A * 2/1998 Harper et al. .............. 707/102
(Continued)

FOREIGN PATENT DOCUMENTS

JP          6 149905          5/1994
(Continued)

OTHER PUBLICATIONS

Ebu—SMPTE: "Task Force for Harmonized Standards for the Exchange of Program Material as Bit Streams" EBU UER—SMPTE First Report, 'Online! Apr. 30, 1997, XP002331907 Retrieved from the Internet: URL:http://www.ebu.ch/trev_277-contents.html> 'retrieved on Jun. 14, 2005!.

(Continued)

*Primary Examiner* — Pankaj Kumar
*Assistant Examiner* — Sahar Baig
(74) *Attorney, Agent, or Firm* — Frommer Lawrence & Haug LLP; William S. Frommer; Thomas F. Presson

(57) ABSTRACT

A program preparation and distribution system, in which metadata indicating variable information is generated from project to project, from medium to medium, from scene to scene or from frame to frame, to realize an asset management by controlling an archive system depending on the metadata. A database is constructed in which the archive system manages metadata in a concentrated fashion along with the essence such as video and audio data. By a distributed program editing system, the metadata inputted at the planning processing and at the casting processing is registered in the database managed in a concentrated fashion by an archival manager, at the same time as a tag specifying the registered metadata is issued. This tag is co-packed with the video and audio information obtained on acquisition by an acquisition system. In a production system, the timing to flow the staff roll is specified during the off-line processing in the production system.

32 Claims, 67 Drawing Sheets

U.S. PATENT DOCUMENTS

| | | | |
|---|---|---|---|
| 6,055,543 A * | 4/2000 | Christensen et al. | 707/104.1 |
| 6,061,688 A * | 5/2000 | Kilpatrick et al. | 707/102 |
| 6,199,081 B1 * | 3/2001 | Meyerzon et al. | 715/210 |
| 6,263,313 B1 * | 7/2001 | Milsted et al. | 705/1 |
| 6,311,194 B1 * | 10/2001 | Sheth et al. | 715/236 |
| 6,398,245 B1 * | 6/2002 | Gruse et al. | 280/228 |
| 6,505,160 B1 * | 1/2003 | Levy et al. | 704/270 |
| 6,686,970 B1 * | 2/2004 | Windle | 348/584 |
| 6,782,394 B1 * | 8/2004 | Landeck et al. | 1/1 |
| 2001/0042043 A1 * | 11/2001 | Shear et al. | 705/51 |
| 2002/0035728 A1 * | 3/2002 | Fries | 725/68 |
| 2002/0059604 A1 * | 5/2002 | Papagan et al. | 725/51 |
| 2002/0069132 A1 * | 6/2002 | Perkes et al. | 705/26 |
| 2002/0082922 A1 * | 6/2002 | Van Zoest et al. | 705/14 |
| 2005/0210101 A1 * | 9/2005 | Janik | 709/203 |

FOREIGN PATENT DOCUMENTS

| | | |
|---|---|---|
| JP | 6 208780 | 7/1994 |
| JP | 9 161464 | 6/1997 |
| JP | 9 312825 | 12/1997 |
| JP | 10 187182 | 7/1998 |
| JP | 10 285501 | 10/1998 |
| JP | 10 290429 | 10/1998 |
| JP | 11 205725 | 7/1999 |
| JP | 11 205736 | 7/1999 |
| JP | 11 262030 | 9/1999 |
| JP | 11 275459 | 10/1999 |
| JP | 2000 4272 | 1/2000 |
| JP | 2000 99010 | 4/2000 |
| JP | 2000-224257 | 8/2000 |
| JP | 2001-502461 | 2/2001 |
| JP | 2001-75846 | 3/2001 |
| WO | WO 99 05821 | 2/1999 |
| WO | WO 99 66722 | 12/1999 |
| WO | WO 00 02112 | 1/2000 |

OTHER PUBLICATIONS

O. Morgan, Avid Technology: "Wrappers and Metadata" EBU/SMPTE Task Force Final Report, 'Omline! Nov. 30, 1998, XP002331908 Retrieved from the Internet: URL:http://www/ebu.ch/trev_277-morgan.pdf> 'retrieved on Jun. 14, 2005!.

Brasd Gilmer, Executive Director—AAF Association: "Packaging and file Interchange" Advances Authoring Format Publications—Committee on Digital Cinema Technology—SMPTE, 'Online! Aug. 31, 2000, XP002331909 Retrieved from the Internet: URL:http://www.aafassociation.org/html/techinfo/DC28PresentationAug00V3.ppt> 'retrieved on Jun. 14, 2005!.

New application—expected image storage system, Institute of Image Information and Television Engineers magazine, Japan, Oct. 20, 1998 published, vol. 52 No. 10, 1399-1401.

* cited by examiner

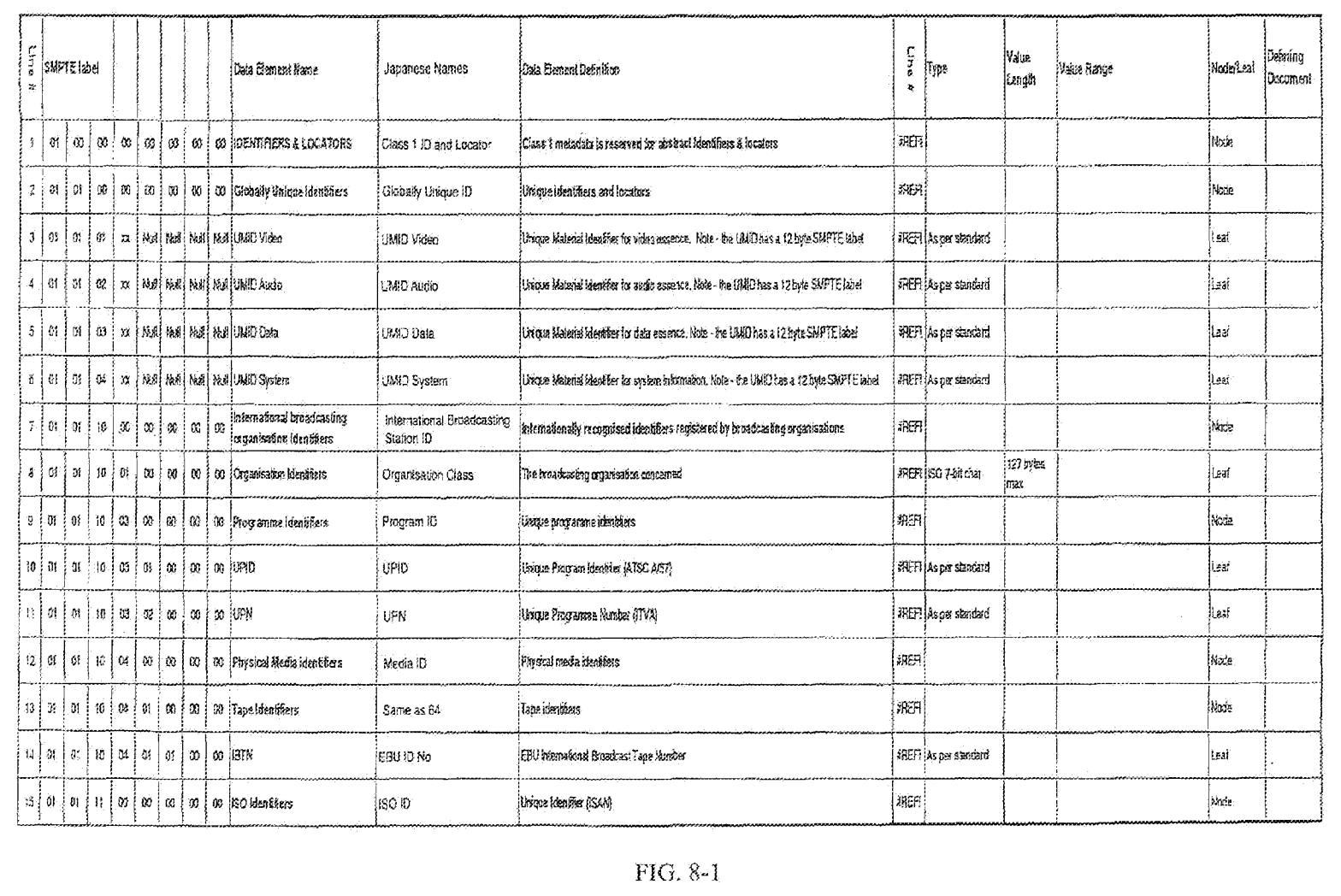

| Line # | SMPTE label | | | | | | Data Element Name | Japanese Names | Data Element Definition | Type | Value Length | Value Range | Node/Leaf | Defining Document |
|---|---|---|---|---|---|---|---|---|---|---|---|---|---|---|
| 1 | 01 | 01 | 01 | 01 | 00 | 00 | IDENTIFIERS & LOCATORS | Class 1 ID and Locator | Class 1 metadata is reserved for abstract Identifiers & locators | #REF! | | | Node | |
| 2 | 01 | 01 | 01 | 02 | 00 | 00 | Globally Unique Identifiers | Globally Unique ID | Unique identifiers and locators | #REF! | | | Node | |
| 3 | 01 | 01 | 01 | 03 | 01 | 00 | UMID Video | UMID Video | Unique Material Identifier for video sequence. Note - the UMID has a 12 byte SMPTE label | #REF! As per standard | | | Leaf | |
| 4 | 01 | 01 | 01 | 03 | 02 | 00 | UMID Audio | UMID Audio | Unique Material Identifier for audio essence. Note - the UMID has a 12 byte SMPTE label | #REF! As per standard | | | Leaf | |
| 5 | 01 | 01 | 01 | 03 | 03 | 00 | UMID Data | UMID Data | Unique Material Identifier for data essence. Note - the UMID has a 12 byte SMPTE label | #REF! As per standard | | | Leaf | |
| 6 | 01 | 01 | 01 | 03 | 04 | 00 | UMID System | UMID System | Unique Material Identifier for system information. Note - the UMID has a 12 byte SMPTE label | #REF! As per standard | | | Leaf | |
| 7 | 01 | 01 | 01 | 04 | 00 | 00 | International broadcasting organisation Identifiers | International Broadcasting Station ID | Internationally recognised identifiers registered by broadcasting organisations | #REF! | | | Node | |
| 8 | 01 | 01 | 01 | 04 | 01 | 00 | Organisation Identifiers | Organisation Class | The broadcasting organisation concerned | #REF! ISO 7-bit char | 127 bytes max | | Leaf | |
| 9 | 01 | 01 | 01 | 05 | 00 | 00 | Programme Identifiers | Program ID | Unique programme identifiers | #REF! | | | Node | |
| 10 | 01 | 01 | 01 | 05 | 01 | 00 | UPID | UPID | Unique Program Identifier (ATSC, AAF) | #REF! As per standard | | | Leaf | |
| 11 | 01 | 01 | 01 | 05 | 02 | 00 | UPN | UPN | Unique Programme Number (TVA) | #REF! As per standard | | | Leaf | |
| 12 | 01 | 01 | 01 | 06 | 00 | 00 | Physical Media Identifiers | Media ID | Physical media identifiers | #REF! | | | Node | |
| 13 | 01 | 01 | 01 | 06 | 01 | 00 | Tape Identifiers | Same as 64 | Tape identifiers | #REF! | | | Node | |
| 14 | 01 | 01 | 01 | 06 | 02 | 00 | IBTN | EBU ID No | EBU International Broadcast Tape Number | #REF! As per standard | | | Leaf | |
| 15 | 01 | 01 | 01 | 07 | 00 | 00 | ISO Identifiers | ISO ID | Unique Identifier (ISAN) | #REF! | | | Node | |

FIG. 8-1

| | | | | | | | | |
|---|---|---|---|---|---|---|---|---|
| 16 | 01 | 00 | 00 | 01 | 00 | ISAN | ISO Audio Visual No | ISO Audio-Visual Number | #REF! | As per standard | Leaf |
| 17 | 01 | 00 | 00 | 02 | 00 | ISBN | ISO Book No | ISO Book Number | #REF! | As per standard | Leaf |
| 18 | 01 | 00 | 00 | 03 | 00 | ISSN | ISO Serial No | ISO Serial Number | #REF! | As per standard | Leaf |
| 19 | 01 | 00 | 00 | 04 | 00 | ISWC | ISO Musical Work Record | ISO Musical Work Code | #REF! | As per standard | Leaf |
| 20 | 01 | 00 | 00 | 05 | 00 | ISMN | ISO Printed Music No | ISO Printed Music Number | #REF! | As per standard | Leaf |
| 21 | 01 | 00 | 00 | 06 | 00 | ISCI | ISO Commercial No | ISO Commercial Identifier | #REF! | As per standard | Leaf |
| 22 | 01 | 00 | 00 | 07 | 00 | ISRC | ISO Recording Code | ISO Recording Code | #REF! | As per standard | Leaf |
| 23 | 01 | 00 | 00 | 08 | 00 | ISRN | ISO Report No | ISO Report Number | #REF! | As per standard | Leaf |
| 24 | 01 | 00 | 00 | 09 | 00 | ISBD | ISO Term Synopsis | ISO Bibliographic Descriptor | #REF! | As per standard | Leaf |
| 25 | 01 | 00 | 00 | 10 | 00 | ISTC | ISO Textual Work Code | ISO Textual Work Code | #REF! | As per standard | Leaf |
| 26 | 01 | 00 | 00 | 11 | 00 | DOI | Digital Object No | Digital Object Handler | #REF! | As per standard | Leaf |
| 27 | 01 | 00 | 00 | 12 | 00 | Compound IDs | Compound ID | Compound Identifiers | #REF! | | Node |
| 28 | 01 | 00 | 00 | 13 | 00 | SICI | Serial Item and Contribution ID | Serial Item and Contribution Identifier | #REF! | As per standard | Leaf |
| 29 | 01 | 00 | 00 | 14 | 00 | BICI | Book Item and Component ID | Book Item and Component Identifier | #REF! | As per standard | Leaf |
| 30 | 01 | 00 | 00 | 15 | 00 | AICI | Audio-Visual Item and Component ID | Audio-Visual Item and Component Identifier | #REF! | As per standard | Leaf |
| 31 | 01 | 00 | 00 | 16 | 00 | PII | Publisher ID | Publisher Item Identifier | #REF! | As per standard | Leaf |
| 32 | 01 | 00 | 00 | 17 | 00 | Object Identifiers | Same as 96 | Object Identifiers | #REF! | | Note |
| 33 | 01 | 00 | 00 | 18 | 00 | IGUID | Internet Globally Unique ID | The Internet Engineering Task Force ID by a Globally Unique Identifier | #REF! | As per standard | Leaf |

FIG. 8-2

| Line # | SMPTE Label | | | | | | | Data Element Name | Japanese Name | Data Element Definition | Line # Type | Type | Value Length | Value Range | Node/Leaf | Defining Document |
|---|---|---|---|---|---|---|---|---|---|---|---|---|---|---|---|---|
| 34 | 01 | 01 | 02 | 15 | 00 | 00 | 00 | GUID and SMPTE label identifiers | SMPTE Label | Identifier containing SMPTE label or 16 byte GUID | #REF! | | | | Node | |
| 35 | 01 | 01 | 02 | 15 | 01 | 00 | 00 | MobiID | ID of Metadata Object | Identifies the Metadata Object with a SMPTE label or GUID | #REF! | AUID | 16 bytes | | Leaf | 9V25.52 |
| 36 | 01 | 01 | 02 | 15 | 02 | 00 | 00 | Definition object identifiers | Details of Object ID | | #REF! | | | | Node | |
| 37 | 01 | 01 | 02 | 15 | 02 | 01 | 00 | DefinitionObject_Identification | Details of Object ID | Defines SMPTE label or GUID for definition object | #REF! | AUID | 16 bytes | | Leaf | 9V25.52 |
| 38 | 01 | 01 | 02 | 15 | 02 | 02 | 00 | GenerationAUID | Version Display of Container | Defines an identifier association with version of container | #REF! | AUID | 16 bytes | | Leaf | 9V25.52 |
| 39 | 01 | 01 | 02 | 17 | 00 | 00 | 00 | CNRI Handles | CNRI | Corporation for National Research Initiatives (CNRI) identifier(s) | #REF! | | | | Node | |
| 40 | 01 | 01 | 02 | 18 | 00 | 00 | 00 | Device Identifiers | Device ID | Unique identifiers for any device used in programme production - cameras, microphones, editing, colour grading etc. | #REF! | | | | Node | |
| 41 | 01 | 01 | 02 | 18 | 01 | 00 | 00 | Device Designation | Device Designation | Identifies the "home name" of the device used in capturing or generating the essence | #REF! | ISO 7-bit char string | 32 chars max | | Leaf | |
| 42 | 01 | 01 | 02 | 18 | 02 | 00 | 00 | Device Make | Device Make | Identifies the device make used in capturing or generating the essence | #REF! | ISO 7-bit char string | 32 chars max | | Leaf | |
| 43 | 01 | 01 | 02 | 18 | 03 | 00 | 00 | Device Model | Device Model | Identifies the device model used in capturing or generating the essence | #REF! | ISO 7-bit char string | 32 chars max | | Leaf | |
| 44 | 01 | 01 | 02 | 18 | 04 | 00 | 00 | Device Serial Number | Device Serial No | Alphanumeric serial number identifying the individual device | #REF! | ISO 7-bit char string | 32 chars max | | Leaf | |
| 45 | 01 | 02 | 01 | 00 | 00 | 00 | 00 | Globally Unique Locators | Globally Unique Locator | Location identifiers | #REF! | | | | Node | |
| 46 | 01 | 02 | 01 | 01 | 00 | 00 | 00 | URL locators (and "identifiers") | Unique Resource IDs | Unique Resource IDs | #REF! | | | | Node | |
| 47 | 01 | 02 | 01 | 01 | 01 | 00 | 00 | URL | Unique Resource Locator | Unique Resource Locator | #REF! | | | | Type Node | |
| 48 | 01 | 02 | 01 | 01 | 01 | 01 | 00 | URL | Unique Resource Locator | Unique Resource Locator | #REF! | ISO 7-bit char | 127 bytes max | | Leaf | |

FIG. 9-11

| | | | | | | | | | Name | Unicode URL String | Contains a Unicode URL String | | | |
|---|---|---|---|---|---|---|---|---|---|---|---|---|---|---|
| 50 | 01 | 00 | 00 | 00 | 00 | 00 | 00 | 00 | URL String | Unicode URL String | Contains a Unicode URL String | #REF | Unicode String | Variable | | B925.52 |
| 51 | 01 | 01 | 01 | 02 | 01 | 00 | 00 | 00 | PURL | Persistent URL | Persistent Universal Resource Locator | #REF | ISO 7-bit char | 127 bytes max | Leaf | |
| 52 | 01 | 01 | 01 | 02 | 01 | 00 | 00 | 00 | URN | Resource Name | Unique Resource Name | #REF | ISO 7-bit char | 127 bytes max | Leaf | |
| 52 | 01 | 01 | 01 | 02 | 01 | 00 | 00 | 00 | Media Locators | Media Locator | Locators for a digital media, data, metadata file etc | #REF | | | Node | |
| 53 | 01 | 01 | 01 | 02 | 01 | 00 | 00 | 00 | Local Identifiers | Local ID | Identifier unique to the local content | #REF | | | Node | |
| | 01 | 01 | 01 | 02 | 01 | 00 | 00 | 00 | Administrative Identifiers | Administration ID | Identifiers relating to Business and Administration | #REF | | | Node | |
| 23 | 01 | 01 | 01 | 02 | 01 | 00 | 00 | 00 | Transmission Identifier | Transmission ID | Identifier for transmission control | #REF | ISO 7-bit char string | 32 chars max | Leaf | |
| 24 | 01 | 01 | 01 | 02 | 01 | 00 | 00 | 00 | Archive Identifier | Archive ID | Identifier for archival purposes | #REF | ISO 7-bit char string | 32 chars max | Leaf | |
| 27 | 01 | 01 | 01 | 02 | 01 | 00 | 00 | 00 | Item ID | Item ID | Identifier of a content item | #REF | ISO 7-bit char string | 32 chars max | Leaf | |
| 58 | 01 | 01 | 01 | 02 | 01 | 00 | 00 | 00 | Accounting Reference | Reference No for Accounting Purposes | Reference number for accounting purposes | #REF | ISO 7-bit char string | 32 chars max | Leaf | |
| 51 | 01 | 01 | 01 | 02 | 01 | 00 | 00 | 00 | Traffic | Transmission Billing | Identifier for transmission management and/or billing | #REF | ISO 7-bit char string | 32 chars max | Leaf | |
| 60 | 01 | 01 | 01 | 02 | 01 | 00 | 00 | 00 | Physical Media Identifiers | Same as 1-3 | Organisationally given identifiers for physical media | #REF | | | Node | |
| 61 | 01 | 01 | 01 | 02 | 01 | 00 | 00 | 00 | Film codes | Film Code | Organisationally given identifiers for film | #REF | | | Node | |
| 62 | 01 | 01 | 01 | 02 | 01 | 00 | 00 | 00 | Reel/Roll number | Reel No | An organisationally given number for a film reel or roll | #REF | ISO 7-bit char | 32 chars max | Leaf | |
| 63 | 01 | 01 | 01 | 02 | 01 | 00 | 00 | 00 | Tape Identifiers | Tape ID | Organisationally given identifiers for tape | #REF | | | Node | |
| 64 | 01 | 01 | 01 | 02 | 01 | 00 | 00 | 00 | Tape number | Tape No | An organisationally given number for a tape. | #REF | ISO 7-bit char | 32 chars max | Leaf | |
| 64 | 01 | 01 | 01 | 02 | 01 | 00 | 00 | 00 | Object Identifiers | Object ID | Object identifiers | #REF | | | Node | |
| 65 | 01 | 01 | 01 | 02 | 01 | 00 | 00 | 00 | LUID | Locally Unique ID | A 4 byte locally unique ID | #REF | UInt32 | 4 bytes | Leaf | |

FIG. 9-2

| Line # | SMPTE Label | | | | | | Data Element Name | Japanese Names | Data Element Definition | Type | Value Length | Value Range | Node/Leaf | Defining Document |
|---|---|---|---|---|---|---|---|---|---|---|---|---|---|---|
| 67 | 01 | 03 | 02 | 02 | 00 | 00 | SlotID | Slot ID | Specifies an identifier local to the metadata object | aRef32 | 4 bytes | | Leaf | W25.52 |
| 68 | 01 | 03 | 03 | 03 | 00 | 00 | ObjectTextIdentifiers | Object Text ID | Identifies object by local name | aREF | | | Node | |
| 69 | 01 | 03 | 03 | 03 | 01 | 00 | Mob_Name | Mob Name | Identifies the mob by name | aREF1 | Unicode String | variable | Leaf | W25.52 |
| 70 | 01 | 03 | 03 | 03 | 02 | 00 | SlotName | Slot Name | Identifies the slot by name | aREF | Unicode String | variable | Leaf | |
| 71 | 01 | 03 | 03 | 03 | 03 | 00 | DefinitionObject_Name | Object Name | Specifies name of definition object | aREF1 | Unicode String | variable | Leaf | W25.52 |
| 72 | 01 | 03 | 04 | 00 | 00 | 00 | Local Locators | Local Locators | Local location information for finding metadata together | aREF1 | | | Node | |
| 73 | 01 | 03 | 04 | 01 | 00 | 00 | Local Media Locators | Local Media Locators | Locators for a digital media, data, metadata file etc | aREF1 | | | Node | |
| 74 | 01 | 03 | 04 | 01 | 01 | 00 | Local File Path | Local File Pass | The path to a digital media, data, metadata etc file | aREF1 ISO 7-bit char | 127 bytes max | | Leaf | |
| 75 | 01 | 03 | 04 | 02 | 00 | 00 | Film Locators | Film Locators | Location information for film | aREF1 | | | Node | |
| 76 | 01 | 03 | 04 | 02 | 01 | 00 | Edge Code | Edge Code | The edge code on the film, eg leadtrailer | aREF1 ISO 7-bit char | 32 chars max | | Leaf | |
| 77 | 01 | 03 | 04 | 02 | 02 | 00 | Frame Code | Frame Code | Unique frame number for film | aREF1 ISO 7-bit char | 32 chars max | | Leaf | |
| 78 | 01 | 03 | 04 | 02 | 03 | 00 | Key code | Key Code | Machine readable version of Frame Code | aREF1 Uint32 | 4 bytes | | Leaf | |
| 79 | 01 | 03 | 04 | 02 | 04 | 00 | Ink number | Ink No | Ink transfer | aREF1 ISO 7-bit char | 32 chars max | | Leaf | |
| 80 | 01 | 03 | 04 | 02 | 05 | 00 | EdgeCode_Start | Code At The Beginning of The Segment | Specifies the edge code at the beginning of the segment | Position | 8 bytes | | Leaf | W25.52 |
| 81 | 01 | 03 | 04 | 03 | 00 | 00 | Proxy Locators | Proxy Locators | Local archive location information for key frames, keeps source key text etc | aREF1 | | | Node | |

FIG. 10-1

| | | | | | | | | | |
|---|---|---|---|---|---|---|---|---|---|
| 02 | 01 | 10 | 01 | 82 | Key Text | Proxy Key Text | Local archival location information for key text | #REF! | ISO 7-bit char string | 127 bytes max | Leaf |
| 02 | 01 | 10 | 02 | 83 | Key Frame | Proxy Key Frame | Local archival location information for key frames | #REF! | ISO 7-bit char string | 127 bytes max | Leaf |
| 02 | 01 | 10 | 03 | 84 | Key Sound | Proxy Sound | Local archival location information for keys sounds | #REF! | ISO 7-bit char string | 127 bytes max | Leaf |
| 02 | 01 | 10 | 04 | 85 | Key data or program | Key Data | Local archival location information for key data or program | #REF! | ISO 7-bit char string | 127 bytes max | Leaf |
| 02 | 01 | 11 | | 86 | Free-form, human readable locator | Human Writing | Local locator as free text item | #REF! | | | Node |
| 02 | 01 | 11 | 01 | 87 | TextLocator_Name | Human Writing Name | Contains a human readable Unicode text locator | #REF! | Unicode String | variable | Leaf | W25.s2 |
| 02 | 01 | 12 | | 88 | Titles | Title | Titling metadata relating to producers | #REF! | | | Node |
| 02 | 01 | 12 | 01 | 89 | Title Kind | Title Kind | Kind of title, i.e., project, scene, item, programme, service, original, item, episode, element, scene, shot etc. | #REF! | ISO 7-bit char string | 127 bytes max | Leaf |
| 02 | 01 | 12 | 02 | 90 | Main title | Main Title | The main title | #REF! | ISO 7-bit char string | 127 bytes max | Leaf |
| 02 | 01 | 12 | 03 | 91 | Secondary title | Secondary Title | The secondary title | #REF! | ISO 7-bit char string | 127 bytes max | Leaf |
| 02 | 01 | 12 | 04 | 92 | Series number | Series No | The alphanumeric series number | #REF! | ISO 7-bit char | 32 chars max | Leaf |
| 02 | 01 | 12 | 05 | 93 | Episode Number | Episode No | The alphanumeric episode number | #REF! | ISO 7-bit char | 32 chars max | Leaf |
| 02 | 01 | 12 | 06 | 94 | Scene number | Scene No | The alphanumeric scene number | #REF! | ISO 7-bit char string | 32 chars max | Leaf |
| 02 | 01 | 12 | 07 | 95 | Take Number | Take No | Take number of the instance of the shot | #REF! | Uint16 | 2 bytes | Leaf |
| 02 | 01 | 13 | | 96 | Unique IPR Identifiers | Owner | Unique IDs allocated by IP Rights organisations | #REF! | | | Node |
| 02 | 01 | 13 | 01 | 97 | IPI (ISUS/CISAC) | Owner by CISAC | IP Identifiers allocated by CISAC | #REF! | | | Node |
| 02 | 01 | 13 | 02 | 98 | Natural Person / legal entity | Natural Person of Legal Entity ID | Natural person or legal entity IDs to the Interested Parties system | #REF! | As per standard | | Leaf |
| 02 | 01 | 13 | 03 | 99 | AGICOA/NPM | ID by AGICOA | Unique identifiers allocated by AGICOA | #REF! | | | Node |

FIG. 10-2

| SMPTE label | | | | | | | Line # | Data Element Name | Japanese Names | Data Element Definition | Line # Type | Value Length | Value Range | Node/Leaf | Defining Document |
|---|---|---|---|---|---|---|---|---|---|---|---|---|---|---|---|
| 01 | 01 | 01 | 01 | 00 | 00 | 00 | 00 | AESICOA/MPAA Identifier | | The AESICOA ID | #REF! As per standard | | | Leaf | |
| 01 | 02 | 02 | 00 | 00 | 00 | 00 | 00 | ADMINISTRATION | | Class 2 is reserved for administrative and business related metadata | #REF! | | | Node | |
| 02 | 01 | 00 | 00 | 00 | 00 | 00 | 00 | Supplier | Supplier | Details of the content supplying organisation | #REF! | | | Node | |
| 02 | 01 | 01 | 00 | 00 | 00 | 00 | 00 | Source Organization | Supplying Organisation | The name of the content supplying organization | #REF! ISO 7-bit char string | 127 bytes max | | Leaf | |
| 02 | 01 | 02 | 00 | 00 | 00 | 00 | 00 | Supply contract number | Contract ID | The alphanumeric identifier for the contract for the supply of content | #REF! ISO 7-bit char string | 32 chars max | | Leaf | |
| 02 | 01 | 03 | 00 | 00 | 00 | 00 | 00 | Original Producer Name | Original Content Producer | The name of the original content Producer | #REF! ISO 7-bit char string | 127 bytes max | | Leaf | |
| 02 | 02 | 00 | 00 | 00 | 00 | 00 | 00 | Product | Product | Abstract information about the media product | #REF! | | | Node | |
| 02 | 02 | 01 | 00 | 00 | 00 | 00 | 00 | Total number of Episodes in a Series | Total Number of Episodes | Total number of Episodes in Series | #REF! Uint16 | 2 bytes | | Leaf | |
| 02 | 03 | 00 | 00 | 00 | 00 | 00 | 00 | Rights | Rights | Rights metadata | #REF! | | | Node | |
| 02 | 03 | 01 | 00 | 00 | 00 | 00 | 00 | Copyright | Copyright | Copyright metadata | #REF! | | | Node | |
| 02 | 03 | 01 | 01 | 00 | 00 | 00 | 00 | Copyright Status | Evaluation of Copyright Status | Executive evaluation of copyright status | #REF! ISO 7-bit char string | 127 bytes max | | Leaf | |
| 02 | 03 | 01 | 02 | 00 | 00 | 00 | 00 | Copyright Owner | Copyright Owner | The name of the person/organisation who owns the copyright | #REF! ISO 7-bit char string | 127 bytes max | | Leaf | |
| 02 | 03 | 02 | 00 | 00 | 00 | 00 | 00 | Intellectual rights | Intellectual Property Rights | Intellectual property rights metadata other than copyright | #REF! | | | Node | |
| 02 | 03 | 02 | 01 | 00 | 00 | 00 | 00 | IP Type | Type of Intellectual Property Rights | A definition of what the IPs | #REF! ISO 7-bit char string | 32 bytes max | | Leaf | |
| 02 | 03 | 02 | 02 | 00 | 00 | 00 | 00 | IP Right | Definition of Intellectual Property Rights | A definition of what use can be made of an IP | #REF! ISO 7-bit char string | 32 bytes max | | Leaf | |

FIG. 11-1

| | | | | | | | |
|---|---|---|---|---|---|---|---|
| 115 | 02 | 03 | 02 | 05 | 00 | Legal personalities | Legal Representative | A person or body in whom legal responsibility can be vested | #REF! | | | Node |
| 116 | 02 | 03 | 02 | 05 | 01 | Rights Owner | Owner | A definition of who or what entity can exercise an IP right | #REF! | ISO 7-bit char string | 127 bytes max | Leaf |
| 117 | 02 | 03 | 02 | 05 | 02 | Rights Management Authority | Entity That Manages The Rights | Entity that manages the rights for access to the material | #REF! | ISO 7-bit char string | 127 bytes max | Leaf |
| 118 | 02 | 03 | 02 | 05 | 03 | Interested parties | Who or What Entity Has An Interest | A definition of who or what entity has an interest in the right being exercised | #REF! | ISO 7-bit char string | 127 bytes max | Leaf |
| 119 | 02 | 03 | 02 | 06 | 00 | IP Right options | IP Ancillary Information | A definition of what options can be exercised within the framework of using an IP Right | #REF! | | | Node |
| 120 | 02 | 03 | 02 | 06 | 01 | Maximum Number Of Usages | Maximum Number of Usages or Repeats | Maximum number of usages or repeats | #REF! | Units | 32 bytes | Leaf |
| 121 | 02 | 03 | 02 | 06 | 02 | License expires | License Options | Options for prolongation or renewal of license | #REF! | ISO 7-bit char string | 127 bytes max | Leaf |
| 122 | 02 | 03 | 02 | 07 | 00 | Financial Information | Financial Information | Details of payments, costs, income and other considerations | #REF! | | | Node |
| 123 | 02 | 03 | 02 | 07 | 01 | Currency | Currency | The currency of the transaction | #REF! | | | Type Node |
| 124 | 02 | 03 | 02 | 07 | 01 | Currency | Same as 124 | The currency of the transaction | #REF! | ISO 7-bit char | 4 chars max | Leaf |
| 125 | 02 | 03 | 02 | 07 | 02 | Payments and costing | Payments and Costing | Payments and costing information | #REF! | | | Node |
| 126 | 02 | 03 | 02 | 07 | 03 | Royalty Financial Information | Royalty Financial Information | Royalty payment and other information | #REF! | ISO 7-bit char string | 127 bytes max | Leaf |
| 127 | 02 | 03 | 02 | 07 | 04 | Income | Income Information | Income information | #REF! | | | Node |
| 128 | 02 | 03 | 02 | 07 | 05 | Royalty Financial Information | Royalty Financial Information | Royalty income and other information | #REF! | ISO 7-bit char string | 127 bytes max | Leaf |
| 129 | 02 | 03 | 02 | 08 | 00 | Permitted Access | Permitted Access | Details of permitted access to the media product | #REF! | | | Node |
| 130 | 02 | 03 | 02 | 08 | 01 | Restrictions on Use | Access Level | Identifies the types or level of restriction applied to the media product | #REF! | ISO 7-bit char string | 127 bytes max | Leaf |
| 131 | 02 | 03 | 02 | 08 | 02 | Security | Security | Content encryption/decryption information | #REF! | | | Node |
| 132 | 02 | 03 | 02 | 08 | 03 | System Access | Degree of Technical Access | Details of permitted access to the technical systems or platform | #REF! | | | Node |

FIG. 11-2

| SMPTE Label | | | | | | | Line # | Data Element Name | Japanese Names | Data Element Definition | Type | Value Length | Value Range | Model Leaf | Defining Document |
|---|---|---|---|---|---|---|---|---|---|---|---|---|---|---|---|
| 06 | 0E | 2B | 34 | 01 | 01 | 01 | 133 | Username | User Name | A username in a domain | AREF | | | Type Node | |
| 06 | 0E | 2B | 34 | 01 | 01 | 01 | 134 | Username | User Name | A username in a domain | AREF ISO 7-bit char | 16 chars max | | Leaf | |
| 06 | 0E | 2B | 34 | 01 | 01 | 01 | 135 | Password | Password | An individual password for access to the system | AREF | | | Type Node | |
| 06 | 0E | 2B | 34 | 01 | 01 | 01 | 136 | Password | Password | An individual password for access to the system | AREF ISO 7-bit char | 16 chars max | | Leaf | |
| 06 | 0E | 2B | 34 | 01 | 01 | 01 | 137 | Film | Movie Filter | Content encryption/decryption information specifically applying to the movie industry | AREF | | | Node | |
| 06 | 0E | 2B | 34 | 01 | 01 | 01 | 138 | Scrambling key kind | Scrambling Key Kind | The programme decryption key type | AREF | | | Type Node | |
| 06 | 0E | 2B | 34 | 01 | 01 | 01 | 139 | Scrambling key kind | Scrambling Key Kind | The programme decryption key type | AREF ISO 7-bit char | 64 chars max | See types dictionary | Leaf | |
| 06 | 0E | 2B | 34 | 01 | 01 | 01 | 140 | Scrambling key value | Scrambling Key Value | The programme decryption key value | AREF text | 64 bytes max | | Leaf | |
| 06 | 0E | 2B | 34 | 01 | 01 | 01 | 141 | Publication Outlet | Publication Outlet | The content publication outlet - eg Broadcast, internet etc | AREF | | | Node | |
| 06 | 0E | 2B | 34 | 01 | 01 | 01 | 142 | Broadcast | Broadcast Outlet Information | Broadcast Outlet Information | AREF | | | Node | |
| 06 | 0E | 2B | 34 | 01 | 01 | 01 | 143 | Broadcaster | Broadcast | The broadcasting organisation | AREF | | | Node | |
| 06 | 0E | 2B | 34 | 01 | 01 | 01 | 144 | Name | Name | Name of the broadcasting organisation | AREF ISO 7-bit char string | 32 bytes max | | Leaf | |
| 06 | 0E | 2B | 34 | 01 | 01 | 02 | 145 | Channel | Channel | Broadcast channel | AREF ISO 7-bit char string | 32 bytes max | | Leaf | |
| 06 | 0E | 2B | 34 | 01 | 01 | 03 | 146 | Transmission Medium | Transmission Medium | Transmission medium (e.g. satellite, cable, terrestrial, ...) | AREF ISO 7-bit char string | 32 bytes max | | Leaf | |
| 06 | 0E | 2B | 34 | 01 | 01 | 04 | 147 | Broadcast Region | Broadcast Region | Target region of broadcast | AREF ISO 7-bit char string | 32 bytes max | | Leaf | |

FIG. 12-I

| | | | | | | | Broadcast and Repeat Statistics | Broadcast and Repeat Statistics | Business statistics concerning the production | aREF! | | | Node |
|---|---|---|---|---|---|---|---|---|---|---|---|---|---|
| 148 | 02 | 20 | 00 | 00 | 00 | 00 | | | | | | | |
| 149 | 02 | 20 | 01 | 00 | 00 | 00 | First Broadcast Flag | First Use | First broadcast of the product | aREF! | Boolean | 1 byte | 80h (FALSE) or FFh (TRUE) | Leaf |
| 150 | 02 | 20 | 02 | 00 | 00 | 00 | Repeat number | Repeat Number | Information about the repeat status when not a first broadcast | aREF! | | | | Node |
| 151 | 02 | 20 | 02 | 01 | 00 | 00 | Current repeat number | Number of The Current Repeat | The number of the current repeat | aREF! | Uint16 | 2 bytes | | Leaf |
| 152 | 02 | 20 | 02 | 02 | 00 | 00 | Previous repeat number | Number of The Previous Repeat | The number of the previous repeat | aREF! | Uint16 | 2 bytes | | Leaf |
| 153 | 02 | 20 | 03 | 00 | 00 | 00 | Ratings | Ratings | Information about audience ratings and refries | aREF! | | | | Node |
| 154 | 02 | 20 | 03 | 01 | 00 | 00 | Audience rating | Audience Rating | Audience rating as number of viewers | aREF! | Uint32 | 4 bytes | | Leaf |
| 155 | 02 | 20 | 03 | 02 | 00 | 00 | Audience reach | Audience Reach | The audience reach of the production | aREF! | Uint32 | 4 bytes | | Leaf |
| 156 | 02 | 20 | 03 | 03 | 00 | 00 | Other ratings | Other Ratings | Other ratings | aREF! | Uint32 | 4 bytes | | Leaf |
| 157 | 02 | 30 | 00 | 00 | 00 | 00 | Participating parties | Participating Parties | Details of all parties, contributing to or taking part in the production - staff, contributors, and including those receiving Credits etc | aREF! | | | | Node |
| 158 | 02 | 30 | 01 | 00 | 00 | 00 | Persons (Groups and Individuals) | Representative | Details of persons contributing to or taking part in the production | aREF! | | | | Node |
| 159 | 02 | 30 | 01 | 01 | 00 | 00 | Nature of Person (Group or Individual) | Nature of Person (Group or Individual) | Group, Individual etc | aREF! | | | | Node |
| 160 | 02 | 30 | 01 | 00 | 00 | 00 | Production | Talent, Staff, etc | Details of Performing talent, Non performing talent, Production Staff, Technical staff, Specialist etc | aREF! | | | | Node |
| 161 | 02 | 30 | 01 | 01 | 00 | 00 | Contribution Status | Talent, Staff, etc | Performing talent, Non performing talent, Production Staff, Technical staff, Specialist etc | aREF! | ISO 7-bit char string | 32 bytes max | | Leaf |
| 162 | 02 | 30 | 01 | 01 | 00 | 00 | Support and Administration | Support and Administration | Details of support and administrative staff a contributors - business management, resource planning, archiving etc | aREF! | | | | Node |
| 163 | 02 | 30 | 01 | 01 | 00 | 00 | Support/Administration Staff | Support/Administration Staff | Celebrigoing staff, finance staff etc | aREF! | ISO 7-bit char string | 32 bytes max | | Leaf |
| 164 | 02 | 30 | 01 | 00 | 00 | 00 | Organisations and Public Bodies | Organisation and Public Bodies | Details of Organisations and Public Bodies contributing to or taking part in the production | aREF! | | | | Node |
| 165 | 02 | 30 | 01 | 01 | 00 | 00 | Kind of Organisation or Public Body | Kind of Organisation or Public Body | Limited company, government department etc | aREF! | ISO 7-bit char string | 32 bytes max | | Leaf |

FIG. 12-2

| Line # | SMPTE label | | | | | Data Element Name | Japanese Names | Data Element Definition | Type | Value Length | Value Range | Node/Leaf | Defining Document |
|---|---|---|---|---|---|---|---|---|---|---|---|---|---|
| 166 | 02 | 30 | 02 | 02 | 00 | Production | Production | Details of Performing contribution, Non performing contribution, Production contribution, Technical contribution, Specialism etc. | #REF! | | | Node | |
| 167 | 02 | 30 | 02 | 02 | 01 | Contribution Status | Production | eg. Film Library | #REF! | 32 bytes max | | Leaf | |
| 168 | 02 | 30 | 02 | 02 | 02 | Support and Administration | Film Library | Details of support and administrative contribution - business management, resource planning, archiving etc. | #REF! | | | Node | |
| 169 | 02 | 30 | 02 | 02 | 03 | Support/Administration Status | Support and Administration | eg. Banker | #REF! | 32 bytes max | | Leaf | |
| 170 | 02 | 30 | 02 | 03 | 00 | Job Function Information | Support/Administration Staff | Information about the job function or role of participating parties | #REF! | | | Node | |
| 171 | 02 | 30 | 02 | 03 | 01 | Job Function | Job Function Information | The function of the person(s), organisation or public body, eg. Editor, Actor | #REF! | 32 bytes max | | Leaf | |
| 172 | 02 | 30 | 02 | 03 | 02 | Role/Identity | Job Function | eg. Name of character player | #REF! | 32 bytes max | | Leaf | |
| 173 | 02 | 30 | 02 | 06 | 00 | Contact Information | Role | Contact information for the participating party | #REF! | | | Node | |
| 174 | 02 | 30 | 02 | 06 | 01 | Contact Kind | Contact Information | Client, supplier, useful etc | #REF! | 32 bytes max | | Leaf | |
| 175 | 02 | 30 | 02 | 06 | 02 | Contact Department | Contract Kind | Name information for a department within an organisation where contact can be made | #REF! | 32 bytes max | | Leaf | |
| 176 | 02 | 30 | 02 | 06 | 03 | Person or Organisation Details | Contract Department | The name of person(s), organisation or public body | #REF! | | | Node | |
| 177 | 02 | 30 | 02 | 06 | 04 | Person name | Representative | Name information for persons | #REF! | | | Node | |
| 178 | 02 | 30 | 02 | 06 | 05 | Family name | Person Name | The family name of an individual | #REF! | 32 bytes max | | Leaf | |
| 179 | 02 | 30 | 02 | 06 | 01 | First Given Name | Family Name | The first given name for an individual | #REF! | 32 bytes max | | Leaf | |
| 180 | 02 | 30 | 02 | 06 | 02 | Second Given name | First Given Name | The second given name for an individual | #REF! | 32 bytes max | | Leaf | |

FIG. 13-1

| | | | | | | | | | | |
|---|---|---|---|---|---|---|---|---|---|---|
| 02 | 03 | 05 | 30 | 01 | 00 | 00 | 00 | Third Given name | Third Given Name | The third given name for an individual | &REF| ISO 7-bit char string | 32 bytes max | | Leaf |
| 02 | 03 | 06 | 30 | 02 | 00 | 00 | 00 | Group name | Group Name | Name information for groups | &REF| | | | Node |
| 02 | 03 | 06 | 30 | 02 | 01 | 00 | 00 | Main name | Main Name | The main name by which the group is known | &REF| ISO 7-bit char string | 32 bytes max | | Leaf |
| 02 | 03 | 06 | 30 | 02 | 02 | 00 | 00 | Supplementary name | Supplementary Name | Supplementary naming information for a group | &REF| ISO 7-bit char string | 32 bytes max | | Leaf |
| 02 | 03 | 06 | 30 | 03 | 00 | 00 | 00 | Organisation name | Organisation Name | Name information for organisations | &REF| | | | Node |
| 02 | 03 | 06 | 30 | 03 | 01 | 00 | 00 | Main name | Main Name | The main name by which an organisation is known | &REF| ISO 7-bit char string | 32 bytes max | | Leaf |
| 02 | 03 | 06 | 30 | 03 | 02 | 00 | 00 | Supplementary organisation name | Supplementary Organisational Name | Supplementary naming information for an organisation | &REF| ISO 7-bit char string | 32 bytes max | | Leaf |
| 03 | 00 | 00 | 00 | 00 | 00 | 00 | 00 | INTERPRETIVE | Class 3 Interpretive | Class 3 is reserved for information on interpreting the data | &REF| | | | Node |
| 03 | 01 | 00 | 00 | 00 | 00 | 00 | 00 | Fundamental | Fundamental Information | Fundamental existing information | &REF| | | | Node |
| 03 | 01 | 01 | 00 | 00 | 00 | 00 | 00 | Countries | Countries | Defining information about Countries | &REF| | | | Node |
| 03 | 01 | 01 | 01 | 00 | 00 | 00 | 00 | ISO 3166 Country Code System | ISO 3166 Country Code | ISO country codes | &REF| ISO 7-bit char | 4 chars max | See types dictionary | Type Node |
| 03 | 01 | 01 | 01 | 01 | 00 | 00 | 00 | ISO 3166 Country Code System | ISO 3166 Country Code | ISO country codes | &REF| ISO 7-bit char | | | Leaf |
| 03 | 01 | 02 | 00 | 00 | 00 | 00 | 00 | ISO Language Code | ISO 3166 Language Code | The code that represents a language. Defines Language prefixes in an authority on domain names | &REF| | | | Type Node |
| 03 | 01 | 02 | 01 | 00 | 00 | 00 | 00 | ISO Language Code | ISO 3166 Language Code | The code that represents a language. Defines Language prefixes in an authority on domain names | &REF| ISO 7-bit char | 4 chars max | See types dictionary | Leaf |
| 03 | 01 | 03 | 00 | 00 | 00 | 00 | 00 | Data Interpretations | Interpretation Parameter | Defining information about data interpretation | &REF| | | | Node |
| 03 | 01 | 03 | 01 | 00 | 00 | 00 | 00 | Operating system Interpretations | OS Properties | Byte code for distinction of common operating systems | &REF| Unsigned byte | 1 byte | See types dictionary | Leaf |
| 03 | 02 | 00 | 00 | 00 | 00 | 00 | 00 | Fundamental Dimensions | Fundamental 4 Definition ? | Information about the four basic indefinables of natural philosophy | &REF| | | | Node |
| 03 | 02 | 01 | 00 | 00 | 00 | 00 | 00 | Length | Length | Descriptive information about length | &REF| | | | Node |

FIG. 13-2

| SMPTE label | | | | | | | | Line # | Data Element Name | Japanese Names | Data Element Definition | Type | Value Length | Value Range | Node/Leaf | Defining Document |
|---|---|---|---|---|---|---|---|---|---|---|---|---|---|---|---|---|
| | | | | | | | | 199 | | | | | | | | |
| 03 | 01 | 01 | 01 | 01 | 00 | 00 | 00 | 300 | Length System | Length System | Metric, Imperial etc | #REF! | | | Type Node | |
| 03 | 01 | 01 | 01 | 01 | 01 | 00 | 00 | 301 | Length System | Length System | Metric, Imperial etc | #REF! ISO 7-bit char | 4 chars max | See Types dictionary | Leaf | |
| 03 | 01 | 01 | 01 | 02 | 00 | 00 | 00 | 201 | Length Units | Length Units | Units of measurements of length and distance (feet, metres etc) | #REF! | | | Type Node | |
| 03 | 01 | 01 | 01 | 02 | 01 | 00 | 00 | 202 | Length Units | Length Units | Units of measurements of length and distance (feet, metres etc) | #REF! ISO 7-bit char | 4 chars max | See Types dictionary | Leaf | |
| 03 | 01 | 01 | 02 | 00 | 00 | 00 | 00 | 203 | Time | Time | Descriptive information about Time | #REF! | | | Node | |
| 03 | 01 | 01 | 02 | 01 | 00 | 00 | 00 | 204 | Time systems | Time System | eg. GMT, UPT | #REF! | | | Type Node | |
| 03 | 01 | 01 | 02 | 01 | 01 | 00 | 00 | 205 | Time system | Time System | eg. GMT, UPT | #REF! ISO 7-bit char | 6 chars max | UTC:CCYY (ATC 2 offset including ±12 hour) | Leaf | |
| 03 | 01 | 01 | 02 | 02 | 00 | 00 | 00 | 206 | Time Units | Time Units | Frames, seconds, minutes etc | #REF! | | | Type Node | |
| 03 | 01 | 01 | 02 | 02 | 01 | 00 | 00 | 207 | Time Units | Time Units | Frames, seconds, minutes etc | #REF! ISO 7-bit char | 4 chars max | See Types dictionary | Leaf | |
| 03 | 01 | 02 | 00 | 00 | 00 | 00 | 00 | 208 | Mass | Mass | Descriptive information about Mass | #REF! | | | Node | |
| 03 | 01 | 03 | 00 | 00 | 00 | 00 | 00 | 209 | Energy | Energy | Descriptive information about Energy | #REF! | | | Node | |
| 03 | 02 | 00 | 00 | 00 | 00 | 00 | 00 | 210 | Descriptive - Human Assigned | Human Assigned ? | Descriptors (Human Assigned) relating to analyses of the content | #REF! | | | Node | |
| 03 | 02 | 01 | 00 | 00 | 00 | 00 | 00 | 211 | Categorisation | Categorisation | Analytical categorisation of the content | #REF! | | | Node | |
| 03 | 02 | 02 | 00 | 00 | 00 | 00 | 00 | 212 | Content Classification | Content Classification | Content classification | #REF! | | | Node | |
| 03 | 02 | 02 | 01 | 00 | 00 | 00 | 00 | 213 | Type | Type | Type of programme (e.g., cartoon, film,...)(Coded as Escort 2.4) | #REF! ISO 7-bit char string | 32 bytes max | | Type Node | |

FIG. 14-1

| | | | | | | | | | |
|---|---|---|---|---|---|---|---|---|---|
| 214 | 03 | 02 | 02 | 01 | 02 | 03 | 00 | Genre | Genre | Programme genre (e.g., entertainment, current affairs magazine, talk Western, ...)(Coded as Export 2.4) | #REF! | ISO 7-bit char string | 32 bytes max | | Type Node |
| 215 | 03 | 02 | 02 | 01 | 02 | 03 | 00 | Target Audience | Target Audience | Target audience (e.g., children, 17 to 32, elderly, ...) | #REF! | ISO 7-bit char string | 32 bytes max | | Type Node |
| 216 | 03 | 02 | 02 | 01 | 02 | 03 | 00 | Cataloguing and Indexing | Cataloguing | Archival analysis of the essence metadata | #REF! | | | | Node |
| 217 | 03 | 02 | 02 | 01 | 02 | 03 | 00 | Catalogue History | Archival Catalogue | Audit metadata concerning the archival analysis metadata | #REF! | | | | Node |
| 218 | 03 | 02 | 02 | 01 | 02 | 03 | 00 | Status of Data Set | Status of The Metadata Set | The current status of the metadata set | #REF! | | | | Type Node |
| 219 | 03 | 02 | 02 | 01 | 02 | 03 | 00 | Status of Data Set | Status of The Metadata Set | The current status of the metadata set | #REF! | ISO 7-bit char string | 127 bytes max | | Leaf |
| 220 | 03 | 02 | 02 | 01 | 02 | 03 | 00 | Cataloguing, Indexing or Thesaurus system used | ID In Use ? | The particular Cataloguing, Indexing or Thesaurus system used | #REF! | ISO 7-bit char string | 32 bytes max | | Type Node |
| 221 | 03 | 02 | 02 | 01 | 02 | 03 | 00 | Theme | Theme | The category of the Theme of the content | #REF! | ISO 7-bit char string | 32 bytes max | | Type Node |
| 222 | 03 | 02 | 02 | 01 | 02 | 03 | 00 | Genre | Genre | The category of the Genre of the content | #REF! | ISO 7-bit char string | 32 bytes max | | Type Node |
| 223 | 03 | 02 | 02 | 01 | 02 | 03 | 00 | Subject Code | Sub-Code | Subject Code | #REF! | ISO 7-bit char string | 32 bytes max | | Type Node |
| 224 | 03 | 02 | 02 | 01 | 02 | 03 | 00 | Keywords | Keyword | Words or phrases summarising an aspect of the data set | #REF! | ISO 7-bit char string | 127 bytes max | | Leaf |
| 225 | 03 | 02 | 02 | 01 | 02 | 03 | 00 | Key Frames | Key Frames | Reference to a key frame structure in the data set | #REF! | ISO 7-bit char string | 127 bytes max | | Leaf |
| 226 | 03 | 02 | 02 | 01 | 02 | 03 | 00 | Key Sounds | Key Sounds | Reference to a key sound in the data set | #REF! | ISO 7-bit char string | 127 bytes max | | Leaf |
| 227 | 03 | 02 | 02 | 01 | 02 | 03 | 00 | Key data | Key Data | Reference to a key piece of data or program in the data set | #REF! | ISO 7-bit char string | 127 bytes max | | Leaf |
| 228 | 03 | 02 | 02 | 01 | 02 | 03 | 00 | Textual Description | Textual Description | A textual characterization of the data set | #REF! | | | | Node |
| 229 | 03 | 02 | 02 | 01 | 02 | 03 | 00 | Abstract | Abstract | A brief narrative summary of the data set | #REF! | ISO 7-bit char string | 1024 bytes max | | Leaf |
| 230 | 03 | 02 | 02 | 01 | 02 | 03 | 00 | Purpose | Purpose | A summary of the intentions with which the data set was developed. | #REF! | ISO 7-bit char string | 127 bytes max | | Leaf |
| 231 | 03 | 02 | 02 | 01 | 02 | 03 | 00 | Description | Description | A textual description | #REF! | ISO 7-bit char string | 127 bytes max | | Leaf |

FIG. 14-2

| Line # | SMPTE label | | | | | | Data Element Name | Japanese Names | Data Element Definition | Type | Value Length | Value Range | Node/Leaf | Defining document? |
|---|---|---|---|---|---|---|---|---|---|---|---|---|---|---|
| 232 | 03 | 02 | 01 | 04 | 05 | 00 | Colour descriptor | Colour Information | eg. Black and white, baled etc | #REF! | ISO 7-bit char string | 32 bytes max | | Type Node | |
| 233 | 03 | 02 | 01 | 04 | 06 | 00 | Format descriptor | Format Information | eg. Letterbox, Pillarbox etc | #REF! | ISO 7-bit char string | 32 bytes max | | Type Node | |
| 234 | 03 | 02 | 01 | 07 | 00 | 00 | Stratum | Stratum | The descriptive stratum of the archival context analysis of the content | #REF! | | | | Node | |
| 235 | 03 | 02 | 01 | 07 | 01 | 00 | Stratum Kind | Stratum Kind | eg. Background, action, social matters etc | #REF! | ISO 7-bit char string | 32 bytes max | | Type Node | |
| 236 | 03 | 02 | 01 | 08 | 00 | 00 | Supplemental Information | Supplemental Information | Other descriptive information about the data set. | #REF! | | | | Node | |
| 237 | 03 | 02 | 01 | 10 | 00 | 00 | Assessments | Assessments | Assessed aspects of the content: eg aspects of the content and contributors to it. | #REF! | | | | Node | |
| 238 | 03 | 02 | 01 | 10 | 01 | 00 | Awards | Awards | Awards relating to editorial, technical etc. aspects of the content and contributors to it | #REF! | | | | Node | |
| 239 | 03 | 02 | 01 | 10 | 01 | 01 | Individual | Individual | Awards granted to individuals | #REF! | ISO 7-bit char string | 32 bytes max | | Leaf | |
| 240 | 03 | 02 | 01 | 10 | 01 | 02 | Programme | Programme | Awards granted to programme | #REF! | ISO 7-bit char string | 32 bytes max | | Leaf | |
| 241 | 03 | 02 | 01 | 10 | 02 | 00 | Qualitative Values | Qualitative Values | Assessed values relating to editorial, technical etc aspects of the content and contributors to it | #REF! | | | | Node | |
| 242 | 03 | 02 | 01 | 10 | 02 | 01 | Asset Values | Asset Values | Assessment of the programme quality | #REF! | ISO 7-bit char string | 32 bytes max | | Leaf | |
| 243 | 03 | 02 | 01 | 10 | 02 | 02 | Content Value | Content Value | Assessment of the content value | #REF! | ISO 7-bit char string | 32 bytes max | | Leaf | |
| 244 | 03 | 02 | 01 | 10 | 02 | 03 | Cultural Quality | Cultural Quality | Assessment of the cultural quality | #REF! | ISO 7-bit char string | 32 bytes max | | Leaf | |
| 245 | 03 | 02 | 01 | 10 | 02 | 04 | Asthetic Value | Asthetic Value | Assessment of the asthetic quality | #REF! | ISO 7-bit char string | 32 bytes max | | Leaf | |
| 246 | 03 | 02 | 01 | 10 | 02 | 05 | Historic Value | Historic Value | Assessment of the historic value | #REF! | ISO 7-bit char string | 32 bytes max | | Leaf | |

FIG. 15-1

| | | | | | Technical Value | Other Values | Assessment of the technical value | | | |
|---|---|---|---|---|---|---|---|---|---|---|
| 247 | 03 | 02 | 06 | 02 | 00 | Technical Value | | Assessment of the technical value | #REF | ISO 7-bit char string | 32 bytes max | Leaf |
| 248 | 03 | 02 | 07 | 00 | 00 | Other Values | | Assessment of others relevant qualities | #REF | ISO 7-bit char string | 32 bytes max | Leaf |
| 249 | 03 | 03 | 00 | 00 | 00 | Descriptors (Machine Assigned or Computed) | Descriptors | Descriptors (Machine Assigned or Computed) relating to analysis of the content | #REF | | | Node |
| 250 | 03 | 03 | 01 | 00 | 00 | F-categorisation | Categorisation | Analytical categorisation of the content | #REF | | | Node |
| 251 | 03 | 03 | 02 | 00 | 00 | Content Classification | Content Classification | Content classification | #REF | | | Node |
| 252 | 03 | 03 | 02 | 01 | 00 | F-cataloguing and Indexing | Same as 217 | Archival analysis of the essence metadata | #REF | | | Node |
| 253 | 03 | 03 | 02 | 02 | 00 | Cataloguing History | Same as 218 | Audit metadata concerning the archival analysis metadata a | #REF | | | Node |
| 254 | 03 | 03 | 02 | 02 | 01 | Status of Data Set | Same as 219 | The current status of the metadata set | #REF | ISO 7-bit char string | 32 bytes max | Leaf |
| 255 | 03 | 03 | 02 | 02 | 02 | Cataloguing, Indexing or Thesaurus system used | Same as 221 | The particular Cataloguing, Indexing or Thesaurus system used | #REF | ISO 7-bit char string | 32 bytes max | Leaf |
| 256 | 03 | 03 | 02 | 02 | 03 | Keywords | Same as 225 | Words or phrases summarising an aspect of the data set | #REF | ISO 7-bit char string | 32 bytes max | Leaf |
| 257 | 03 | 03 | 02 | 02 | 04 | Key Frames | Same as 226 | Reference to a key frame of video in the data set | #REF | ISO 7-bit char string | 32 bytes max | Leaf |
| 258 | 03 | 03 | 02 | 02 | 05 | Key Sounds | Same as 227 | Reference to a key sound in the data set | #REF | ISO 7-bit char string | 32 bytes max | Leaf |
| 259 | 03 | 03 | 02 | 02 | 06 | Key data | Same as 228 | Reference to a key piece of data or program in the data set | #REF | ISO 7-bit char string | 32 bytes max | Leaf |
| 260 | 03 | 03 | 02 | 02 | 07 | Textual Description | Same as 229 | A textual characterisation of the data set | #REF | | | Node |
| 261 | 03 | 03 | 02 | 03 | 00 | Stratum | Same as 235 | The descriptive stratum of the archival content analysis of the content | #REF | | | Node |
| 262 | 03 | 03 | 02 | 03 | 01 | Stratum kind | Same as 236 | eg. Background, action, sound nature etc | #REF | ISO 7-bit char string | 32 bytes max | Leaf |
| 263 | 03 | 04 | 00 | 00 | 00 | PARAMETRIC | Class 4 Parameters | Class 4 is reserved for parametric and configuration metadata. | #REF | | | Node |
| 264 | 03 | 04 | 01 | 00 | 00 | Video Essence Encoding Characteristics | Video Encoding Parameters | Operating characteristics of the device encoding the sequence. | #REF | | | Node |

FIG. 15-2

| Line # | SMPTE Label | | | | | Data Element Name | Japanese Names | Data Element Definition | Type | Value Length | Value Range | Node/Leaf | Defining Document |
|---|---|---|---|---|---|---|---|---|---|---|---|---|---|
| 255 | 04 | 01 | 01 | 00 | 00 | Video Fundamental Characteristics | Video Fundamental Characteristics | Fundamental video characteristics | #REF! | | | Node | |
| 265 | 04 | 01 | 01 | 01 | 00 | Video Source Device | Video Source Device | Indicates the type of the video source. | #REF! ISO 7-bit char string | 32 bytes max | | Leaf | |
| 266 | 04 | 01 | 01 | 02 | 00 | Fundamental opto-electronic formulation | OE Transfer etc Characteristics | Fundamental opto-electronic transfer etc characteristics | #REF! | | | Node | |
| 268 | 04 | 01 | 01 | 02 | 01 | Gamma Information | Gamma Characteristics | Specifies the non-linear relationship between these scene light levels and amplitude-compressed video signal levels. | #REF! | | | Type Node | |
| 269 | 04 | 01 | 01 | 02 | 02 | Gamma Equation | Gamma Equation | Specifies the non-linear relationship between these scene light levels and amplitude-compressed video signal levels. | #REF! ISO 7-bit char | 14 chars max | See types dictionary | Leaf | IN25.52 |
| 270 | 04 | 01 | 01 | 02 | 02 | Gamma | Gamma | Specifies expected gamma output settings on video display | #REF! Rational | 8 bytes | | Leaf | |
| 271 | 04 | 01 | 01 | 02 | 03 | Luma Equation | Luma Equation | Specifies the equation used to derive luma and chroma from gamma-corrected RGB signals | #REF! ISO 7-bit char | 14 chars max | See types dictionary | Leaf | |
| 272 | 04 | 01 | 01 | 02 | 04 | Colorimetry Code | Colorimetry Code | The fundamental color coding that relates the scene CIE tri-stimulus values (X, Y, Z) to the linear video levels (R, G, B). | #REF! ISO 7-bit char | 14 chars max | See types dictionary | Leaf | |
| 273 | 04 | 01 | 01 | 03 | 00 | Fundamental sequencing and scanning | Scanning Information | Fundamental scanning and sequencing information | #REF! | | | Node | |
| 274 | 04 | 01 | 01 | 03 | 01 | Signal Form Code | Component Sequence | Code specifies the component sequence for the video pixel matrix. | #REF! ISO 7-bit char | 14 chars max | See types dictionary | Leaf | |
| 275 | 04 | 01 | 01 | 03 | 02 | Color Field Code | Color Frame Index | Identifies the color field of the source video field for video derived from composite sources. | #REF! UInt8 | 1 byte | 00h = default, 01h - 07h = field number | Leaf | |
| 276 | 04 | 01 | 01 | 03 | 03 | Vertical Rate | Vertical Rate | Specifies the vertical rate of the video scanning system. | #REF! UInt8 | 1 byte | See types dictionary | Leaf | |
| 277 | 04 | 01 | 01 | 03 | 04 | Frame Rate | Frame Rate | The rate at which images are captured, expressed in frames per second. | #REF! UInt8 | 1 byte | See types dictionary | Leaf | |
| 278 | 04 | 01 | 01 | 03 | 05 | Image dimensions | Image Dimensions | Specifies information about the horizontal and vertical dimensions of an image. | #REF! UInt8 | 1 byte | See types dictionary | Node | |
| 279 | 04 | 01 | 01 | 03 | 06 | Image lines | Image Lines | Specifies information about the number of vertical scan lines | #REF! | | | Node | |

FIG. 16-1

| | | | | | Total Lines per Frame | Total Lines Per Frame | Specifies the number of lines in a total frame in the video scanning system | :REF: | UInt16 | 2 bytes | | Leaf | |
|---|---|---|---|---|---|---|---|---|---|---|---|---|---|
| 281 | 04 | 01 | 01 | 01 | 00 | Active Lines per Frame | Active Lines Per Frame | Specifies the total number of lines (rows) in the active portion of a frame at the video generation; the video generation matrix | :REF: | UInt16 | 2 bytes | | Leaf | |
| 282 | 04 | 01 | 01 | 02 | 00 | LeadingLines | Leading Lines | Specifies number of blank lines before image | :REF: | Int32 | 4 bytes | | Leaf | W25.52 |
| 283 | 04 | 01 | 01 | 03 | 00 | TrailingLines | Trailing Lines | Specifies number of blank lines after image | :REF: | Int32 | 4 bytes | | Leaf | W25.52 |
| 284 | 04 | 01 | 01 | 09 | 00 | Horizontal and Vertical dimensions | Horizontal and Vertical Dimensions | Specifies information about the horizontal and vertical dimensions of an image | :REF: | | | | Node | |
| 285 | 04 | 01 | 01 | 0f | 00 | DisplayAspectRatio | Aspect Ratio | Specifies the horizontal to vertical aspect ratio of the image as it is to be displayed | :REF: | | | | Byte Node | |
| 286 | 04 | 01 | 01 | 01 | 00 | ImageAspectRatio | Image Aspect ratio | Specifies the image aspect ratio | :REF: | | | | Leaf | W25.52 |
| 287 | 04 | 01 | 01 | 02 | 00 | ImageAspectRatio | Same as 287 | Specifies the image aspect ratio | :REF: | Rational | 8 bytes | | Leaf | |
| 288 | 04 | 01 | 01 | 01 | 00 | Capture aspect ratio | Capture Aspect Ratio | Specifies the horizontal to vertical aspect ratio of the image captured at the sensor | :REF: | Unsigned Char | 1 byte | See spec dictionary | Leaf | W25.52 |
| 289 | 04 | 01 | 02 | 00 | 00 | StoredHeight | Stored Height | Specifies height of stored image | :REF: | UInt32 | 4 bytes | | Leaf | W25.52 |
| 290 | 04 | 01 | 02 | 00 | 00 | StoredWidth | Stored Width | Specifies width of stored image | :REF: | UInt32 | 4 bytes | | Leaf | W25.52 |
| 291 | 04 | 01 | 02 | 00 | 00 | SampledHeight | Sampled Height | Specifies height of sampled image | :REF: | UInt32 | 4 bytes | | Leaf | W25.52 |
| 292 | 04 | 01 | 02 | 00 | 00 | SampledWidth | Sampled Width | Specifies width of sampled image | :REF: | UInt32 | 4 bytes | | Leaf | W25.52 |
| 293 | 04 | 01 | 02 | 00 | 00 | SampledXOffset | Sampled X Offset | Specifies X offset of sampled image | :REF: | Int32 | 4 bytes | | Leaf | W25.52 |
| 294 | 04 | 01 | 02 | 00 | 00 | SampledYOffset | Sampled Y Offset | Specifies Y offset of sampled image | :REF: | Int32 | 4 bytes | | Leaf | W25.52 |
| 295 | 04 | 01 | 02 | 00 | 00 | DisplayHeight | Display Height | Specifies height of displayed image | :REF: | UInt32 | 4 bytes | | Leaf | W25.52 |
| 296 | 04 | 01 | 02 | 00 | 00 | DisplayWidth | Display Width | Specifies width of displayed image | :REF: | UInt32 | 4 bytes | | Leaf | W25.52 |
| 297 | 04 | 01 | 02 | 00 | 00 | DisplayXOffset | Display X Offset | Specifies X offset of displayed image | :REF: | Int32 | 4 bytes | | Leaf | W25.52 |

FIG. 16-2

| Line # | SMPTE Label | | | | | | Data Element Name | Japanese Names | Data Element Definition | Type | Value Length | Value Range | Node/Leaf | Defining Document |
|---|---|---|---|---|---|---|---|---|---|---|---|---|---|---|
| 296 | 04 | 01 | 04 | 06 | 03 | 00 | Display Y Offset | Display Y Offset | Specifies Y offset of displayed image | #REF! | 4 bytes | | Leaf | W25.52 |
| 298 | 04 | 01 | 02 | 00 | 00 | 00 | Video Coding Characteristics | Video Coding Characteristics | Information about the original analogue coding of the essence | #REF! | | | Node | |
| 300 | 04 | 01 | 02 | 01 | 00 | 00 | Analogue Video System | Analogue Video Characteristics | PAL, NTSC etc | #REF! | ISO 7-bit char | 4 chars max | See types dictionary | Leaf | |
| 301 | 04 | 01 | 02 | 02 | 01 | 00 | Luminance Sample rate | Luminance Sample Rate | The luminance sample rate | #REF! | UInt8 | 1 byte | See types dictionary | Leaf | |
| 302 | 04 | 01 | 02 | 02 | 02 | 00 | Active Samples per Line | Active Samples Per Line | Total number of samples (columns) in the active portion of a line in the video pixel matrix | #REF! | UInt16BF | 2 bytes | | Leaf | |
| 303 | 04 | 01 | 02 | 02 | 03 | 00 | Total Samples per Line | Total Samples Per Line | Specifies the number of samples in a total line in the video pixel matrix | #REF! | UInt16BF | 2 bytes | | Leaf | |
| 304 | 04 | 01 | 02 | 02 | 04 | 00 | Bits Per Pixel | Bits Per Pixel | The maximum number of significant bits for the value in each band of each pixel without compression. | #REF! | Unsigned Char | 1 byte | | Leaf | |
| 305 | 04 | 01 | 02 | 03 | 00 | 00 | Sampling Information | Sampling Information | Description of the component sampling | #REF! | | | | Node | |
| 306 | 04 | 01 | 02 | 03 | 07 | 00 | Sampling Hierarchy Code | Sampling Hierarchy Code | A code that specifies the component sampling hierarchy for the video pixel matrix. | #REF! | ISO 7-bit char | 4 chars max | See types dictionary | Leaf | W25.52 |
| 307 | 04 | 01 | 02 | 03 | 07 | 00 | HorizontalSubsampling | Horizontal Subsampling | Specifies ratio of luminance subsampling to chrominance subsampling in horizontal direction | #REF! | UInt32 | 4 bytes | | Leaf | |
| 309 | 04 | 01 | 02 | 03 | 02 | 00 | ColorSiting | Color Siting ? | Specifies how to compute subsampled chrominance values | #REF! | ColorSitingType | 2 bytes | | Leaf | |
| 310 | 04 | 01 | 02 | 03 | 08 | 00 | Rounding Method Code | Rounding Method Code | Specifies the rounding method that has been applied to the digital samples of the video signal. | #REF! | ISO 7-bit char | 4 chars max | See types dictionary | Leaf | W25.52 |
| 311 | 04 | 01 | 02 | 03 | 09 | 00 | Filtering Code | Filtering Code | Specifies the spectral filtering that has been applied to the digital samples of the video signal. | #REF! | ISO 7-bit char | 4 chars max | See types dictionary | Leaf | W25.52 |
| 311 | 04 | 01 | 02 | 01 | 00 | 00 | Sampling Structure | Sampling Structure | Description of the sampling structure of the video scanning system, such as Progressive and simple frame. | #REF! | | | | Node | |
| 312 | 04 | 01 | 02 | 01 | 01 | 00 | Sampling Structure Code | Sampling Structure Code | A code that specifies the analogue or digital sampling structure for the video scanning system. Eg Progressive | #REF! | Unsigned Char | 1 byte | See types dictionary | Leaf | |

FIG. 17-1

| | | | | Description | | LayoutType | | | |
|---|---|---|---|---|---|---|---|---|---|
| 313 | 04 | 01 | 01 | 00 | FrameLayout | Frame Layout | Specifies frame layout (interlaced, single frame, still frame, etc.) | [REF] | 2 bytes | | |
| 314 | 04 | 01 | 01 | 05 | 00 | VideoLineMap | Line Field Information | Specifies relation between scanned lines and stored fields | [REF] | Array of Int32 | | Leaf | W25.52 |
| 315 | 04 | 01 | 02 | 06 | 00 | AlphaTransparency | Signal Transparency | Specifies whether 0 or the maximum value is transparent | [REF] | UInt32 | | Leaf | W25.52 |
| 316 | 04 | 01 | 03 | 07 | 00 | ComponentWidth | Component Width | Specifies component width in bits | [REF] | UInt32 | | Leaf | W25.52 |
| 317 | 04 | 01 | 04 | 08 | 00 | BlackReferenceLevel | Black Reference Level | Specifies digital luminance associated with black | [REF] | UInt32 | | Leaf | W25.52 |
| 318 | 04 | 01 | 05 | 09 | 00 | WhiteReferenceLevel | White Reference Level | Specifies digital luminance associated with white | [REF] | UInt32 | | Leaf | W25.52 |
| 319 | 04 | 01 | 06 | 0A | 00 | ColorRange | Color Dynamic Range | Specifies range of allowable chrominance values | [REF] | UInt32 | | Leaf | W25.52 |
| 320 | 04 | 01 | 07 | 0E | 00 | PixelLayout | Order of Color Components | Specifies order of components | [REF] | RGBALayout | | Leaf | W25.52 |
| 321 | 04 | 01 | 08 | 0F | 00 | Palette | Color Palette | Specifies palette containing colors | [REF] | DataValue | | Leaf | W25.52 |
| 322 | 04 | 01 | 09 | 11 | 00 | PaletteLayout | Palette Layout ? | Specifies layout of components in palette | [REF] | RGBALayout | variable | Leaf | W25.52 |
| 323 | 04 | 01 | 0A | 12 | 00 | Subform | Number of Same Data in Horizontal Direction of Original Signal | Specifies if the data has the same number of rows in strip throughout | [REF] | Boolean | 1 byte | Leaf | W25.52 |
| 324 | 04 | 01 | 0B | 13 | 00 | IsContiguous | Number of Stored Contiguous Bytes | Specifies if the data is stored in contiguous bytes | [REF] | Boolean | 1 byte | Leaf | W25.52 |
| 325 | 04 | 01 | 0C | 14 | 00 | JPEGTableID | JPEG Table | Specifies JPEG table used to compress video | [REF] | JPEGTableIDType | | Leaf | W25.52 |
| 326 | 04 | 01 | 0D | 15 | 00 | TIFFDescriptor_Summary | Tiff Parameters | Contains the TIFF format supplementary data | [REF] | DataValue | variable | Leaf | W25.52 |
| 327 | 04 | 01 | 0E | 16 | 00 | MPEG Coding Characteristics | MPEG Coding Characteristics | Information about MPEG video coding | [REF] | | | Leaf | W25.52 |
| 328 | 04 | 01 | 0F | 17 | 00 | MPEG-2 Coding Characteristics | MPEG-2 Coding Characteristics | Information about MPEG-2 video coding | [REF] | | | | |
| 329 | 04 | 01 | 10 | 18 | 00 | FieldFrameTypeCode | Field Frame Type Code | Identifies the field or frame type of the source video image for video derived from compressed sources, E.g. I, B or P | [REF] | ISO 7 bit char | 1 char | 'I', 'B' or 'P' | |
| 330 | 04 | 02 | 00 | 00 | 00 | Film parameters | Film Parameters | Information about Film | [REF] | | | Node | |

FIG. 17-2

| Line # | SMPTE Label | | | | | | | Data Element Name | Japanese Names | Data Element Definition | Line # | Type | Value Length | Value Range | Node/Leaf | Defining Document |
|---|---|---|---|---|---|---|---|---|---|---|---|---|---|---|---|---|
| 331 | 04 | 01 | 02 | 01 | 01 | 00 | 00 | Film to Video parameters | Film Video Parameters | Information about transferring Film to Video | | #REF! | | | Node | |
| 332 | 04 | 01 | 02 | 01 | 01 | 01 | 00 | Field Dominance | Field Dominance ? | Field one dominant (Filed) | | #REF! Boolean | 1 byte | 00h (FALSE) or FFh (TRUE) | Leaf | |
| 333 | 04 | 01 | 02 | 01 | 01 | 02 | 00 | Framephasesequence | Frame Phase Sequence | eg. A frame, B frame, C frame | | #REF! Unsigned Char | 1 byte | Modulo 'n' count to 255 max | Leaf | |
| 334 | 04 | 01 | 02 | 01 | 02 | 00 | 00 | Film Pulldown characteristics | Film Pulldown Characteristics | Film cassete pulldown characteristics | | #REF! | | | Node | |
| 335 | 04 | 01 | 02 | 01 | 02 | 01 | 00 | Pulldown sequence | Pulldown Sequence | eg. 3:2, 1:1 | | #REF! Unsigned Char | 1 byte | See types dictionary | Leaf | |
| 336 | 04 | 01 | 02 | 01 | 02 | 02 | 00 | Pulldown phase | Pulldown Phase | Redundant field in a 3:2 pulldown sequence | | #REF! Boolean | 1 byte | 00h (FALSE) or FFh (TRUE) | Leaf | |
| 337 | 04 | 01 | 02 | 01 | 02 | 03 | 00 | Pulldownkind | Pulldown Kind | Specifies kind of pulldown | | #REF! PulldownKindType | 2 bytes | | Leaf | W25.52 |
| 338 | 04 | 01 | 02 | 01 | 02 | 04 | 00 | PulldownDirection | Pulldown Direction | Specifies direction of pulldown | | #REF! PulldownDirection | 2 bytes | | Leaf | W25.52 |
| 339 | 04 | 01 | 02 | 01 | 02 | 05 | 00 | PhaseFrame | Pulldown Phase | Specifies pulldown phase | | #REF! PhaseFrameType | 2 bytes | | Leaf | W25.52 |
| 340 | 04 | 01 | 02 | 01 | 03 | 00 | 00 | Film Frame Rates | Film Frame Rates | Frame per second film frame rate | | #REF! | | | Node | |
| 341 | 04 | 01 | 02 | 01 | 03 | 01 | 00 | Capture Film Framerate | 24.00 fps | eg 24.00 fps | | #REF! Unsigned Char | 1 byte | See types dictionary | Leaf | |
| 342 | 04 | 01 | 02 | 01 | 03 | 02 | 00 | Transfer Film Frame rate | 23.976 fps | eg 23.976 fps | | #REF! Unsigned Char | 1 byte | See types dictionary | Leaf | |
| 343 | 04 | 01 | 02 | 01 | 03 | 03 | 00 | FilmDescriptive_FrameRate | Specifies Frame rate | Specifies frame rate | | #REF! UInt32 | 4 bytes | | Leaf | W25.52 |
| 344 | 04 | 01 | 02 | 01 | 04 | 00 | 00 | Film characteristics | Film Characteristics | Frame per second film frame rate | | #REF! | | | Node | |
| 345 | 04 | 01 | 02 | 01 | 04 | 01 | 00 | Film capture aperture | Film Aperture Characteristics | eg super 16, academy | | #REF! ISO 7bit char string | 32 bytes max | | Leaf | |

| Line # | SMPTE Label | | | | | | Data Element Name | Japanese Names | Data Element Definition | Type | Value Length | Value Range | Node/Leaf | Defining Document |
|---|---|---|---|---|---|---|---|---|---|---|---|---|---|---|
| 354 | 04 | 02 | 01 | 20 | 00 | 00 | Audio Fundamental Characteristics | Audio Fundamental Characteristics | Fundamental audio characteristics | aREF | | | Node | |
| 355 | 04 | 02 | 01 | 01 | 08 | 00 | Audio Source Device | Audio Source Device | Indicates the type of the audio source. | aREF, ISO 7-bit char string | 32 bytes max | | Leaf | |
| 356 | 04 | 02 | 01 | 02 | 00 | 00 | Fundamental audio formulation | Fundamental Audio Control | number of recording channels used, analogue or digital recording device, analogue or digital mixing console | aREF | | | Node | |
| 357 | 04 | 02 | 01 | 02 | 01 | 00 | Electro-spatial formulation | Audio Channel Division | Mono, Dual mono, Stereo A+B, Stereo M&S, Dolby surround, MPEG ISO/MEC etc. | aREF, Unsigned Char | 1 byte | See types dictionary | Leaf | |
| 358 | 04 | 02 | 01 | 02 | 02 | 00 | Filtering applied | Audio Filtering Characteristics | eg, Academy, flat etc | aREF, ISO 7-bit char string | 32 bytes max | | Leaf | |
| 359 | 04 | 02 | 01 | 02 | 03 | 00 | Audio reference level | Audio Reference Level | Number of dBm for 0VU | aREF, Uint8 | 1 byte | | Leaf | |
| 360 | 04 | 02 | 01 | 02 | 04 | 00 | Number of audio channels in mix | Number of Audio Channels in Mix | The number of audio channels in the mix | aREF | | | Node | |
| 361 | 04 | 02 | 01 | 02 | 04 | 01 | Mono channels | Number of Mono Channels | The number of mono channels in the mix | aREF, Uint8 | 1 byte | 1 to 255 | Leaf | |
| 362 | 04 | 02 | 01 | 02 | 04 | 02 | Stereo channels | Number of Stereo Channels | The number of stereo channels in the mix | aREF, Uint8 | 1 byte | 1 to 255 | Leaf | |
| 363 | 04 | 02 | 01 | 02 | 04 | 03 | Physical track number | Track Number | Identifies the physical track associated with the slot | aREF, Uint32 | 4 bytes | | Leaf | |
| 374 | 04 | 02 | 02 | 00 | 00 | 00 | Film sound source | Audio From Film | Indicates the film sound source. | aREF | | | Node | |
| 375 | 04 | 02 | 02 | 01 | 00 | 00 | Optical track | Optical Recording | The kind of optical track from which the sound was recovered | aREF, ISO 7-bit char string | 32 bytes max | | Leaf | |
| 376 | 04 | 02 | 02 | 02 | 00 | 00 | Magnetic track | Magnetic Recording | The kind of magnetic track from which the sound was recovered | aREF, ISO 7-bit char string | 32 bytes max | | Leaf | |
| 377 | 04 | 02 | 03 | 00 | 00 | 00 | Analogue Audio Coding Characteristics | Analogue Audio Characteristics | Information about the original analogue coding of the essence | aREF | | | Node | |
| 378 | 04 | 02 | 03 | 01 | 00 | 00 | Analogue system | Analogue System | Flat, Dolby-A, etc | aREF, ISO 7-bit char string | 32 bytes max | | Leaf | |

FIG. 19-1

| | | | | | | | | Digital Audio Sampling Characteristics | Audio Sampling Characteristics | sampling frequency, reference clock, bits per sample, rounding, dither ( rectangular, triangular PD) | #REF! | | | Node |
|---|---|---|---|---|---|---|---|---|---|---|---|---|---|---|
| 380 | 04 | 02 | 05 | 01 | | | | Sample rate | Sample Rate | The sample rate | #REF! Uint8 | 1 byte | | Leaf |
| 381 | 04 | 02 | 05 | 02 | | | | Reference clock frequency | Clock Frequency | The reference clock frequency in Hz | #REF! uint8 | 1 byte | See types dictionary | Leaf |
| 382 | 04 | 02 | 05 | 03 | | | | Bits per Sample | Bits Per Samples | The maximum number of significant bits for the value without compression. | #REF! Uint8 | 1 byte | See types dictionary | Leaf |
| 383 | 04 | 02 | 05 | 04 | | | | Roundinglaw | Rounding Law | The rounding law applied | #REF! ISO 7-bit char | 4 chars max See types dictionary | | Leaf |
| 384 | 04 | 02 | 05 | 05 | | | | Dither | Dither | rectangular, triangular PD | #REF! ISO 7-bit char | 4 chars max See types dictionary | | Leaf |
| 385 | 04 | 02 | 06 | | | | | Digital Audio Coding Characteristics | Audio Coding Characteristics | Information about the essence digital coding | #REF! | | | Node |
| 386 | 04 | 02 | 06 | 01 | | | | Coding Law | Coding Law | Type of coding (u-Law, A-law, hbox comprising G.711, G.722, MPEG type, layers no, Delay ac. | #REF! ISO 7-bit char | 4 chars max See types dictionary | | Leaf |
| 387 | 04 | 02 | 06 | 02 | | | | Layer Number | Layer Number | The layer number of the digital coding | #REF! Uint8 | 1 byte | | Leaf |
| 388 | 04 | 02 | 06 | 03 | | | | Average Bit rate | Average Bit Rate | The Average bit rate | #REF! Floating Point | 4 bytes | | Leaf |
| 389 | 04 | 02 | 06 | 04 | | | | Fixed bitrate | Fixed Bit Rate | fixed = TRUE, variable = FALSE | #REF! Boolean | 1 byte | (on: FALSE), FR: (TRUE) | Leaf |
| 390 | 04 | 02 | 07 | | | | | Audio test parameters | Audio Test Parameters | Audio test parameters from the original recording | #REF! | | | Node |
| 391 | 04 | 02 | 07 | 01 | | | | Signal to noise ratio | SNR | The measured signal to noise ratio of the original recording | #REF! Floating Point | 4 bytes | | Leaf |
| 392 | 04 | 02 | 07 | 02 | | | | Weighting | Weighting | The weighting used in measurements | #REF! ISO 7-bit char | 4 chars max See types dictionary | | Leaf |
| 393 | 04 | 02 | 08 | | | | | Audio summary information | Audio Summary Information | | #REF! | | | Node |
| 394 | 04 | 02 | 08 | 01 | | | | AFC Descriptor Summary | Aife Format Summary | Contains AIFC format summary | #REF! DataValue | variable | | Leaf |
| 395 | 04 | 02 | 08 | 02 | | | | WAVE Descriptor Summary | Wave Format Summary | Contains the WAVE audio format summary data | #REF! DataValue | variable | | Leaf |
| 396 | 04 | 03 | | | | | | Data Essence Encoding Characteristics | Encoding Method | Operating characteristics of the device creating the data essence. | #REF! | | | Node |

FIG. 19-2

| Line # | SMPTE label | | | | | Data Element Name | Japanese Names | Data Element Definition | Line # | Type | Value Length | Value Range | Node/Leaf | Defining Document |
|---|---|---|---|---|---|---|---|---|---|---|---|---|---|---|
| 397 | 04 | 01 | 03 | | | Data Essence Fundamental Characteristics | Fundamental Characteristics | Fundamental Data characteristics | | #REF! | | | Node | |
| 398 | 04 | 01 | 03 | 01 | | Analogue Data Essence Coding Characteristics | Information About Original Signals | Information about the original analogue coding of the data essence | | #REF! | | | Node | |
| 399 | 04 | 01 | 03 | 01 | 00 | Analogue Data Coding | Analogue Data Coding | eg Telelext | | #REF! ISO 7bit char | 4 chars max | See types dictionary | Leaf | |
| 400 | 04 | 01 | 03 | 02 | | Digital Data Coding Characteristics | Digital Coding Characteristics | Information about the data essence digital coding | | #REF! | | | Node | |
| 401 | 04 | 01 | 03 | 02 | 00 | Data test parameters | Data From The Original Recording | Data test parameters from the original recording | | #REF! | | | Node | |
| 402 | 04 | 01 | 04 | | | Metadata Encoding Characteristics | Metadata Device Characteristics | Operating characteristics of the device creating the metadata | | #REF! | | | Node | |
| 403 | 04 | 01 | 04 | 01 | | Metadata Fundamental Characteristics | Metadata Fundamental Characteristics | Fundamental Metadata characteristics | | #REF! | | | Node | |
| 404 | 04 | 01 | 04 | 01 | 00 | Timecode Characteristics | Timecode Characteristics | Characteristics of timecode metadata | | #REF! | | | Node | |
| 405 | 04 | 01 | 04 | 01 | 00 | Timecode Kind | Time Code Kind | eg Dropframe, non drop frame, EBU, SCMM, 1394 etc | | #REF! | | | Node | |
| 406 | 04 | 01 | 04 | 01 | 00 | Timecode Kind | Time Code Kind | Timecode Kind expressed as a ISO 7-bit string | | #REF! ISO 7bit char | 4 chars max | See types dictionary | Leaf | W25.52 |
| 407 | 04 | 01 | 04 | 01 | 02 | Dop | Drop Frame | Specifies whether timecode is drop frame | | #REF! Boolean | 1 byte | | Leaf | |
| 408 | 04 | 01 | 04 | 01 | 03 | SourceType | LTC/VITC | Specifies whether timecode is LTC or VITC | | #REF! TCSource | 2 bytes | | Leaf | W25.52 |
| 409 | 04 | 01 | 04 | 01 | 00 | Timecode Timebase | Timecode Timebase | eg, 24, 25, 30, 50, 48 | | #REF! | | | Type Node | |
| 410 | 04 | 01 | 04 | 01 | 00 | Timecode Timebase | Same as 410 | eg, 24, 25, 30, 50, 48 | | #REF! UInt6 | 1 byte | See types dictionary | Leaf | |
| 411 | 04 | 01 | 04 | 01 | 00 | FPS | Frames Per Second | Specifies frames per second | | #REF! UInt16 | 2 bytes | | Leaf | W25.52 |

FIG. 20-1

| | | | | | | | | | | | |
|---|---|---|---|---|---|---|---|---|---|---|---|
| 112 | 04 | 01 | 11 | 03 | 04 | 90 | Timecode User bits flag | User Bits On/Off | Uses bits active = true | #REF! Boolean | 1 byte | | Leaf | |
| 113 | 04 | 01 | 11 | 03 | 05 | 90 | Start | Start Address | Specifies starting timecode in edit units | #REF! Position | 8 bytes | | Leaf | W25.52 |
| 114 | 04 | 01 | 11 | 03 | 07 | 90 | TimecodeStream_SampleRate | Sample Rate of Timecode | Specifies sample rate of timecode | #REF! Rational | 8 bytes | | Leaf | W25.52 |
| 115 | 04 | 01 | 11 | 01 | 01 | 90 | Source | Timecode Data | Contains timecode data | #REF! DataStream | variable | | Leaf | W25.52 |
| 116 | 04 | 01 | 11 | 01 | 02 | 90 | ImplicitSync | Timecode With Sync Signals | Specifies whether synchronization data is included | #REF! Boolean | 1 byte | | Leaf | W25.52 |
| 117 | 04 | 02 | 00 | 00 | 00 | 90 | Analogue Metadata Coding Characteristics | Analogue Metadata Information | Information about the original analogue coding of the metadata | #REF! | | | Node | |
| 118 | 04 | 02 | 01 | 00 | 00 | 90 | Analogue Metadata Carrier | Analogue Metadata Carrier | eg Telertext | #REF! ISO 7 bit char | 14 chars max | See types dictionary | Leaf | |
| 119 | 04 | 03 | 00 | 00 | 00 | 90 | Digital Metadata Coding Characteristics | Digital Metadata Information | Information about the metadata digital coding | #REF! | | | Node | |
| 120 | 04 | 03 | 01 | 00 | 00 | 90 | Digital Metadata Carrier | Digital Metadata Carrier | The metadata coding type - eg. Digital VPL, AES-3 | #REF! ISO 7 bit char | 14 chars max | See types dictionary | Leaf | |
| 121 | 04 | 04 | 00 | 00 | 00 | 90 | Metadata test parameters | Metadata Test Characteristics | Metadata test parameters from the original recording | #REF! | | | Node | |
| 122 | 04 | 04 | 01 | 00 | 00 | 90 | System & Control Encoding Characteristics | Device Characteristics | Operating characteristics of the device creating the system and control information | #REF! | | | Node | |
| 123 | 04 | 05 | 00 | 00 | 00 | 90 | System & Control Fundamental Characteristics | Fundamental Metadata Characteristics | Fundamental System and Control Metadata characteristics | #REF! | | | Node | |
| 124 | 04 | 05 | 01 | 00 | 00 | 90 | Analogue System & Control Coding | Original Analogue Signal Characteristics | Information about the original analogue coding of the system & control data | #REF! | | | Node | |
| 125 | 04 | 05 | 01 | 01 | 00 | 90 | Analogue System & Control Coding | Analog System | eg. Teletext | #REF! ISO 7 bit char | 14 chars max | See types dictionary | Leaf | |
| 126 | 04 | 05 | 02 | 00 | 00 | 90 | Digital System Coding Characteristics | Information About The Original Digital Coding | Information about the original digital coding of the system & control data | #REF! | | | Node | |
| 127 | 04 | 05 | 02 | 01 | 00 | 90 | Digital System Metadata Sampling Characteristics | Information About Digital Metadata | Information about the System and Control metadata digital sampling | #REF! | | | Node | |
| 128 | 04 | 05 | 02 | 01 | 01 | 90 | System Metadata test parameters | Original Signal Metadata Characteristics | System and Control metadata test parameters from the original recording | #REF! | | | Leaf | |
| 129 | 04 | 06 | 00 | 00 | 00 | 90 | General Encoding Characteristics | General Encoding Characteristics | Characteristics that apply to more than one type of essence of metadata | #REF! | | | Node | |

FIG. 20-2

| Line # | SMPTE label | | | | | | | | Data Element Name | Japanese Names | Data Element Definition | Line # | Type | Value Length | Value Range | Node/Leaf | Defining Document |
|---|---|---|---|---|---|---|---|---|---|---|---|---|---|---|---|---|---|
| 429 | 04 | 01 | 08 | 00 | 00 | 00 | 00 | 00 | General Essence Encoding Characteristics | General Essence Encoding Characteristics | Characteristics that apply to more than one type of essence | #REF! | | | | Node | |
| 430 | 04 | 01 | 06 | 01 | 01 | 00 | 00 | 00 | SampleRate | Sampling Rate | Specifies the sample rate of essence data | #REF! | Rational | 8 bytes | | Leaf | W25.52 |
| 431 | 04 | 01 | 05 | 01 | 02 | 00 | 00 | 00 | Length | Length | Specifies the number of samples of essence data | #REF! | Length | 8 bytes | | Leaf | W25.52 |
| 432 | 04 | 01 | 06 | 02 | 00 | 00 | 00 | 00 | Container encoding Characteristics | Container Encoding Characteristics | Characteristics that apply to the container of the metadata or essence | #REF! | | | | Node | |
| 433 | 04 | 01 | 06 | 02 | 01 | 00 | 00 | 00 | ByteOrder | Byte Order | Specifies the byte order of the metadata | #REF! | Int16 | 2 bytes | | Leaf | W25.52 |
| 434 | 04 | 01 | 07 | 00 | 00 | 00 | 00 | 00 | Storage Medium parameters | Storage Medium Information | Characteristics that describe the physical media such as cartridge size | #REF! | | | | Node | |
| 435 | 04 | 01 | 07 | 01 | 00 | 00 | 00 | 00 | Tape cartridge format | Tape Cartridge Format | | #REF! | | | | Node | |
| 436 | 04 | 01 | 07 | 01 | 01 | 00 | 00 | 00 | Videotape gauge and format | Videotape Gauge | The gauge and format of the videotape e.g. Betacam SP, HDVS 24P | #REF! | ISO 7-bit char string | 32 bytes max | | Leaf | |
| 437 | 04 | 01 | 07 | 01 | 02 | 00 | 00 | 00 | formFactor | Size of Tape | Specifies the physical size of tape | #REF! | TapeLabelType | 2 bytes | | Leaf | |
| 438 | 04 | 01 | 07 | 01 | 03 | 00 | 00 | 00 | VideoSignal | Signal Form | Specifies whether the tape is NTSC, PAL or SECAM | #REF! | VideoSignalType | 2 bytes | | Leaf | W25.52 |
| 439 | 04 | 01 | 07 | 01 | 04 | 00 | 00 | 00 | TapeFormat | Tape Format | Describes the format of the tape | #REF! | TapeFormatType | 2 bytes | | Leaf | W25.52 |
| 440 | 04 | 01 | 07 | 01 | 05 | 00 | 00 | 00 | Length | Recording Time | Specifies the tape capacity in minutes | #REF! | Length | 8 bytes | | Leaf | W25.52 |
| 441 | 04 | 01 | 07 | 01 | 06 | 00 | 00 | 00 | TapeDescriptor_Manufacturer | Tape Manufacturer | Specifies the SMPTE label or AUID that identifies the manufacturer | #REF! | Unicode String | variable | | Leaf | W25.52 |
| 442 | 04 | 01 | 07 | 01 | 07 | 00 | 00 | 00 | Model | Tape Model Number | Specifies the tape model number | #REF! | Unicode String | variable | | Leaf | W25.52 |
| 443 | 04 | 01 | 07 | 02 | 00 | 00 | 00 | 00 | Disc recorder parameters | Disc Recorder Information | Information about the recorder disc | #REF! | | | | Node | |

FIG. 21-1

| | | | | | Desc. kind and format | The kind and format of the disc, eg. Recordable DVD, CD Rom | $REF | ISO 7-bit char string | 32 bytes max | Leaf | |
|---|---|---|---|---|---|---|---|---|---|---|---|
| 446 | 04 | 07 | 03 | 08 | Film Medium Parameters | Information about the physical film media | $REF | | | Node | |
| 447 | 04 | 07 | 03 | 08 | 01 | Film stock manufacturer | eg. Kodak, Ilford | $REF | ISO 7-bit char string | 32 bytes max | Leaf | |
| 448 | 04 | 07 | 03 | 08 | 02 | Film Stock Type | eg. 5247 | $REF | ISO 7-bit char string | 32 bytes max | Leaf | |
| 449 | 04 | 07 | 03 | 08 | 03 | Perforations Information | Specifies number of perforations per frame (that is 3 or 4) | $REF | Uint8 | 1 byte | Leaf | |
| 450 | 04 | 07 | 03 | 09 | Film Kind | Specifies the film type | $REF | Film type | 2 bytes | Leaf | W25.52 |
| 451 | 04 | 07 | 03 | 10 | Film Format | Identifies kind of film stock | $REF | Film type | 2 bytes | Leaf | W25.52 |
| 452 | 04 | 07 | 03 | 11 | Film Aspect Ratio | Specifies image aspect ratio for film | $REF | Pictoral | 3 bytes | Leaf | |
| 453 | 04 | 07 | 03 | 12 | Manufacturer | Specifies manufacturer of film stock | $REF | Unicode String | Variable | Leaf | W25.50 |
| 454 | 04 | 07 | 03 | 13 | Model | Specifies film model number | $REF | Unicode String | Variable | Leaf | W25.52 |
| 455 | 04 | 07 | 03 | 14 | Film gauge and format | The gauge and format of the film eg. 70mm Neg. Blair Videodiscope 48 mps | $REF | ISO 7-bit char string | 32 bytes max | Leaf | |
| 456 | 04 | 07 | 04 | Object Characteristics (Photobricket) | | | $REF | | | Node | |
| 457 | 04 | 07 | 04 | 01 | Device Characteristics | Information about the devices used | $REF | | | Node | |
| 458 | 04 | 07 | 04 | 01 | 01 | Camera Characteristics | Information about camera devices | $REF | | | Node | |
| 459 | 04 | 07 | 04 | 02 | Optical Characteristics | Information about camera optics | $REF | | | Node | |
| 460 | 04 | 07 | 04 | 02 | 01 | Focal Length | Focal length of the lens at time of collection. | $REF | Floating Point | 4 bytes | Leaf | |
| 461 | 04 | 07 | 04 | 02 | 02 | Sensor Size | The size of the sensor - eg. 1/2", 2/3" etc. | $REF | ISO 7-bit char | 4 chars max | Leaf = types dictionary | |
| 462 | 04 | 07 | 04 | 02 | 03 | Lens Aperture | Aperture of the lens at the time of collection | $REF | Floating Point | 4 bytes | Leaf | |

FIG. 21-2

| SMPTE Label | | | | | | Data Element Name | Japanese Names | Data Element Definition | Length # | Type | Value Length | Value Range | Node/Leaf | Defining Document |
|---|---|---|---|---|---|---|---|---|---|---|---|---|---|---|
| 04 | 10 | 01 | 01 | 02 | 00 | Sensor Type Code | CCD Size of Original Signals | Code indicating type of sensor that produced the original video content | #REF# | ISO 7-bit char | 4 chars max | See types dictionary | Leaf | |
| 04 | 10 | 01 | 01 | 02 | 00 | Field of View | Field of View | Sensor field of view, in degrees | #REF# | Floating Point | 4 bytes | | Leaf | |
| 04 | 10 | 01 | 01 | 02 | 00 | Anamorphic lens characteristic | Special Lens | eg Flat, anamorphic | #REF# | ISO 7-bit char | 4 chars max | See types dictionary | Leaf | |
| 04 | 10 | 01 | 02 | 00 | 00 | Optical Test parameters | Optical Test Characteristics | Optical test parameters from the original recording | #REF# | | | | Node | |
| 04 | 10 | 01 | 02 | 01 | 00 | Optical Sensor Characteristics | Sensor Characteristics | Information about the optical sensors used | #REF# | | | | Node | |
| 04 | 10 | 01 | 02 | 01 | 00 | Flare | Flare Characteristics | Flare test measurements | #REF# | Floating Point | 4 bytes | | Leaf | |
| 04 | 10 | 02 | 00 | 00 | 00 | Microphone Characteristics | Microphone Characteristics | Information about microphones used | #REF# | | | | Node | |
| 04 | 10 | 02 | 01 | 01 | 00 | Sensor type | Sensor Type | transducer principle | #REF# | ISO 7-bit char | 4 chars max | See types dictionary | Leaf | |
| 04 | 10 | 02 | 01 | 02 | 00 | Polar characteristic | Polar Characteristics | polar patterns | #REF# | ISO 7-bit char string | 32 bytes max | | Leaf | |
| 04 | 15 | 00 | 00 | 00 | 00 | Image Characteristics | Image Characteristics | The specific category of imagery | #REF# | | | | Node | |
| 04 | 15 | 01 | 00 | 00 | 00 | Image Category | Image Category | identifies the specific category of imagery (often revealing the nature of the collector or intended use). Formats is as defined in NIFF-V2.0 in addition to those defined here. | #REF# | ISO 7-bit char string | 32 bytes max | | Leaf | |
| 04 | 20 | 01 | 00 | 00 | 00 | PROCESS | Class 5 Process | Class 5 is reserved for information about the essence processing | #REF# | | | | Node | |
| 04 | 20 | 01 | 01 | 00 | 00 | Process Indicators | Process Status Flag | flags etc indicating the process status of the essence | #REF# | | | | Node | |
| 04 | 20 | 01 | 01 | 01 | 00 | fundamental | Fundamental Information | Information about process fundamentals | #REF# | | | | Node | |
| 04 | 20 | 01 | 01 | 01 | 00 | integration indicators | Display Segment of A Chip or Shot | A term that describes what the essence is as a unit status of the essence. Terms must be consistent with industry or organizational practices to be useful. Includes a segment of a chip or shot. | #REF# | ISO 7-bit char string | 32 bytes max | | Leaf | |

FIG. 22-1

| | | | | | | | | | |
|---|---|---|---|---|---|---|---|---|---|
| 478 | 05 | 01 | 01 | 00 | 00 | 00 | Quality Flag | | Quality of a specific recording/physical copy (positive good) | #REF! | Boolean | 1 byte | 00h (NO GOOD), FFh (GOOD) | Leaf |
| 479 | 05 | 01 | 01 | 00 | 00 | 00 | Physical Instance Category | | Category of physical copy (e.g., master copy, copy, broadcast copy) | #REF! | ISO 7-bit char string | 32 bytes max | | Leaf |
| 480 | 05 | 02 | 00 | 00 | 00 | 00 | Capture | Duplication Purpose | Information about how content capture | #REF! | | | | Node |
| 481 | 05 | 02 | 01 | 00 | 00 | 00 | Digital or analogue origination | Digital or Analogue Origination | The nature of the first capture of the material | #REF! | ISO 7-bit char string | 32 bytes max | | Leaf |
| 482 | 05 | 02 | 02 | 00 | 00 | 00 | Microphone Placement techniques | Microphone Placement Techniques | spaced stereo, spaced coincident, close miking | #REF! | ISO 7-bit char string | 32 bytes max | | Leaf |
| 483 | 05 | 03 | 00 | 00 | 00 | 00 | Manipulation | Manipulator | Information about how content manipulation | #REF! | | | | Node |
| 484 | 05 | 03 | 01 | 00 | 00 | 00 | Sample Flagging | Number of Alterations | The number of alterations to the original file | #REF! | Uint16 | 2 bytes | | Leaf |
| 485 | 05 | 03 | 02 | 00 | 00 | 00 | Copy Number | Number of Copies | The number of copies (i.e., not lossless clones) | #REF! | Uint8 | 1 byte | 1 to 255 | Leaf |
| 486 | 05 | 03 | 03 | 00 | 00 | 00 | Clone number | Number of Clones | The number of clones (i.e., digitally lossless copies) | #REF! | Uint8 | 1 byte | 1 to 255 | Leaf |
| 487 | 05 | 03 | 04 | 00 | 00 | 00 | Work In Progress Flag | Work In Progress Flag | Is the essence as a work in progress? TRUE/FALSE | #REF! | Boolean | 1 byte | 00h (FALSE), FFh (TRUE) | Leaf |
| 488 | 05 | 03 | 05 | 00 | 00 | 00 | Digital or analogue mix | Digital or Analogue mix | The way in which the first mix down was done - particularly audio | #REF! | | | | Type Node |
| 489 | 05 | 03 | 06 | 00 | 00 | 00 | Digital or analogue mix | Same as 488 | The way in which the first mix down was done - particularly audio | #REF! | ISO 7-bit char string | 32 bytes max | | Leaf |
| 490 | 05 | 04 | 00 | 00 | 00 | 00 | Downstream Processing History | History of Compression for Payload | Audit history of compression for payload | #REF! | | | | Node |
| 491 | 05 | 04 | 01 | 00 | 00 | 00 | Video Compression History | History of Compression for Video Payload | Audit history of compression for video payload | #REF! | | | | Node |
| 492 | 05 | 04 | 02 | 00 | 00 | 00 | Video Compression Algorithm | Video Compression Algorithm | Algorithm used to compress video content | #REF! | ISO 7-bit char | 16 chars max | See types dictionary | Leaf |
| 493 | 05 | 04 | 03 | 00 | 00 | 00 | MPEG-2 dynamic coding historical dataset | Compression Historical Dataset | Algorithm of coding - as SMPTEXXX. | #REF! | as per standard | | | Leaf |
| 494 | 05 | 04 | 04 | 00 | 00 | 00 | Video Noise Reduction Algorithm | Noise Reduction Algorithm | Algorithm used in a noise reduction process | #REF! | ISO 7-bit char | 4 chars max | See types dictionary | Leaf |
| 495 | 05 | 02 | 01 | 00 | 00 | 00 | Kompression | Compression | Specifies video compression | #REF! | AUIO | 16 bytes | | Leaf |

FIG. 22-2

| Line # | SMPTE label | | | | | | Data Element Name | Japanese Names | Data Element Definition | Type | Value Length | Value Range | Node/Leaf | Defining Document |
|---|---|---|---|---|---|---|---|---|---|---|---|---|---|---|
| 496 | 05 | 02 | 02 | 00 | 00 | 00 | Audio Compression History | Audio Compression History | Audit history of compression for audio payload | #REF! | | | Node | |
| 497 | 05 | 02 | 02 | 01 | 00 | 00 | Audio Compression Algorithm | Audio Compression Algorithm | Algorithms used, bitrates used, profiles used. | #REF! ISO 7-bit char | | 4 chars max See types dictionary | Leaf | |
| 498 | 05 | 02 | 02 | 02 | 00 | 00 | MPEG-2 Audio dynamic coding history | Audio Coding History | parameterization per payload, scale factors as per SMPTEXXX | #REF! as per standard | | | Leaf | |
| 499 | 05 | 02 | 02 | 03 | 00 | 00 | Audio Noise Reduction Algorithm | Noise Reduction Algorithm | Algorithm used in a noise reduction process - eg Dolby SR, Telcom, etc | #REF! ISO 7-bit char | | 4 chars max See types dictionary | Leaf | |
| 500 | 05 | 02 | 04 | 00 | 00 | 00 | Data Compression History | Same as 491 | Audit history of compression for payload | #REF! | | | Node | |
| 501 | 05 | 02 | 08 | 00 | 00 | 00 | Metadata Compression History | Metadata Compression History | Audit history of compression for payload. | #REF! | | | Node | |
| 502 | 05 | 02 | 10 | 00 | 00 | 00 | MPEG Processing | MPEG Processing | MPEG processing performed on the essence | #REF! | | | Node | |
| 503 | 05 | 02 | 10 | 01 | 00 | 00 | Splicing Metadata | Splicing Metadata | MPEG-2 splicing metadata as defined in SDTI-CP (E&M) and SMPTE 312M | #REF! as per standard | | | Leaf | |
| 504 | 05 | 02 | 20 | 00 | 00 | 00 | Enhancement or Modification | Enhancement or Modification | Enhancement or modification to the essence | #REF! | | | Node | |
| 505 | 05 | 02 | 20 | 01 | 00 | 00 | Video processing | Modification to The Video Essence | Enhancement or modification to the video essence | #REF! | | | Node | |
| 506 | 05 | 02 | 20 | 01 | 01 | 00 | Enhancement or Modification Description | Modification Description | Description of how video content was modified. | #REF! ISO 7-bit char string | 127 bytes max | | Leaf | |
| 507 | 05 | 02 | 20 | 02 | 00 | 00 | Video processor settings (Device specific) | Device Designation | The settings of a specific device in the system | #REF! | | | Node | |
| 508 | 05 | 02 | 20 | 02 | 01 | 00 | Device kind | Device Kind | Specific description for a device - eg for the film camera, film grading, video camera, variable gain amplifier etc | #REF! ISO 7-bit char string | 32 bytes max | | Leaf | |
| 509 | 05 | 02 | 20 | 02 | 02 | 00 | Device parameter | Device Parameter | Specific parameter for the specified device eg. DensiOgraph, Reel id, coding | #REF! ISO 7-bit char string | 32 bytes max | | Leaf | |
| 510 | 05 | 02 | 20 | 02 | 03 | 00 | Device parameter setting | Same as 510 | The setting of the specific parameter for the specified device | #REF! ISO 7-bit char string | 32 bytes max | | Leaf | |

FIG. 23-1

| | | | | | | | Node |
|---|---|---|---|---|---|---|---|
| 511 | 05 | 20 | 02 | 00 | 00 | Audio Processing | Enhancement or modification to the audio essence | | | Node |
| 512 | 05 | 20 | 02 | 01 | 00 | Enhancement or Modification Description | Audio Modification | Description of How Audio Content Was Modified | #REF# | ISO 7-bit char string | 127 bytes max | Leaf |
| 513 | 05 | 20 | 02 | 02 | 00 | Audio processor settings [Device specific] | Setting of Audio Device | The settings of a specific device in the system | #REF# | | | Node |
| 514 | 05 | 20 | 02 | 02 | 01 | Device kind | Device Kind | Specific description for a device - e.g. The Compressor, limiter, etc. | | ISO 7-bit char string | 32 bytes max | Leaf |
| 515 | 05 | 20 | 02 | 02 | 02 | Device parameter | Device Parameter | Specific parameter for the specified device e.g. Attack, gating | | ISO 7-bit char string | 32 bytes max | Leaf |
| 516 | 05 | 20 | 02 | 02 | 03 | Device parameter setting | Device Parameter Setting | The setting of the specific parameter for the specified device | | ISO 7-bit char string | 32 bytes max | Leaf |
| 517 | 05 | 20 | 03 | 00 | 00 | Data Processing | Data Processing | Enhancement or modification in the data essence | #REF# | | | Node |
| 518 | 05 | 20 | 03 | 01 | 00 | Enhancement or Modification Description | Description of How Data Content Was Modified | Description of how data content was modified | #REF# | ISO 7-bit char string | 127 bytes max | Leaf |
| 519 | 05 | 20 | 03 | 02 | 00 | Data processor settings (Device-specific) | Device Setting | The settings of a specific device in the system | | | | Node |
| 520 | 05 | 20 | 03 | 02 | 01 | Device kind | Device Kind | Specific description for a device | #REF# | ISO 7-bit char string | 32 bytes max | Leaf |
| 521 | 05 | 20 | 03 | 02 | 02 | Device parameter | Device Parameter | Specific parameter for the specified device | #REF# | ISO 7-bit char string | 32 bytes max | Leaf |
| 522 | 05 | 20 | 03 | 02 | 03 | Device parameter setting | Device Parameter Setting | The setting of the specific parameter for the specified device | #REF# | ISO 7-bit char string | 32 bytes max | Leaf |
| 523 | 05 | 20 | 04 | 00 | 00 | Editing Information | Editing Information | Information about alterations to the original image stream. | #REF# | | | Node |
| 524 | 05 | 20 | 04 | 01 | 00 | Editing version information | Editing Version Information | | #REF# | | | Node |
| 525 | 05 | 20 | 04 | 01 | 01 | Version | Version of the Format | Specifies the version of the file format | #REF# | Version Type | 2 bytes | Leaf | W25.52 |
| 526 | 05 | 20 | 04 | 02 | 00 | Editing decisions | Editing Details | | #REF# | | | Node |
| 527 | 05 | 20 | 04 | 02 | 01 | RelativeScope | Content of Change | Specifies relative scope | #REF# | UInt32 | 4 bytes | Leaf | W25.52 |
| 528 | 05 | 20 | 04 | 02 | 02 | RelativeSlot | Change Slot | Specifies slot in scope | #REF# | UInt32 | 4 bytes | Leaf | W25.52 |

FIG. 23-2

| Line # | SMPTE Label | | | | | Data Element Name | Japanese Names | Data Element Definition | Line # Type | Value Length | Value Range | Node/Leaf | Defining Document |
|---|---|---|---|---|---|---|---|---|---|---|---|---|---|
| 529 | 20 | 05 | 03 | 01 | 09 | SourceNodeStartID | Source Signal Motn | Specifies deci.in.node | #REF! BIN32 | 4 bytes | | Leaf | W25.52 |
| 530 | 05 | 04 | 02 | 10 | DeFadeType | Default Fade Type | Specifies the default fade type for audio soft cuts | #REF! FadeType | 2 bytes | | Leaf | W25.52 |
| 531 | 05 | 03 | 03 | 08 | EditingMatteInformation | Editing Matte Information | | #REF! | | | Node | |
| 532 | 05 | 04 | 03 | 08 | HotSpotRect | Editing Matte Type | Specifies matte as a rectangle | #REF! Rectangle | 32 bytes | | Leaf | W25.52 |
| 533 | 05 | 03 | 04 | 08 | Editing event information | Editing Event Information | | #REF! | | | Node | |
| 534 | 05 | 04 | 04 | 08 | Event_Comment | Comment | Describes event | #REF! ByteSting | variable | | Leaf | W25.52 |
| 535 | 05 | 04 | 04 | 08 | ActiveState | Event On/Off | Specifies whether the event turns device on or off | #REF! Boolean | 1 byte | | Leaf | W25.52 |
| 536 | 05 | 03 | 05 | 08 | Editing effect information | Editing Effect Information | | #REF! | | | Node | |
| 537 | 05 | 04 | 05 | 08 | FadeInType | Type of Audio Fade In | Specifies type of audio fade in | #REF! FadeType | 2 bytes | | Leaf | W25.52 |
| 538 | 05 | 04 | 05 | 08 | FadeOutType | Type of Audio Fade Out | Specifies type of audio fade out | #REF! FadeType | 2 bytes | | Leaf | W25.52 |
| 539 | 05 | 04 | 05 | 08 | ControlPoint_Value | Control Point | Specifies a value at specified time | #REF! DataValue | variable | | Leaf | W25.52 |
| 540 | 05 | 04 | 05 | 08 | ConstantValue_Value | Constant Value | Specifies a constant value | #REF! DataValue | variable | | Leaf | W25.52 |
| 541 | 05 | 04 | 05 | 08 | EditHint | Hints | Provides hints useful when control point is edited | #REF! EditHintType | 2 bytes | | Leaf | W25.52 |
| 542 | 05 | 04 | 05 | 08 | IsTimeVarying | Transient Information | Identifies time-varying effects | #REF! Boolean | 1 byte | | Leaf | W25.52 |
| 543 | 05 | 04 | 05 | 08 | Category | Category Information | Identifies category of operation (effect, 3D transform, etc.) | #REF! OpCategories | variable | | Leaf | W25.52 |

FIG. 24-1

| | | | | | | | | | | | |
|---|---|---|---|---|---|---|---|---|---|---|---|
| 544 | 05 | 20 | 10 | 05 | 08 | 00 | 00 | NumberInputs | Number of Input Segments | Specifies number of input segments | #REF# | Int32 | 4 bytes | | Leaf | W25.52 |
| 545 | 05 | 20 | 10 | 05 | 09 | 00 | 00 | Bypass | Bypass Information | Specifies default input to play | #REF# | Int32 | 4 bytes | | Leaf | W25.52 |
| 546 | 05 | 20 | 10 | 06 | 00 | 00 | 00 | Editing web information | Editing Web Information | | #REF# | | | | Node | |
| 547 | 05 | 20 | 10 | 06 | 01 | 00 | 00 | BeginAnchor | Begin | Specifies start of reference | #REF# | Unicode String | variable | | Leaf | W25.52 |
| 548 | 05 | 20 | 10 | 06 | 02 | 00 | 00 | EndAnchor | End | Specifies end of reference | #REF# | Unicode String | variable | | Leaf | W25.52 |
| 549 | 05 | 20 | 10 | 07 | 00 | 00 | 00 | Editing user notes | Editing Notes | | #REF# | | | | Node | |
| 550 | 05 | 20 | 10 | 07 | 01 | 00 | 00 | TaggedValue_Name | Tag Information | Specifies the tag | #REF# | Unicode String | variable | | Leaf | W25.52 |
| 551 | 05 | 20 | 10 | 07 | 02 | 00 | 00 | TaggedValue_Value | Value Information | Specifies the tagged value | #REF# | DataValue | variable | | Leaf | W25.52 |
| 552 | 06 | 00 | 00 | 00 | 00 | 00 | 00 | RELATIONAL | Class 6 Information About The Relationships Between Data | Class 6 is reserved for information about the relationships between data | #REF# | | | | Node | |
| 553 | 06 | 10 | 00 | 00 | 00 | 00 | 00 | Relationships | Relationships | What is being related? | #REF# | | | | Node | |
| 554 | 06 | 10 | 01 | 00 | 00 | 00 | 00 | Relations | Relation Type | Type of relation (e.g. is part of, is an item of (programme, series), remix, remake, ...) | #REF# | | | | Race | |
| 555 | 06 | 10 | 01 | 01 | 00 | 00 | 00 | Essence to Essence | Correlative Value | The relationship value in terms of Parent of, Child of, Item of, Except of, Version of, Compilation of, etc. | #REF# | ISO 7-bit char string | 32 bytes max | | Node | |
| 556 | 06 | 10 | 01 | 01 | 01 | 00 | 00 | Source Material | Source Material | For asset tracking | #REF# | | | | Node | |
| 557 | 06 | 10 | 01 | 01 | 01 | 01 | 00 | Source Material UMID | UMID | For asset tracking | #REF# | UMID | | | Leaf | |
| 558 | 06 | 10 | 01 | 01 | 02 | 00 | 00 | Source Material | Source Material | For asset tracking | #REF# | ISO 7-bit char string | 32 bytes max | | Leaf | |
| 559 | 06 | 10 | 01 | 01 | 02 | 01 | 00 | Most Recent Edit Text | Most Recent Edit Text | For asset tracking | #REF# | | | | Node | |
| 560 | 06 | 10 | 01 | 01 | 02 | 02 | 00 | Most recent edit UMID | Most Recent UMID | For asset tracking | #REF# | UMID | | | Leaf | |
| 561 | 06 | 10 | 01 | 01 | 02 | 02 | 01 | Most recent edit text | Same as 559 | For asset tracking | #REF# | ISO 7-bit char string | 32 bytes max | | Leaf | |

FIG. 24-2

| Line # | SMPTE Label | | | | | | Data Element Name | Japanese Names | Data Element Definition | Type | Value Length | Value Range | Node/Leaf | Defining Document |
|---|---|---|---|---|---|---|---|---|---|---|---|---|---|---|
| 562 | 06 | 01 | 01 | 04 | 01 | 00 | Materials to Essence | Metadata to Essence | The relationship between metadata and essence | #REF! | | | Node | |
| 563 | 06 | 01 | 01 | 04 | 02 | 00 | Metadata to Metadata | Metadata To Metadata | The relationship value in terms of Parent of, Child of, etc. | #REF! | | | Node | |
| 564 | 06 | 01 | 01 | 04 | 03 | 00 | Object to Object | Object To Object | The relationship value in terms of Parent of, Child of, Item of | #REF! | | | Node | |
| 565 | 06 | 01 | 01 | 04 | 05 | 00 | Metadata to Object | Metadata To Object | The relationship between metadata and an object | #REF! | | | Node | |
| 566 | 06 | 01 | 02 | 00 | 00 | 00 | Related production materials | Related To Production Material | Related production materials | #REF! | | | Node | |
| 567 | 06 | 01 | 02 | 01 | 00 | 00 | Programme support material | Relation To Support Material | eg printed educational material | #REF! | 127 bytes max | | Leaf | |
| 568 | 06 | 01 | 02 | 02 | 00 | 00 | Programme advertising material | Relation To Advertising Material | eg printed advertising material | #REF! | 127 bytes max | | Leaf | |
| 569 | 06 | 01 | 02 | 03 | 00 | 00 | Programme commercial material | Relation To Commercial Material | eg Mugs, T-shirts, recordings | #REF! | 127 bytes max | | Leaf | |
| 570 | 06 | 01 | 03 | 00 | 00 | 00 | Numerical sequence | Information About Numerical Sequence | Information about numerical sequences | #REF! | | | Node | |
| 571 | 06 | 01 | 03 | 01 | 00 | 00 | Numerical position in sequence | Numerical Sequence | 1, 2, 3 etc | #REF! | 4 bytes | | Leaf | |
| 572 | 06 | 01 | 03 | 02 | 00 | 00 | Relative position in sequence (label) | Offset Information | Position of object | #REF! | 16n132 | | Leaf | |
| 573 | 06 | 01 | 03 | 03 | 00 | 00 | Relative position in sequence (descriptive) | Previous, Next Information | previous, next etc | #REF! | 16n132 | | Leaf | |
| 574 | 06 | 01 | 03 | 04 | 00 | 00 | Relative position in sequence (descriptive) | Previous, Next Information | previous, next etc | #REF! | 32 bytes max | | Type Node | |
| 575 | 06 | 01 | 04 | 00 | 00 | 00 | Relationship structures | Relationship of Structure | | #REF! | | | Leaf | |
| 576 | 06 | 01 | 04 | 01 | 00 | 00 | Containing relations | Containing Relations | | #REF! | | | Node | |

FIG. 25-1

| | | | | | | Contains one | Content Itself? | #REF? | | Mode | |
|---|---|---|---|---|---|---|---|---|---|---|---|
| 577 | 06 | 02 | 01 | 01 | 01 | Contains one | | #REF? | | | |
| 578 | 06 | 04 | 01 | 01 | 01 | StillFrame | Still Frame | StrongReference | N/A | SourceReference | Leaf | W25.52 |
| 579 | 06 | 04 | 01 | 01 | 02 | HotSpotMode | Hot Spot Mode | StrongReference | N/A | SourceClip | Leaf | W25.52 |
| 580 | 06 | 04 | 01 | 02 | 01 | Annotation | Annotation | StrongReference | N/A | SourceReference | Leaf | W25.52 |
| 581 | 06 | 04 | 01 | 03 | 01 | Rendering | Rendering | StrongReference | N/A | SourceReference | Leaf | W25.52 |
| 582 | 06 | 04 | 01 | 05 | 01 | InputSegment | Pulldown | StrongReference | N/A | Segment | Leaf | W25.52 |
| 583 | 06 | 04 | 01 | 06 | 01 | Selected | Selection | StrongReference | N/A | Segment | Leaf | W25.52 |
| 584 | 06 | 04 | 01 | 07 | 01 | OperationGroup | Effect Used In The Transition | StrongReference | N/A | OperationGroup | Leaf | W25.52 |
| 585 | 06 | 04 | 01 | 08 | 01 | ManufacturerInfo | Web Address | StrongReference | 16 bytes | NetworkLocator | Leaf | W25.52 |
| 586 | 06 | 04 | 01 | 09 | 01 | Content | Content Mob | StrongReference | N/A | ContentStorage | Leaf | W25.52 |
| 587 | 06 | 04 | 01 | 0A | 01 | Dictionary | Content Definitions | StrongReference | N/A | Dictionary | Leaf | W25.52 |
| 588 | 06 | 04 | 01 | 0B | 01 | EssenceDescription | Essence Definitions | StrongReference | N/A | EssenceDescriptor | Leaf | W25.52 |
| 589 | 06 | 04 | 01 | 0C | 01 | Segment | Segment Definitions | StrongReference | N/A | Segment | Leaf | W25.52 |
| 590 | 06 | 04 | 01 | 00 | 01 | Contains set | Contains Set | #REF? | | | Node | |
| 591 | 06 | 04 | 01 | 21 | 01 | Parameters | Parameter | StrongReferenceSet | N/A | Parameter | Leaf | W25.52 |
| 592 | 06 | 04 | 01 | 22 | 01 | Alternates | Alternate in Segment | StrongReferenceSet | N/A | Segment | Leaf | W25.52 |
| 593 | 06 | 04 | 01 | 23 | 01 | Mobs | Mobs | StrongReferenceSet | N/A | Mob | Leaf | W25.52 |
| 594 | 06 | 04 | 01 | 24 | 01 | EssenceData | Essence Data | StrongReferenceSet | N/A | EssenceData | Leaf | W25.52 |

FIG. 25-2

| Line # | SMPTE Label | | | | | | Data Element Name | Japanese Names | Data Element Definition | Type | Value Length | Value Range | Node/Leaf | Defining Document |
|---|---|---|---|---|---|---|---|---|---|---|---|---|---|---|
| 595 | 06 | 04 | 01 | 01 | 02 | 00 | Properties | Properties | Contains properties defined for class | #REF! StrongReferenceSet | N/A | PropertyDefinitions | Leaf | W25.32 |
| 596 | 06 | 04 | 01 | 01 | 02 | 00 | Locators | Locators | Specifies location of pixels | #REF! StrongReferenceSet | N/A | Locator | Leaf | W25.32 |
| 597 | 06 | 04 | 01 | 01 | 03 | 00 | ClassDefinitions | Class Definitions | Contains class definitions | #REF! StrongReferenceSet | N/A | ClassDefinition | Leaf | W25.32 |
| 598 | 06 | 04 | 01 | 01 | 02 | 00 | TypeDefinitions | Type Definitions | Contains type definitions | #REF! StrongReferenceSet | N/A | TypeDefinition | Leaf | W25.32 |
| 599 | 06 | 04 | 01 | 01 | 02 | 00 | OperationDefinitions | Operation Definitions | Contains operation definitions | #REF! StrongReferenceSet | N/A | OperationDefinition | Leaf | W25.32 |
| 600 | 06 | 04 | 01 | 01 | 02 | 00 | ParameterDefinitions | Parameter Definitions | Contains operation parameter definitions | #REF! StrongReferenceSet | N/A | ParameterDefinition | Leaf | W25.32 |
| 601 | 06 | 04 | 01 | 01 | 02 | 00 | DataDefinitions | Data Definitions | Contains data definitions | #REF! StrongReferenceSet | N/A | DataDefinition | Leaf | W25.32 |
| 602 | 06 | 04 | 01 | 01 | 02 | 00 | PluginDescriptors | Plugin Descriptors | Contains plugin descriptors | #REF! StrongReferenceSet | N/A | PluginDescriptor | Leaf | W25.32 |
| 603 | 06 | 04 | 01 | 01 | 02 | 00 | CodecDefinitions | Codec Definitions | Contains codec definitions | #REF! StrongReferenceSet | N/A | CodecDefinition | Leaf | W25.32 |
| 604 | 06 | 04 | 01 | 01 | 02 | 00 | ContainerDefinitions | Container Definitions | Contains container definitions | #REF! StrongReferenceSet | N/A | ContainerDefinition | Leaf | W25.32 |
| 605 | 06 | 04 | 01 | 01 | 02 | 00 | InterpolationDefinitions | Interpolation Definitions | Contains interpolation definitions | #REF! StrongReferenceSet | N/A | InterpolationDefinition | Leaf | W25.32 |
| 606 | 06 | 04 | 01 | 01 | 02 | 00 | UserComments | Comments | Contains user comments about mob | #REF! StrongReferenceSet | N/A | TaggedValue | Leaf | W25.32 |
| 607 | 06 | 04 | 01 | 01 | 03 | 00 | Contains ordered set | Contains Sequence | | | | | Node | |
| 608 | 06 | 04 | 01 | 01 | 03 | 00 | Choices | Format Specifications | Specifies same essence in different formats | #REF! StrongReferenceSet | N/A | SourceReference | Leaf | W25.32 |
| 609 | 06 | 04 | 01 | 01 | 03 | 00 | InputSegments | Input Segment | Specifies the input to the operation | #REF! StrongReferenceSet | N/A | Segment | Leaf | W25.32 |

FIG. 26-1

| | | | | | | | | | | | |
|--|--|--|--|--|--|--|--|--|--|--|--|
| 610 | 05 | 03 | 01 | 03 | 01 | 04 | NestedScope_Slots | Specifies slots for nesting | StrongReferenceVector-NA | | Segment | |
| 611 | 05 | 03 | 02 | | | | | | #REF! | | | |
| 612 | 05 | 04 | | | | | Components | Specifies items to be put in sequence | StrongReferenceVector-NA | | Component | Leaf | W25.52 |
| | 06 | 04 | 01 | | | | | | #REF! | | | |
| 613 | 06 | 04 | 01 | 03 | 01 | 05 | Locator | Specifies locations of essence data | StrongReferenceVector-NA | | Locator | Leaf | W25.52 |
| | 06 | 04 | 02 | | | | | | #REF! | | | |
| 614 | 06 | 04 | 02 | 03 | 01 | 06 | IdentificationList | Identifies the time and application modifying the container | StrongReferenceVector-NA | | Identification | Leaf | W25.52 |
| | 06 | 04 | 03 | | | | | | #REF! | | | |
| 615 | 06 | 04 | 03 | 03 | 01 | 07 | Mob_Slots | Contains the slots in the mob | StrongReferenceVector-NA | | MobSlot | Leaf | W25.52 |
| | 06 | 04 | 04 | | | | | | #REF! | | | |
| 616 | 06 | 04 | 04 | 03 | 01 | 08 | PointList | Specifies the values at specific points in tree | StrongReferenceVector-NA | | ControlPoint | Leaf | W25.52 |
| | 06 | 04 | 05 | | | | | | #REF! | | | |
| 617 | 06 | 04 | 05 | 03 | 01 | 09 | Contains stream of data | Contains stream of Data | #REF! | | | Node | |
| | 06 | 04 | 06 | | | | | | DataStream | variable | | | |
| 618 | 06 | 04 | 06 | 03 | 01 | 10 | Data | Contains essence data | #REF! | | | Leaf | W25.52 |
| | 06 | 04 | 07 | | | | | | PositionArray | variable | | | |
| 619 | 06 | 04 | 07 | 03 | 01 | 10 | SampleIndex | Contains index to essence data | #REF! | | | Leaf | W25.52 |
| | 06 | 04 | 08 | | | | | | | | | | |
| 620 | 06 | 04 | 08 | 03 | 02 | 01 | Weak reference relation | Weak reference to one object | #REF! | | | Node | |
| | 06 | 04 | 09 | | | | | | | | | | |
| 621 | 06 | 04 | 09 | 03 | 02 | 01 | Generation | Unique identifier used to differentiate versions of the same object | WeakReference | 16 bytes | Identification | Leaf | W25.52 |
| 622 | 06 | 04 | 01 | 03 | 02 | 02 | DataDefinition | Specifies the basic kind of data of the essence | WeakReference | 16 bytes | DataDefinition | Leaf | W25.52 |
| 623 | 06 | 04 | 01 | 03 | 02 | 03 | OperationDefinition | Specifies the operation to be performed | WeakReference | 16 bytes | OperationDefinition | Leaf | W25.52 |
| 624 | 06 | 04 | 01 | 03 | 02 | 04 | SourceID | Specifies mob | WeakReference | 16 bytes | Mob | Leaf | W25.52 |
| 625 | 06 | 04 | 01 | 03 | 02 | 05 | ControlPoint_Type | Effect Type | Specifies data type of effect control | WeakReference | 16 bytes | TypeDefinition | Leaf | W25.52 |
| 626 | 06 | 04 | 01 | 03 | 02 | 06 | OperationDefinition_DataDefinition | ID After Editing | Identifies essence type produced by operation | WeakReference | 16 bytes | DataDefinition | Leaf | W25.52 |
| 627 | 06 | 04 | 01 | 07 | 02 | 01 | ParameterDefinition_Type | Control Type | Specifies data type of effect control | WeakReference | 16 bytes | TypeDefinition | Leaf | W25.52 |

FIG. 26-2

| Line # | SMPTE Label | | | | | | Data Element Name | Japanese Names | Data Element Definition | Type | Value Length | Value Range | Model Leaf | Defining Document |
|---|---|---|---|---|---|---|---|---|---|---|---|---|---|---|
| 629 | 06 | 0E | 2B | 34 | 01 | 01 | PropertyDefinition_Type | Property | Specifies data type of property | WeakReference | 16 bytes | TypeDefinition | Leaf | W25.52 |
| 630 | 06 | 0E | 2B | 34 | 01 | 01 | CategoryClass | Category | Specifies definition object associated with plugin | WeakReference | 16 bytes | DefinitionObject | Leaf | W25.52 |
| 631 | 06 | 0E | 2B | 34 | 01 | 01 | FileDescriptorClass | File Descriptor | Identifies FileDescriptor associated with codec | WeakReference | 16 bytes | ClassDefinition | Leaf | W25.52 |
| 632 | 06 | 0E | 2B | 34 | 01 | 01 | MobID | Mob ID | Specifies mob that describes essence | WeakReference | 16 bytes | Mob | Leaf | W25.52 |
| 633 | 06 | 0E | 2B | 34 | 01 | 01 | ContainerFormat | Container Format | Specifies container definition | WeakReference | 16 bytes | ContainerDefinition | Leaf | W25.52 |
| 634 | 06 | 0E | 2B | 34 | 01 | 01 | Definition | Parameter Definition | Specifies the Parameter Definition | WeakReference | 16 bytes | ParameterDefinition | Leaf | W25.52 |
| 635 | 06 | 0E | 2B | 34 | 01 | 01 | Parameter_Type | Type Of The Parameter | Specifies the data type of the parameter | WeakReference | 16 bytes | TypeDefinition | Leaf | W25.52 |
| 636 | 06 | 0E | 2B | 34 | 01 | 01 | Interpolation | Interpolation | Specifies interpolation method to use | WeakReference | 16 bytes | InterpolationDefinition | Leaf | W25.52 |
| 637 | 06 | 0E | 2B | 34 | 01 | 01 | TaggedValue_Type | Data Type | Specifies the data type of the value | WeakReference | 16 bytes | TypeDefinition | Leaf | W25.52 |
| 638 | 06 | 0E | 2B | 34 | 01 | 01 | TypeDefinitionStrongObjectReference_ReferencedClass | Strong Pertinent of Object | Specifies the class of the referenced object | WeakReference | | ClassDefinition | Leaf | W25.52 |
| 639 | 06 | 0E | 2B | 34 | 01 | 01 | TypeDefinitionWeakObjectReference_ReferencedClass | Weak Pertinent of Object | Specifies the class of the referenced object | WeakReference | | ClassDefinition | Leaf | W25.52 |
| 640 | 06 | 0E | 2B | 34 | 01 | 01 | TypeDefinitionEnumeration_ElementType | Underlying Segment Type | Specifies the underlying type | WeakReference | | TypeDefinition | Leaf | W25.52 |
| 641 | 06 | 0E | 2B | 34 | 01 | 01 | TypeDefinitionFixedArray_ElementType | Type of Variable Allay Element | Specifies the type of the array element | WeakReference | | TypeDefinition | Leaf | W25.52 |
| 642 | 06 | 0E | 2B | 34 | 01 | 01 | TypeDefinitionVariableArray_ElementType | Type of Fixed Allay Element | Specifies the type of the array element | WeakReference | | TypeDefinition | Leaf | W25.52 |
| 643 | 06 | 0E | 2B | 34 | 01 | 01 | TypeDefinitionSet_ElementType | Specifies The Type of Set | Specifies the type of the set | WeakReference | | TypeDefinition | Leaf | W25.52 |

| Line # | SMPTE label | | | | | Data Element Name | Japanese Names | Data Element Definition | Type | Value Length | Value Range | Node/Leaf | Defining Document |
|---|---|---|---|---|---|---|---|---|---|---|---|---|---|
| 551 | 06 | 0E | 04 | 01 | 00 | Property definition | Properties | | aREF1 | | | Node | |
| 552 | 06 | 0E | 04 | 01 | 01 | IsBrowsable | Hints | Permisses hints for database access | aREF1 | 1 byte | | Leaf | W25.52 |
| 553 | 06 | 0E | 04 | 01 | 02 | IsOptional | Optional or Mandatory | Specifies whether property is optional or mandatory | Boolean | 1 byte | | Leaf | W25.52 |
| 554 | 06 | 0E | 04 | 01 | 03 | DefaultValue | Default Condition | Specifies default value if optional property is omitted | DataValue | variable | | Leaf | W25.52 |
| 555 | 06 | 0E | 04 | 01 | 04 | LocalIdentification | Local ID | Specifies local identification for property | UInt32 | 4 bytes | | Leaf | W25.52 |
| 556 | 06 | 0E | 04 | 02 | 00 | Type definition | Type Definition | | aREF1 | | | Node | |
| 557 | 06 | 0E | 04 | 02 | 01 | Size | Size | Specifies the number of bytes in the integer | UInt | | | Leaf | W25.52 |
| 558 | 06 | 0E | 04 | 02 | 02 | IsSigned | Specified Size | Specifies if the integer is signed | Boolean | | | Leaf | W25.52 |
| 559 | 06 | 0E | 04 | 02 | 03 | TypeDefinitionEnumeration_Element_Names | Element Name | Specifies the names of the enumerated values | StringArray | | | Leaf | W25.52 |
| 560 | 06 | 0E | 04 | 02 | 04 | TypeDefinitionEnumeration_Element_Values | Element Name | Specifies the values | Array of Int64 | | | Leaf | W25.52 |
| 561 | 06 | 0E | 04 | 02 | 05 | ElementCount | Number of Elements In The Array | Specifies the number of elements in the array | UInt32 | | | Leaf | W25.52 |
| 562 | 06 | 0E | 04 | 02 | 06 | MemberNames | Member Names | Specifies the names of the fields in the record | StringArray | | | Leaf | W25.52 |
| 563 | 06 | 0E | 04 | 02 | 07 | TypeDefinitionExtendibleEnumeration_Extension_Names | Extension Name | Specifies the names of the enumerated values | StringArray | | | Leaf | W25.52 |
| 564 | 06 | 0E | 04 | 02 | 08 | TypeDefinitionExtendibleEnumeration_Extension_Values | Extension Name | Specifies the SMPTE labels or AUIDs | AUIDArray | | | Leaf | W25.52 |
| 565 | 06 | 0E | 04 | 02 | 09 | Instance descriptions | Instance Description | | aREF1 | | | Node | |

FIG. 28-1

| | | | | | Description | Description | | | | |
|---|---|---|---|---|---|---|---|---|---|---|
| 676 | 06 | 0E | 2B | 34 | 01 | Description | Provides informative description | aREF | Unicode String | variable | Leaf | W25.52 |
| 677 | 06 | 0E | 2B | 34 | 01 | Contains definitions | Container Definitions | | | | Node | |
| 678 | 06 | 0E | 2B | 34 | 01 | EssenceIsIdentified | Essence Label | Specifies that the container format identifies essence with SMPTE label or other AUID | aREF | Boolean | 1 byte | Leaf | W25.52 |
| 679 | 06 | 0E | 2B | 34 | 01 | Related code objects | Code Objects | | aREF | | | Node | |
| 680 | 06 | 0E | 2B | 34 | 01 | Relations to plugin code objects | Plugin Code Objects | | aREF | | | Node | |
| 681 | 06 | 0E | 2B | 34 | 01 | Name | Name | Specifies name of plugin | aREF | Unicode String | variable | Leaf | W25.52 |
| 682 | 06 | 0E | 2B | 34 | 01 | PluginDescriptor_Identification | Plugin | Specifies SMPTE label or GUID identifying plugin | aREF | AUID | 16 bytes | Leaf | W25.52 |
| 683 | 06 | 0E | 2B | 34 | 01 | Description | Description | Provides informative description | aREF | Unicode String | variable | Leaf | W25.52 |
| 684 | 06 | 0E | 2B | 34 | 01 | VersionNumber | Version Number | Specifies version number of plugin code | aREF | VersionType | 2 bytes | Leaf | W25.52 |
| 685 | 06 | 0E | 2B | 34 | 01 | VersionString | Version String | Specifies string version number of plugin code | aREF | Unicode String | variable | Leaf | W25.52 |
| 686 | 06 | 0E | 2B | 34 | 01 | Manufacturer | Manufacturer | Specifies manufacturer of plugin | aREF | Unicode String | variable | Leaf | W25.52 |
| 687 | 06 | 0E | 2B | 34 | 01 | ManufacturerID | Manufacturer ID | Specifies SMPTE label or GUID identifying manufacturer | aREF | AUID | 16 bytes | Leaf | W25.52 |
| 688 | 06 | 0E | 2B | 34 | 01 | Platform | Platform | Specifies hardware platform for plugin | aREF | AUID | 16 bytes | Leaf | W25.52 |
| 689 | 06 | 0E | 2B | 34 | 01 | MinPlatformVersion | Platform Version | Specifies minimum OS version for plugin | aREF | VersionType | 2 bytes | Leaf | W25.52 |
| 690 | 06 | 0E | 2B | 34 | 01 | MaxPlatformVersion | Platform OS Version | Specifies maximum OS version for plugin | aREF | VersionType | 2 bytes | Leaf | W25.52 |
| 691 | 06 | 0E | 2B | 34 | 01 | Engine | Plugin Engine | Specifies plugin engine | aREF | AUID | 16 bytes | Leaf | W25.52 |
| 692 | 06 | 0E | 2B | 34 | 01 | MinEngineVersion | Minengine Version | Specifies minimum plugin engine version | aREF | VersionType | 2 bytes | Leaf | W25.52 |
| 693 | 06 | 0E | 2B | 34 | 01 | MaxEngineVersion | Maxengine Version | Specifies maximum plugin engine version | aREF | VersionType | 2 bytes | Leaf | W25.52 |

FIG. 28-2

| SMPTE Label | | | | | | | Line # | Data Element Name | Japanese Names | Data Element Definition | Line # | Type | Value Length | Value Range | Node/Leaf | Defining Document |
|---|---|---|---|---|---|---|---|---|---|---|---|---|---|---|---|---|
| 06 | 0E | 2B | 34 | 01 | 01 | 01 | 694 | PluginAPI | Plugin API | Specifies plugin API | #REF! | AUID | 16 bytes | | Leaf | W25.52 |
| 06 | 0E | 2B | 34 | 01 | 01 | 01 | 695 | MinPluginAPI | MinPlugin API | Specifies minimum API version | #REF! | VersionType | 2 bytes | | Leaf | W25.52 |
| 06 | 0E | 2B | 34 | 01 | 01 | 01 | 696 | MaxPluginAPI | MaxPlugin API | Specifies maximum API version | #REF! | VersionType | 2 bytes | | Leaf | W25.52 |
| 06 | 0E | 2B | 34 | 01 | 01 | 01 | 697 | SoftwareOnly | Software | Specifies plugin can function without specialized hardware | #REF! | Boolean | 1 byte | | Leaf | W25.52 |
| 06 | 0E | 2B | 34 | 01 | 01 | 01 | 698 | Accelerator | Accelerator | Specifies plugin is optimized for specialized hardware | #REF! | Boolean | 1 byte | | Leaf | W25.52 |
| 06 | 0E | 2B | 34 | 01 | 01 | 01 | 699 | Authentication | Authentication | Specifies whether the plugin uses authentication | #REF! | Boolean | 1 byte | | Leaf | W25.52 |
| 06 | 0E | 2B | 34 | 01 | 01 | 01 | 700 | Relations to application code objects | Relations To Application Code | | #REF! | | | | Node | |
| 06 | 0E | 2B | 34 | 01 | 01 | 01 | 701 | CompanyName | Company Name | Specifies the name of company supplying the application | #REF! | Unicode String | variable | | Leaf | W25.52 |
| 06 | 0E | 2B | 34 | 01 | 01 | 01 | 702 | ProductName | Product Name | Specifies the application name | #REF! | Unicode String | variable | | Leaf | W25.52 |
| 06 | 0E | 2B | 34 | 01 | 01 | 01 | 703 | ProductUID | Product Number | Specifies the SMPTE Label or GUID identifying the product | #REF! | AUID | 16 bytes | | Leaf | W25.52 |
| 06 | 0E | 2B | 34 | 01 | 01 | 01 | 704 | ProductVersion | Product Version | Specifies the application version | #REF! | ProductVersion | 10 bytes | | Leaf | W25.52 |
| 06 | 0E | 2B | 34 | 01 | 01 | 01 | 705 | ProductVersionString | Product Version String | Specifies a printable product version string | #REF! | Unicode String | variable | | Leaf | W25.52 |
| 06 | 0E | 2B | 34 | 01 | 01 | 01 | 706 | ToolkitVersion | Toolkit Version | Specifies version number of toolkit | #REF! | ProductVersion | 10 bytes | | Leaf | W25.52 |
| 06 | 0E | 2B | 34 | 01 | 01 | 01 | 707 | Platform | Platform | Specifies hardware and OS platform application was on | #REF! | Unicode String | variable | | Leaf | W25.52 |
| 06 | 0E | 2B | 34 | 01 | 01 | 01 | 708 | SPATIO-TEMPORAL | Class / Space and Time | Class 7 is reserved for information about space and time | #REF! | | | | Node | |

FIG. 29-1

| | | | | | Position and Space Vectors | | Information about position in space and associated vectors (e.g. aty) | | | | Node |
|---|---|---|---|---|---|---|---|---|---|---|---|
| 7T | 07 | 01 | 00 | 00 | 00 | Position and Space Vectors | Information about position in space and associated vectors (e.g. aty) | | | | Node |
| 711 | 07 | 01 | 01 | 00 | 00 | Image Coordinate System | Indicates the geo-referenced coordinate system for the image. | #REF! | ISO 7-bit char | 4 chars max | See types dictionary | Leaf |
| 712 | 07 | 01 | 02 | 00 | 00 | Map Datum Used | Identifies the map datum used to derive the coordinates (UTM or GEO). | #REF! | ISO 7-bit char | 4 chars max | See types dictionary | Leaf |
| 713 | 07 | 01 | 03 | 00 | 00 | Absolute Position | Absolute positional information | #REF! | | | | Node |
| 714 | 07 | 01 | 03 | 01 | 00 | Local Datum Absolute Position | The absolute position of a local datum | #REF! | | | | Node |
| 715 | 07 | 01 | 03 | 01 | 01 | Local Reference Positional Accuracy | The accuracy with which the measurement of absolute position of the local datum is made | #REF! | Floating Point | 4 bytes | | Leaf |
| 716 | 07 | 01 | 03 | 02 | 00 | Device Absolute Position | The absolute position of the essence-capturing device | #REF! | | | | Node |
| 717 | 07 | 01 | 03 | 02 | 01 | Device Absolute Positional Information | Accuracy of frame sensor coordinates as a Circular Error Probable (CEP) [504]. | #REF! | Floating Point | 4 bytes | | Leaf |
| 718 | 07 | 01 | 03 | 02 | 02 | Device Altitude | Altitude of sensor as measured from Mean Sea Level (ASL) | #REF! | Floating Point | 4 bytes | | Leaf |
| 718 | 07 | 01 | 03 | 02 | 03 | Device Altitude (metres, concise) | As above | #REF! | Binary | 4 bytes | As per SMPTE 331M [UMID] | Leaf |
| 719 | 07 | 01 | 03 | 02 | 04 | Device Latitude | Specifies a sensor's geographic location in degrees of latitude. Positive values indicate northern hemisphere, negative values indicate southern hemisphere. | #REF! | Floating Point | 4 bytes | | Leaf |
| 720 | 07 | 01 | 03 | 02 | 05 | Device Latitude (degrees, concise) | As above | #REF! | Binary | 4 bytes | As per SMPTE 331M [UMID] | Leaf |
| 721 | 07 | 01 | 03 | 02 | 06 | Device Longitude (degrees) | Specifies a sensor's geographic location in degrees of longitude. Positive values indicate eastern hemisphere, negative values indicate western hemisphere. | #REF! | Floating Point | 4 bytes | | Leaf |
| 722 | 07 | 01 | 03 | 02 | 07 | Device Longitude (degrees, concise) | As above | #REF! | Binary | 4 bytes | As per SMPTE 331M [UMID] | Leaf |
| 723 | 07 | 01 | 03 | 02 | 10 | Device X Dimension (m) | Specifies the sensor location along the x-axis in Earth Centered, Earth Fixed (ECEF) Cartesian coordinates. | #REF! | Floating Point | 4 bytes | | Leaf |
| 724 | 07 | 01 | 03 | 02 | 11 | Device Y Dimension (m) | Specifies the sensor location along the y-axis in Earth Centered, Earth Fixed (ECEF) Cartesian coordinates. | #REF! | Floating Point | 4 bytes | | Leaf |
| 725 | 07 | 01 | 03 | 03 | 00 | Subject Absolute Position | The absolute position of the subject depicted in the essence | #REF! | | | | Node |
| 726 | 07 | 01 | 03 | 03 | 01 | Frame Positional Accuracy (m) | Accuracy of frame center coordinates as a Circular Error Probable (CEP) [504]. | #REF! | Floating Point | 4 bytes | | Leaf |

FIG. 29-2

| SMPTE label | | | | | | | Data Element Name | Japanese Names | Data Element Definition | Type | Value Length | Value Range | Node/Leaf | Defining Document |
|---|---|---|---|---|---|---|---|---|---|---|---|---|---|---|
| 727 | 07 | 01 | 02 | 03 | 02 | 04 | Frame Center Latitude (degrees) | Frame Center Latitude | Specifies the video frame center point geographic location in degrees of latitude. Positive values indicate northern hemisphere, negative values indicate southern hemisphere. | {REF} Floating Point | 4 bytes | | Leaf | |
| 728 | 07 | 01 | 02 | 03 | 02 | 05 | Frame Center Latitude (degrees, concise) | Frame Center Latitude | As above | {REF} Binary | 4 bytes | As per SMPTE 331M (UMID) | Leaf | |
| 729 | 07 | 01 | 02 | 03 | 02 | 06 | Frame Center Longitude (degrees) | Frame Center Longitude | Specifies the video frame center point geographic location in degrees of longitude. Positive values indicate eastern hemisphere, negative values indicate western hemisphere. | {REF} Floating Point | 4 bytes | | Leaf | |
| 730 | 07 | 01 | 02 | 03 | 02 | 07 | Frame Center Longitude (degrees, concise) | Frame Center Longitude | As above | {REF} Binary | 4 bytes | As per SMPTE 331M (UMID) | Leaf | |
| 731 | 07 | 01 | 02 | 03 | 02 | 08 | Frame Center Lat-Long | Frame Center Lat-Long | Specifies a video frame center point geographic location: Latitude and Longitude. | {REF} ISO 7 bit char | 14 bytes | Format is ddmmss.ddNdmmss.dY, where 'dd' is degrees latitude, 'dY' is... | Leaf | |
| 732 | 07 | 01 | 02 | 03 | 02 | 09 | Relative Position | Relative Position | Relative positional information | {REF} | | | Node | |
| 733 | 07 | 01 | 02 | 03 | 02 | 0A | Local Datum Relative Position | Local Datum Relative Position | The relative position of a local datum to another specified datum | {REF} | | | Node | |
| 734 | 07 | 01 | 02 | 03 | 02 | 0B | Local Datum Relative Positional Accuracy | Local Datum Positional Accuracy | The accuracy with which the measurement of relative position of the local datum is made | {REF} Floating Point | 4 bytes | | Leaf | |
| 735 | 07 | 01 | 02 | 03 | 02 | 0C | Device Relative Position | Device Relative Position | The absolute position of the essence-capturing device | {REF} | | | Node | |
| 736 | 07 | 01 | 02 | 03 | 02 | 0D | Device Relative Positional Accuracy | Device Relative Positional Accuracy | Accuracy of frame center coordinates | {REF} Floating Point | 4 bytes | | Leaf | |
| 737 | 07 | 01 | 02 | 03 | 02 | 0E | Device Relative Position X (metres) | Device Relative Position X | Denoted by "X" a translational position of the camera from a local datum Absolute Position. Positive values indicate translations in which the camera has physically moved from right to left. | {REF} Floating Point | 4 bytes | | Leaf | |
| 738 | 07 | 01 | 02 | 03 | 02 | 0F | Device Relative Position Y (metres) | Device Relative Position Y | Denoted by the Y translational position of the camera from a local datum absolute position. Positive values indicate translations in which the camera has physically moved to a higher position. | {REF} Floating Point | 4 bytes | | Leaf | |
| 739 | 07 | 01 | 02 | 03 | 02 | 10 | Device Relative Position Z (metres) | Device Relative Position Z | Denoted by the Z translational position of the camera from a local datum Absolute Position. Positive values shall indicate translations in which the camera has physically moved towards the... | {REF} Floating Point | 4 bytes | | Leaf | |
| 740 | 07 | 01 | 02 | 03 | 02 | 11 | Subject Relative Position | Subject Relative Position | The position of the subject depicted in the essence relative to another specified datum | {REF} | | | Node | |
| 741 | 07 | 01 | 02 | 03 | 02 | 12 | Subject Relative Positional Accuracy (metres) | Subject Relative Positional Accuracy | The accuracy with which the measurement of relative position of the subject is made | {REF} Floating Point | 4 bytes | | Leaf | |

FIG. 30-1

| | | | | | | | | | Image Positional Information | positional information relating to a subset of the whole image | #REF# | | | Mode |
|---|---|---|---|---|---|---|---|---|---|---|---|---|---|---|
| 742 | 07 | 01 | 00 | 00 | 00 | 00 | 00 | 00 | Image Positional Information | positional information relating to a subset of the whole image | #REF# | | | Mode |
| 743 | 07 | 01 | 01 | 00 | 00 | 00 | 00 | 00 | Position within viewed image x coordinate (pixels) | Position Offset X Form Image | The x position of a point (x object) within the viewed image relative to the top (or bottom?) | #REF# | 8bit 6 | 2 bytes | Type Node |
| 744 | 07 | 01 | 02 | 00 | 00 | 00 | 00 | 00 | Position within viewed image y coordinate (pixels) | Position Offset Y Form Image | The y position of a point (x object) within the viewed image relative to the top (or bottom?) | #REF# | 8bit 6 | 2 bytes | Type Node |
| 745 | 07 | 01 | 03 | 00 | 00 | 00 | 00 | 00 | Source image centre x coordinate (pixels) | Source Image Center X Coordinate (X Pixel) | The x position of the center of the captured (source) image | #REF# | 8bit 6 | 2 bytes | Type Node |
| 746 | 07 | 01 | 04 | 00 | 00 | 00 | 00 | 00 | Source image centre y coordinate (pixels) | Source Image Center Y Coordinate (Y Pixel) | The y position of the centre of the captured (source) image | #REF# | 8bit 6 | 2 bytes | Type Node |
| 747 | 07 | 01 | 05 | 00 | 00 | 00 | 00 | 00 | Viewport image centre x coordinate (pixels) | Viewport Image Center X Coordinate (X Pixel) | The x position of the centre of the viewed image | #REF# | 8bit 6 | 2 bytes | Type Node |
| 748 | 07 | 01 | 06 | 00 | 00 | 00 | 00 | 00 | Viewport image centre y coordinate (pixels) | Viewport Image Center Y Coordinate (Y Pixel) | The y position of the centre of the viewed image | #REF# | 8bit 6 | 2 bytes | Type Node |
| 749 | 07 | 01 | 07 | 00 | 00 | 00 | 00 | 00 | Rate and Direction of Positional Change | Rate and Direction of Positional Change | Information about rate and direction of positional change | #REF# | | | Node |
| 750 | 07 | 01 | 08 | 00 | 00 | 00 | 00 | 00 | Device Rate and Direction of Positional Change | Device Rate and Direction of Positional Change | Information about rate and direction of positional change of the capturing device | #REF# | | | Node |
| 751 | 07 | 01 | 09 | 00 | 00 | 00 | 00 | 00 | Absolute Device Rate and Direction of Positional Change | Absolute Device Rate and Direction of Positional Change | Absolute information about rate and direction of positional change of the capturing device | #REF# | | | Node |
| 752 | 07 | 01 | 10 | 01 | 00 | 00 | 00 | 00 | Device Absolute Speed (metres/sec) | Device Absolute Speed | Defined by the relative velocity of the sensor along the heading. Speed values shall indicate translations in which the capturing device has physically moved. | #REF# | Floating Point | 4 bytes | Type Node |
| 753 | 07 | 01 | 10 | 02 | 00 | 00 | 00 | 00 | Device Absolute Heading (degrees) | Device Absolute Heading | Defined by the absolute heading of the sensor. Expressed in degrees and tenths of degrees. | #REF# | Floating Point | 4 bytes | Type Node |
| 754 | 07 | 01 | 11 | 00 | 00 | 00 | 00 | 00 | Relative Device Rate and Direction of Positional Change | Relative Device Rate and Direction of Positional Change | Relative information about rate and direction of positional change of the capturing device | #REF# | | | Node |
| 755 | 07 | 01 | 11 | 01 | 00 | 00 | 00 | 00 | Device Relative Speed (metres/sec) | Device Relative Speed | Defined by the relative velocity of the sensor along the heading. Speed values shall indicate translations in which the camera has physically moved. | #REF# | Floating Point | 4 bytes | Type Node |
| 756 | 07 | 01 | 11 | 02 | 00 | 00 | 00 | 00 | Device Relative Heading (degrees) | Device Relative Heading | Defined by the absolute heading of the sensor. Expressed in degrees and tenths of degrees. | #REF# | Floating Point | 4 bytes | Type Node |
| 757 | 07 | 01 | 12 | 00 | 00 | 00 | 00 | 00 | Subject Rate and Direction of Positional Change | Subject Rate and Direction of Positional Change | Information about rate and direction of positional change of the subject depicted in the captured essence | #REF# | | | Node |
| 758 | 07 | 01 | 12 | 01 | 00 | 00 | 00 | 00 | Absolute Subject Rate and Direction of Positional Change | Absolute Subject Rate and Direction of Positional Change | Absolute information about rate and direction of positional change of the subject depicted in the captured essence | #REF# | | | Node |
| 759 | 07 | 01 | 12 | 01 | 01 | 00 | 00 | 00 | Subject Absolute Speed (metres/sec) | Subject Absolute Speed | Defined by the absolute velocity of the subject along the heading | #REF# | Floating Point | 4 bytes | Type Node |

FIG. 30-2

| SMPTE Label | | | | | | | Data Element Name | Japanese Names | Data Element Definition | Line # | Type | Value Length | Value Range | Node/Leaf | Defining Document |
|---|---|---|---|---|---|---|---|---|---|---|---|---|---|---|---|
| 760 | 07 | 01 | 01 | 02 | 10 | 00 | Subject Absolute Heading (degrees) | Subject Absolute Heading | Defined by the absolute heading of the subject | #REF! | Floating Point | 4 bytes | | Type Node | |
| 761 | 07 | 01 | 01 | 02 | 10 | 00 | Relative Subject Rate and Direction of Positional Change | Relative Subject Rate and Direction of Positional Change | Relative information about rate and direction of positional change of the subject depicted in the captured essence | #REF! | | | | Node | |
| 762 | 07 | 01 | 01 | 02 | 10 | 00 | Subject Relative Speed (metres/sec) | Subject Relative Speed | Defined by the relative velocity of the subject along the heading | #REF! | Floating Point | 4 bytes | | Type Node | |
| 763 | 07 | 01 | 01 | 02 | 10 | 00 | Subject Relative Heading (degrees) | Subject Relative Heading | Defined by the relative heading of the subject | #REF! | Floating Point | 4 bytes | | Type Node | |
| 764 | 07 | 01 | 01 | 02 | 11 | 00 | Angular Specifications | Angular Specifications | Information regarding angles related to positioning information | #REF! | | | | Node | |
| 765 | 07 | 01 | 01 | 02 | 11 | 00 | Device angles | Device Angles | Device information regarding angles related to positioning information | #REF! | | | | Node | |
| 766 | 07 | 01 | 01 | 02 | 11 | 00 | Sensor Roll Angle (degrees) | Sensor Roll Angle | Specifies the roll angle of the sensor. Expressed in degrees. | #REF! | Floating point | 4 bytes | | Leaf | |
| 767 | 07 | 01 | 01 | 02 | 11 | 00 | Angle to North (degrees) | Angle To North | Angle in degrees from the first line of the image to true north. | #REF! | Floating point | 4 bytes | | Leaf | |
| 768 | 07 | 01 | 01 | 02 | 11 | 00 | Obliquity Angle (degrees) | Obliquity Angle | Obliquity angle of image expressed in degrees. The inverse of sensor depression angle. | #REF! | Floating point | 4 bytes | | Leaf | |
| 769 | 07 | 01 | 01 | 02 | 12 | 00 | Subject angles (degrees) | Subject Angles | Angles relating to the subject depicted in the captured essence | #REF! | Floating point | 4 bytes | | Leaf | |
| 770 | 07 | 01 | 01 | 02 | 13 | 00 | Distance measurements | Distance Easurements | Length measurements relating to distance | #REF! | | | | Node | |
| 771 | 07 | 01 | 01 | 02 | 15 | 00 | Device to Subject distance | Device To Subject Distance From device | Length measurements relating to distance between capturing device and the subject depicted in the captured essence | #REF! | | | | Node | |
| 772 | 07 | 01 | 01 | 02 | 15 | 00 | Slant Range (metres) | Angle To Subject | Distance from the sensor to the center point on ground of the framed subject (image) depiction in the captured essence. | #REF! | Floating Point | 4 bytes | | Type Node | |
| 773 | 07 | 01 | 01 | 02 | 17 | 00 | Dimensions | Distance | Length measurements relating to size | #REF! | | | | Node | |
| 774 | 07 | 01 | 01 | 02 | 17 | 00 | Subject Dimensions | Subject Distance | Length measurements relating to the size of the subject depicted in the captured essence | #REF! | | | | Node | |

FIG. 31-1

| | | | | | | | Description | | | Type |
|---|---|---|---|---|---|---|---|---|---|---|
| 775 | 07 | 01 | 17 | 44 | 02 | 50 | Target Width | Horizontal half width of the target frame image, used to compute the four corner points of the frame. | #REF! Floating point | 4 bytes | Type Node |
| 776 | 07 | 01 | 17 | 45 | 00 | 80 | Studio and Location Dimensions | Length measurements relating to the size of the location in which the essence was captured | #REF! | | Node |
| 777 | 07 | 01 | 17 | 10 | 01 | 80 | Media Dimensions | Length measurements relating to the size of the medium on which the essence was captured | #REF! | | Node |
| 778 | 03 | 01 | 17 | 10 | 01 | 80 | Physical Media Length (metres) | The physical length of the medium on which the essence was captured | #REF! IMAGBF | 4 bytes | Type Node |
| 779 | 07 | 01 | 17 | 30 | 01 | 80 | Image Dimensions | Length measurements relating to the physical size of the image formed in a capturing device | #REF! | | Node |
| 780 | 07 | 01 | 17 | 10 | 01 | 80 | Pan and scan image dimensions | Length measurements relating to pan and scan subsetting of a captured image | #REF! | | Node |
| 781 | 07 | 01 | 17 | 11 | 01 | 00 | Viewport Height | The height of the viewed area within a captured image | #REF! Uint16 | 2 bytes | Type Node |
| 782 | 07 | 01 | 17 | 11 | 01 | 00 | Viewport Width | The width of the viewed area within a captured image | #REF! Uint16 | 2 bytes | Type Node |
| 783 | 07 | 01 | 17 | 02 | 01 | 00 | Abstract Locations | Abstract information about a location | #REF! | | Node |
| 784 | 07 | 01 | 20 | 01 | 01 | 00 | Place Names | Place information | #REF! | | Node |
| 785 | 05 | 01 | 20 | 01 | 01 | 00 | Gazetteer Used | Reference to a formally registered gazetteer or a similar authoritative source of place keywords | #REF! ISO 7-bit char | 4 chars max | See types dictionary | Type Node |
| 786 | 07 | 01 | 20 | 01 | 02 | 00 | Place Keyword | The geographic name(s) of location(s) covered by a data set | #REF! ISO 7-bit char string | 32 bytes max | | Leaf |
| 787 | 07 | 01 | 20 | 01 | 01 | 00 | Country Code | Country code information | #REF! | | Node |
| 788 | 07 | 01 | 20 | 01 | 02 | 00 | Object Country Code | The code that represents the country depicted in the essence | #REF! ISO 7-bit char | 4 chars max | See types dictionary | Type Node |
| 789 | 05 | 01 | 20 | 01 | 02 | 00 | Country code of shoot | Country where shooting took place | #REF! ISO 7-bit char | 4 chars max | See types dictionary | Type Node |
| 790 | 07 | 01 | 20 | 01 | 03 | 00 | Country Code of Setting | The country code of the country where the depicted action is set in the production | #REF! ISO 7-bit char | 4 chars max | See types dictionary | Type Node |
| 791 | 07 | 01 | 20 | 01 | 03 | 00 | Country code of Setting (Characterised Place) | | #REF! ISO 7-bit char | 4 chars max | See types dictionary | Type Node |
| 791 | 07 | 01 | 20 | 01 | 04 | 00 | Country code of Copyright License | The country code of a country where copyright is licensed | #REF! ISO 7-bit char | 4 chars max | See types dictionary | Type Node |
| 792 | 07 | 01 | 20 | 01 | 05 | 00 | Country code of IP License | The country code of a country where IP rights are licensed | #REF! ISO 7-bit char | 4 chars max | See types dictionary | Type Node |

FIG. 31-2

| Line # | ISRPTF Label | | | | | | Data Element Name | Japanese Names | Data Element Definition | Line # | Type | Value Length | Value Range | Node/Leaf | Defining Document |
|---|---|---|---|---|---|---|---|---|---|---|---|---|---|---|---|
| 793 | 07 | 01 | 20 | 01 | 04 | 00 | Regions | Regions Within A Country | Information about Regions within a country | :REF: | | | | Node | |
| 794 | 07 | 01 | 20 | 01 | 04 | 00 | Region of Object | Region Where Object is Depicted | Region is a country where object is depicted | :REF: | ISO 7-bit char string | 32 bytes max | | Leaf | |
| 795 | 07 | 01 | 20 | 01 | 04 | 02 | Region of shoot | Region Where Shooting Took Place | Region where a country where shooting took place | :REF: | ISO 7-bit char string | 32 bytes max | | Leaf | |
| 796 | 07 | 01 | 20 | 01 | 04 | 03 | Region of Setting (characterized Place) | Region Where The Depicted Action Is Set In The Position | The region of the country where the depicted action is set in the production | :REF: | ISO 7-bit char string | 32 bytes max | | Leaf | |
| 797 | 07 | 01 | 20 | 01 | 04 | 04 | Region or area of Copyright License | Region Where Copyright is Licensed | The region of a country where copyright is licensed | :REF: | ISO 7-bit char string | 32 bytes max | | Leaf | |
| 798 | 07 | 01 | 20 | 01 | 04 | 05 | Region or area of IP License | Region Where IP Rights Are Licensed | The region of a country where IP rights are licensed | :REF: | ISO 7-bit char string | 32 bytes max | | Leaf | |
| 799 | 07 | 01 | 20 | 01 | 05 | 00 | Postal Address | Postal Address | Information about Postal Addresses | :REF: | | | | Node | |
| 800 | 07 | 01 | 20 | 01 | 05 | 01 | Room Number | Room Number | The room number of an address | :REF: | ISO 7-bit char string | 32 bytes max | | Leaf | |
| 801 | 07 | 01 | 20 | 01 | 05 | 02 | Street Number or Building name | Street Number of Building Name | An address line for the address. | :REF: | ISO 7-bit char string | 32 bytes max | | Leaf | |
| 802 | 07 | 01 | 20 | 01 | 05 | 03 | Street | Street | An address line for the address. | :REF: | ISO 7-bit char string | 32 bytes max | | Leaf | |
| 803 | 07 | 01 | 20 | 01 | 05 | 04 | Postal Town | Postal Town | An address line for the address. | :REF: | ISO 7-bit char string | 32 bytes max | | Leaf | |
| 804 | 07 | 01 | 20 | 01 | 05 | 05 | City | City | The city of the address. | :REF: | ISO 7-bit char string | 32 bytes max | | Leaf | |
| 805 | 07 | 01 | 20 | 01 | 05 | 06 | State or Province or County | State or Province | The state, province or county of the address. | :REF: | ISO 7-bit char string | 32 bytes max | | Leaf | |
| 806 | 07 | 01 | 20 | 01 | 05 | 07 | Postal Code | Postal Code | The ZIP or other postal code of the address. | :REF: | ISO 7-bit char string | 32 bytes max | | Leaf | |
| 807 | 07 | 01 | 20 | 01 | 05 | 08 | Country | Country | The country of the address. | :REF: | ISO 7-bit char string | 32 bytes max | | Leaf | |

FIG. 32-1

| | | | | | | Setting Address (Characterised Place) | Postal Addresses Depicted in The Setting of a Production | Information about postal addresses depicted in the setting of a production | #REF! | | Node |
|---|---|---|---|---|---|---|---|---|---|---|---|
| 809 | 07 | 01 | 20 | 01 | 00 | Setting room number | Setting Room Number | The room number of a depicted address | #REF! | ISO 7-bit char string | 32 bytes max | Leaf |
| 810 | 07 | 01 | 20 | 02 | 00 | Setting Street Number or Building name | Setting Street Number or Building Name | An address line for the depicted address | #REF! | ISO 7-bit char string | 32 bytes max | Leaf |
| 811 | 07 | 01 | 20 | 03 | 00 | Setting Street | Setting Street | An address line for the depicted address | #REF! | ISO 7-bit char string | 32 bytes max | Leaf |
| 812 | 07 | 01 | 20 | 04 | 00 | Setting Town | Setting Town | An address line for the depicted address | #REF! | ISO 7-bit char string | 32 bytes max | Leaf |
| 813 | 07 | 01 | 20 | 05 | 00 | Setting City | Setting City | The city of the depicted address | #REF! | ISO 7-bit char string | 32 bytes max | Leaf |
| 814 | 07 | 01 | 20 | 06 | 00 | Setting State or Province or County | Setting State or Province | The state, province or county of the depicted address | #REF! | ISO 7-bit char string | 32 bytes max | Leaf |
| 815 | 07 | 01 | 20 | 07 | 00 | Setting Postal Code | Setting Postal Code | The ZIP or other postal code of the depicted address | #REF! | ISO 7-bit char string | 32 bytes max | Leaf |
| 816 | 07 | 01 | 20 | 08 | 00 | Setting Country | Setting Country | The country of the depicted address | #REF! | ISO 7-bit char string | 32 bytes max | Leaf |
| 817 | 07 | 01 | 20 | 09 | 00 | Setting Description | Setting Description | eg. "A clearing in a wood" or "Falstaff's living room" | #REF! | | | Type Node |
| 818 | 07 | 01 | 20 | 09 | 00 | Setting Description | Setting Description | eg. "A clearing in a wood" or "Falstaff's living room" | #REF! | ISO 7-bit char string | 127 chars max | Leaf |
| 819 | 07 | 01 | 29 | 00 | 00 | Electronic Address | Electronic Address | Information about electronic addresses | #REF! | | | Node |
| 820 | 07 | 01 | 29 | 01 | 00 | Telephone number | Telephone Number | Telephone number | #REF! | ISO 7-bit char string | 32 bytes max | Leaf |
| 821 | 07 | 01 | 29 | 02 | 00 | Fax number | Fax Number | Fax number | #REF! | ISO 7-bit char string | 32 bytes max | Leaf |
| 822 | 07 | 01 | 29 | 03 | 00 | e-mail address | E-Mail Address | e-mail address | #REF! | ISO 7-bit char string | 32 bytes max | Leaf |
| 823 | | | | | | | | | | | | |
| 824 | 07 | 02 | 00 | 00 | 00 | Date and Time | Date and Time | Information about dates and times | #REF! | | | Node |
| 825 | 07 | 02 | 01 | 00 | 00 | Material Date and Time | Material Date and Time | Information about dates and times relating to captured material | #REF! | | | Node |

FIG. 32-2

| Time # | SMPTE Label | | | | | | | Data Element Name | Japanese Names | Data Element Definition | Type | Value Length | Value Range | Node/Leaf | Defining Document |
|---|---|---|---|---|---|---|---|---|---|---|---|---|---|---|---|
| 825 | 07 | 02 | 01 | 01 | 00 | 00 | 00 | Operational Date-Time Stamps | Operational Date-Time | Operating date and time information (i.e. timecode) | aREF1 | | | | |
| 827 | 07 | 02 | 01 | 01 | 01 | 00 | 00 | Creation Date-Time stamp | Creation Date-Time | Time stamp for original material | aREF1 | | | Type Leaf | |
| 828 | 07 | 02 | 01 | 01 | 01 | 01 | 00 | Creation Date-Time stamp | Creation Date-Time | Time stamp for original material | aREF1 UL SBF | 8 bytes | Bitwise mapping of 64-bit timecode into 8 bytes, lsb first | Leaf | |
| 829 | 07 | 02 | 01 | 01 | 02 | 00 | 00 | Last modified Date-Time stamp | Last Modified Date-Time | Time stamp for last modification of material | aREF1 | | | Type Leaf | |
| 830 | 07 | 02 | 01 | 01 | 02 | 01 | 00 | Last modified Date-Time stamp | Last Modified Date-Time | Time stamp for last modification of material | aREF1 UL SBF | 8 bytes | Bitwise mapping of 64-bit timecode into 8 bytes, lsb first | Leaf | |
| 831 | 07 | 02 | 01 | 01 | 03 | 00 | 00 | User defined Date-Time stamp | User Defined Date-Time | Time stamp application defined by user application | aREF1 | | | Type Leaf | |
| 832 | 07 | 02 | 01 | 01 | 03 | 01 | 00 | User defined Date-Time stamp | User Defined Date-Time | Time stamp application defined by user application | aREF1 UL SBF | 8 bytes | Bitwise mapping of 64-bit timecode into 8 bytes, lsb first | Leaf | |
| 833 | 07 | 02 | 01 | 02 | 00 | 00 | 00 | Absolute Date and Time | Absolute Date and Time | Absolute date and time information | aREF1 | | | Node | |
| 834 | 07 | 02 | 01 | 02 | 01 | 00 | 00 | Start Date Time | Production Start Date and Time | Absolute time at the start of creating the shot or clip | aREF1 UL SBF | 8 bytes | Bitwise mapping of 64-bit timecode into 8 bytes, lsb first | Leaf | |
| 835 | 07 | 02 | 01 | 02 | 02 | 00 | 00 | End Date Time | Production End Date and Time | Absolute time at the end of creating the shot or clip | aREF1 UL SBF | 8 bytes | Bitwise mapping of 64-bit timecode into 8 bytes, lsb first | Leaf | |
| 836 | 07 | 02 | 01 | 02 | 03 | 00 | 00 | Segment Start Date and Time | Segment Start Date and Time | Absolute time at the start of a segment within a shot or clip | aREF1 UL SBF | 8 bytes | Bitwise mapping of 64-bit timecode into 8 bytes, lsb first | Leaf | |
| 837 | 07 | 02 | 01 | 02 | 04 | 00 | 00 | Segment End Date and Time | Segment End Date and Time | Absolute time at the end of a segment within a shot or clip | aREF1 UL SBF | 8 bytes | Bitwise mapping of 64-bit timecode into 8 bytes, lsb first | Leaf | |
| 838 | 07 | 02 | 01 | 03 | 00 | 00 | 00 | Relative Date and Time | Relative Date and Time | Relative date and time information | aREF1 | | | Node | |
| 839 | 07 | 02 | 01 | 03 | 01 | 00 | 00 | Start Date Time | Media Start Date Time | Media time at start of shot or clip | aREF1 UL SBF | 8 bytes | Bitwise mapping of 64-bit timecode into 8 bytes, lsb first | Leaf | |
| 840 | 07 | 02 | 01 | 03 | 02 | 00 | 00 | End Date Time | Media End Date Time | Media time at end of shot or clip | aREF1 UL SBF | 8 bytes | Bitwise mapping of 64-bit timecode into 8 bytes, lsb first | Leaf | |

FIG. 33-1

| | | | | | | | | | | | | |
|---|---|---|---|---|---|---|---|---|---|---|---|---|
| 841 | 07 | 02 | 01 | 01 | 03 | 00 | 00 | Segment Start Date and Time | Segment Start Date and Time | Media time at the start of a segment within a shot or clip | aREFI UiLSBF | 8 bytes | Bitwise mapping of 64-bit timecode into 8 bytes, lsb first | Leaf |
| 842 | 07 | 02 | 01 | 01 | 04 | 00 | 00 | Segment End Date and Time | Segment End Date and Time | Media time at the end of a segment within a shot or clip | aREFI UiLSBF | 8 bytes | Bitwise mapping of 64-bit timecode into 8 bytes, lsb first | Leaf |
| 843 | 07 | 02 | 01 | 02 | 00 | 00 | 00 | Material Durations | Time Durations | Information about time durations relating to captured material | aREFI | | | Node |
| 844 | 07 | 02 | 01 | 02 | 01 | 00 | 00 | Absolute Durations | Absolute Time Durations | Absolute time duration information | aREFI | | | Node |
| 845 | 07 | 02 | 01 | 02 | 01 | 01 | 00 | Time Duration | Time Duration | Length of the content in Time units | aREFI UiLSBF | 4 bytes | Bitwise mapping of 64-bit timecode into 8 bytes, lsb first | Leaf |
| 846 | 07 | 02 | 01 | 02 | 01 | 02 | 00 | Segment Duration | Segment Duration | Duration of a segment within a shot or clip in Time units | aREFI UiLSBF | 4 bytes | Bitwise mapping of 64-bit timecode into 8 bytes, lsb first | Leaf |
| 847 | 07 | 02 | 01 | 02 | 01 | 03 | 00 | Frame Count | Frame Count | Length of the content in film frames | aREFI UiLSBF | 4 bytes | Bitwise mapping of 64-bit timecode into 8 bytes, lsb first | Leaf |
| 848 | 07 | 02 | 01 | 02 | 01 | 04 | 00 | Segment frame count | Segment Frame Count | Duration of a segment within a shot or clip in film frames | aREFI UiLSBF | 4 bytes | Bitwise mapping of 64-bit timecode into 8 bytes, lsb first | Leaf |
| 849 | 07 | 02 | 01 | 02 | 01 | 05 | 00 | Textless Black duration | Textless Black Duration | eg. 1 minutes after end of programme | aREFI | 4 bytes | | Leaf |
| 850 | 07 | 02 | 01 | 02 | 02 | 00 | 00 | Relative Durations | Relative Durations | Relative time duration information | aREFI | | | Node |
| 851 | 07 | 02 | 01 | 02 | 02 | 01 | 00 | Time Duration | Time Duration | Relative length of the content in Time units | aREFI UiLSBF | 4 bytes | | Leaf |
| 852 | 07 | 02 | 01 | 02 | 02 | 02 | 00 | Segment Duration | Segment Duration | Duration of a segment within a shot or clip in Time units | aREFI UiLSBF | 4 bytes | | Leaf |
| 853 | 07 | 02 | 01 | 02 | 02 | 03 | 00 | Film Frame Interval | Film Frame Interval | Length of the content in film frames | aREFI UiLSBF | 4 bytes | | Leaf |
| 854 | 07 | 02 | 01 | 02 | 02 | 04 | 00 | Segment frame count | Segment Frame Interval | Duration of a segment within a shot or clip in film frames | aREFI UiLSBF | 4 bytes | | Leaf |
| 855 | 07 | 02 | 01 | 03 | 00 | 00 | 00 | Rights Date and Time | Rights Date and Time | Dates and Times relating to Copyright and Intellectual Property Rights | aREFI | | | Node |
| 856 | 07 | 02 | 01 | 03 | 01 | 00 | 00 | Copyright Date and Time | Copyright Date and Time | Dates and Times relating to Copyright | aREFI | | | Node |
| 857 | 07 | 02 | 01 | 03 | 02 | 00 | 00 | IP Rights Date and Times | IP Rights Date and Time | Dates and Times relating to Intellectual Property Rights | aREFI | | | Node |
| 858 | 07 | 02 | 01 | 03 | 02 | 01 | 00 | License start date and time | License Start Date and Time | License start date and time | aREFI UiLSBF | 8 bytes | Bitwise mapping of 64-bit timecode into 8 bytes, lsb first | Leaf |

FIG. 33-2

| Line # | SMPTE Label | | | | | | | Data Element Name | Japanese Names | Data Element Definition | Type | Value Length | Value Range | Node/Leaf | Defining Document |
|---|---|---|---|---|---|---|---|---|---|---|---|---|---|---|---|
| 655 | 07 | 02 | 03 | 01 | 02 | 01 | 00 | Option start date and time | Option Start Date and Time | Option start date and time | #REF! UL SBF | 8 bytes | Bitwise mapping of 64-bit timecode into 8 bytes, lsb first | Leaf | |
| 656 | 07 | 02 | 03 | 02 | 02 | 01 | 00 | License end date and time | License End Date and Time | License end date and time | #REF! UL SBF | 8 bytes | Bitwise mapping of 64-bit timecode into 8 bytes, lsb first | Leaf | |
| 657 | 07 | 02 | 03 | 02 | 02 | 01 | 00 | Option end date and time | Option End Date and Time | Option end date and time | #REF! UL SBF | 8 bytes | Bitwise mapping of 64-bit timecode into 8 bytes, lsb first | Leaf | |
| 658 | 07 | 02 | 03 | 03 | 00 | 00 | 00 | Rights Durations | Rights Durations | Information about the duration of a copyright or Intellectual Property license | #REF! | | | Node | |
| 659 | 07 | 02 | 03 | 04 | 01 | 00 | 00 | Copyright Durations | Copyright Durations | Information about the duration of a copyright license | #REF! | | | Node | |
| 660 | 07 | 02 | 03 | 04 | 02 | 00 | 00 | IP Rights Durations | IP Rights Durations | Information about the duration of an Intellectual Property license | #REF! | | | Node | |
| 661 | 07 | 02 | 03 | 04 | 02 | 01 | 00 | License duration | License Duration | Information about the duration of a license | #REF! UL SBF | 8 bytes | Bitwise mapping of 64-bit timecode into 8 bytes, lsb first | Leaf | |
| 662 | 07 | 02 | 03 | 04 | 02 | 02 | 00 | Option duration | Option Duration | Information about the duration of a license | #REF! UL SBF | 8 bytes | Bitwise mapping of 64-bit timecode into 8 bytes, lsb first | Leaf | |
| 663 | 07 | 02 | 04 | 05 | 00 | 00 | 00 | Cataloguing Date and Time | Cataloguing Date and Time | Information about cataloguing and indexing | #REF! | | | Node | |
| 664 | 07 | 02 | 04 | 05 | 01 | 00 | 00 | Creation Date and Time | Creation Date and Time | The creation date and time of the data set | #REF! UL SBF | 8 bytes | Bitwise mapping of 64-bit timecode into 8 bytes, lsb first | Leaf | |
| 665 | 07 | 02 | 04 | 05 | 02 | 00 | 00 | Last Modified | Last Modified Date | Date and time of last modification | #REF! UL SBF | 8 bytes | Bitwise mapping of 64-bit timecode into 8 bytes, lsb first | Leaf | |
| 666 | 07 | 02 | 04 | 06 | 00 | 00 | 00 | Event Date and Time | Event Date and Time | Date and Time information relating to events | #REF! | | | Node | |
| 667 | 07 | 02 | 04 | 06 | 01 | 00 | 00 | Absolute Date and Time | Absolute Event Date and Time | Absolute Date and Time information relating to events | #REF! | | | Node | |
| 668 | 07 | 02 | 04 | 06 | 01 | 01 | 00 | Absolute start times | Absolute Event Start Times | Absolute Date and Time information relating to the start of events | #REF! | | | Node | |
| 669 | 07 | 02 | 04 | 06 | 01 | 01 | 01 | Project Mission Start Date and Time | Project Start Date and Time | The absolute beginning date and time of the project or mission | #REF! UL SBF | 8 bytes | Bitwise mapping of 64-bit timecode into 8 bytes, lsb first | Leaf | |

FIG. 34-1

| | | | | | | | |
|---|---|---|---|---|---|---|---|
| 0873 | 07 | 02 | 06 | 01 | 00 | Scene Start Date and Time | Scene Start Date and Time | The absolute beginning date and time of the scene, or shot | $REF} UULSBF | 8 bytes | Bitwise mapping of 64-bit timecode into 8 bytes, lsb first | Leaf |
| 0875 | 07 | 02 | 06 | 01 | 01 | Shot Start Date and Time | Shot Start Date and Time | The absolute beginning date and time of the shot | $REF} UULSBF | 8 bytes | Bitwise mapping of 64-bit timecode into 8 bytes, lsb first | Leaf |
| 0876 | 07 | 02 | 06 | 01 | 02 | Broadcast Start Date and Time | Broadcast Start Date and Time | Absolute start date and time of a specific broadcast | $REF} UULSBF | 8 bytes | Bitwise mapping of 64-bit timecode into 8 bytes, lsb first | Leaf |
| 0877 | 07 | 02 | 06 | 02 | 00 | Absolute end times | Absolute End Times | Absolute Date and Time information relating to the end of events | $REF} | | | Node |
| 0878 | 07 | 02 | 06 | 02 | 01 | Project Mission End Date and Time | Project End Date and Time | The absolute ending date and time of the project or mission | $REF} UULSBF | 8 bytes | Bitwise mapping of 64-bit timecode into 8 bytes, lsb first | Leaf |
| 0879 | 07 | 02 | 06 | 02 | 02 | Scene End Date and Time | Scene End Date and Time | The absolute ending date and time of the scene, or shot | $REF} UULSBF | 8 bytes | Bitwise mapping of 64-bit timecode into 8 bytes, lsb first | Leaf |
| 0880 | 07 | 02 | 06 | 02 | 03 | Shot End Date and Time | Shot End Date and Time | The absolute ending date and time of the shot | $REF} UULSBF | 8 bytes | Bitwise mapping of 64-bit timecode into 8 bytes, lsb first | Leaf |
| 0881 | 07 | 02 | 06 | 02 | 04 | Broadcast End Date and Time | Broadcast End Date and Time | Absolute end date and time of a specific broadcast | $REF} UULSBF | 8 bytes | Bitwise mapping of 64-bit timecode into 8 bytes, lsb first | Leaf |
| 0882 | 07 | 02 | 07 | 00 | 00 | Relative date and Time | Relative Date and Time | Relative Date and Time information relating to events e.g. Two days and five hours after | $REF} | | | Node |
| 0883 | 07 | 02 | 07 | 01 | 00 | Relative start times | Relative Event Start Times | Relative Date and Time information relating to the start of events | $REF} | | | Node |
| 0884 | 07 | 02 | 07 | 01 | 01 | Project Mission Start Date and Time | Project Mission Start Date and Time | The relative beginning date and time of the project or mission | $REF} UULSBF | 8 bytes | Bitwise mapping of 64-bit timecode into 8 bytes, lsb first | Leaf |
| 0885 | 07 | 02 | 07 | 01 | 02 | Scene Start Date and Time | Scene Start Date and Time | The relative beginning date and time of the scene, or shot | $REF} UULSBF | 8 bytes | Bitwise mapping of 64-bit timecode into 8 bytes, lsb first | Leaf |
| 0886 | 07 | 02 | 07 | 01 | 03 | Shot Start Date and Time | Shot Start Date and Time | The relative beginning date and time of the shot | $REF} UULSBF | 8 bytes | Bitwise mapping of 64-bit timecode into 8 bytes, lsb first | Leaf |
| 0887 | 07 | 02 | 07 | 01 | 04 | Broadcast Start and Time | Broadcast Start and Time | Relative start time of a specific broadcast within a parent programme | $REF} UULSBF | 8 bytes | Bitwise mapping of 64-bit timecode into 8 bytes, lsb first | Leaf |
| 0888 | 07 | 02 | 07 | 02 | 00 | Relative end Times | Relative End Times | Relative Date and Time information relating to the end of events | $REF} | | | Node |
| 0889 | 07 | 02 | 07 | 02 | 01 | Project Mission End Date and Time | Project End Date and Time | The relative ending date and time of the project or mission | $REF} UULSBF | 8 bytes | Bitwise mapping of 64-bit timecode into 8 bytes, lsb first | Leaf |
| 0890 | 07 | 02 | 07 | 02 | 02 | Scene End Date and Time | Scene End Date and Time | The relative ending date and time of the scene, or shot | $REF} UULSBF | 8 bytes | Bitwise mapping of 64-bit timecode into 8 bytes, lsb first | Leaf |
| 0891 | 07 | 02 | 07 | 02 | 03 | Shot End Date and Time | Shot End Date and Time | The relative ending date and time of the shot | $REF} UULSBF | 8 bytes | Bitwise mapping of 64-bit timecode into 8 bytes, lsb first | Leaf |

FIG. 34-2

| Line # | SMPTE label | | | | | | | | | Data Element Name | Japanese Names | Data Element Definition | Line # Type | Value Length | Value Range | Node/Leaf | Defining Document |
|---|---|---|---|---|---|---|---|---|---|---|---|---|---|---|---|---|---|
| 892 | 02 | 02 | 05 | 02 | 01 | 02 | 10 | 00 | 00 | BroadcastEndTime | Relative Broadcast End Time | Absolute end time of a specific broadcast within a parent programme | #REF! UL8BF | 8 bytes | Bitwise mapping of 64-bit timecode into 8 bytes, lsb first | Leaf | |
| 893 | 02 | 02 | 07 | 01 | 02 | 02 | 00 | 00 | 00 | EventDuration | Event Durations Information | Duration information relating to events | #REF! | | | Node | |
| 894 | 02 | 02 | 07 | 01 | 02 | 02 | 01 | 00 | 00 | AbsoluteDurations | Absolute Durations Information | Absolute duration in time units | #REF! | | | Node | |
| 895 | 02 | 02 | 07 | 01 | 02 | 02 | 01 | 00 | 00 | TimeDuration | Time Duration | The absolute duration of an event | #REF! UL8BF | 8 bytes | Bitwise mapping of 64-bit timecode into 8 bytes, lsb first | Leaf | |
| 896 | 02 | 02 | 07 | 01 | 02 | 02 | 02 | 00 | 00 | RelativeDurations | Relative Durations | Relative durations in time units | #REF! | | | Node | |
| 897 | 02 | 02 | 07 | 01 | 02 | 02 | 02 | 01 | 00 | TimeDuration | Time Duration | The relative duration of an event | #REF! UL8BF | 8 bytes | Bitwise mapping of 64-bit timecode into 8 bytes, lsb first | Leaf | |
| 898 | 02 | 02 | 07 | 01 | 02 | 03 | 00 | 00 | 00 | EditingDateandTime | Editing Date and Time | | #REF! | | | Node | |
| 899 | 02 | 02 | 07 | 01 | 02 | 03 | 01 | 00 | 00 | Length | Edit Length | Duration in edit units of essence | #REF! Length | 8 bytes | | Leaf | W25.32 |
| 900 | 02 | 02 | 07 | 01 | 02 | 03 | 02 | 00 | 00 | Position | Edit Position | Specifies time event starts | #REF! Position | 8 bytes | | Leaf | W25.32 |
| 901 | 02 | 02 | 07 | 01 | 02 | 03 | 03 | 00 | 00 | StartTime | Start Time | Specifies relative start time | #REF! Position | 8 bytes | | Leaf | W25.32 |
| 902 | 02 | 02 | 07 | 01 | 02 | 03 | 04 | 00 | 00 | FadeinLength | Fadein Length | Specifies length of audio fade in | #REF! Length | 8 bytes | | Leaf | W25.32 |
| 903 | 02 | 02 | 07 | 01 | 02 | 03 | 05 | 00 | 00 | FadeOutLength | Fadeout Length | Specifies length of audio fade out | #REF! Length | 8 bytes | | Leaf | W25.32 |
| 904 | 02 | 02 | 07 | 01 | 02 | 03 | 06 | 00 | 00 | CutPoint | Cut Point Standard | Specifies the cutpoint | #REF! Position | 8 bytes | | Leaf | W25.32 |
| 905 | 02 | 02 | 07 | 01 | 02 | 03 | 07 | 00 | 00 | Time | Time Standard | Specifies time | #REF! Rational | 8 bytes | | Leaf | W25.32 |
| 906 | 02 | 02 | 07 | 01 | 02 | 03 | 08 | 00 | 00 | LastModified | Last Edit Date | Specifies the date the container was last modified | #REF! TimeStamp | | | Leaf | W25.32 |

FIG. 35-1

| | | | | | | | Name | Description | Type | Size | Notes | Leaf/Node | W25.52 |
|---|---|---|---|---|---|---|---|---|---|---|---|---|---|
| 07 | 02 | 08 | 02 | 08 | 02 | 00 | LastModified | Identifies time node was last modified | #REF! TimeStamp | | | Leaf | W25.52 |
| 07 | 02 | 08 | 04 | 08 | 02 | 00 | Creation Time | Identifies time node was created | #REF! TimeStamp | | | Leaf | W25.52 |
| 07 | 02 | 08 | 08 | 08 | 01 | 00 | DefaultFadeLength | Specifies the default length of audio soft cuts | #REF! Length | 8 bytes | | Leaf | W25.52 |
| 07 | 02 | 08 | 08 | 08 | 02 | 00 | DefFadeEditRate | Specifies time units for DefaultFadeLength | #REF! Rational | 8 bytes | | Leaf | W25.52 |
| 07 | 02 | 08 | 08 | 03 | 00 | 00 | EventMobSlot_EditRate | Specifies the time units for the slot | #REF! Rational | 8 bytes | | Leaf | W25.52 |
| 07 | 02 | 08 | 0E | 08 | 00 | 00 | TimelineMobSlot_EditRate | Specifies the time units for the slot | #REF! Rational | 8 bytes | | Leaf | W25.52 |
| 07 | 02 | 09 | 0F | 08 | 00 | 00 | Identification_Date | Specifies the date the container was modified by application | #REF! TimeStamp | 8 bytes | | Leaf | W25.52 |
| 07 | 02 | 10 | 10 | 08 | 00 | 00 | Origin | Specifies the starting offset for the slot | #REF! Position | 8 bytes | | Leaf | |
| 07 | 02 | 10 | 10 | 08 | 00 | 00 | Process Date and Time | Date and Time information relating to Process | #REF! | | | Node | |
| 07 | 02 | 10 | 01 | 10 | 00 | 00 | Technical Modification date and time | The date and time of a purely technical modification, not affecting editorial material | #REF! UL SBF | 8 bytes | Bitwise mapping of 64-bit timecode into 8 bytes, lsb first | Leaf | |
| 07 | 02 | 10 | 02 | 10 | 00 | 00 | Editorial Modification date and time | The date and time of an editorial modification | #REF! UL SBF | 8 bytes | Bitwise mapping of 64-bit timecode into 8 bytes, lsb first | Leaf | |
| 07 | 02 | 10 | 03 | 10 | 00 | 00 | Broadcast Date and Time | The date and time of a Broadcast | #REF! UL SBF | 8 bytes | Bitwise mapping of 64-bit timecode into 8 bytes, lsb first | Leaf | |
| 07 | 02 | 10 | 04 | 10 | 00 | 00 | Cassation Date and Time | Earliest allowed time for destruction of a specific recording/physical copy | #REF! UL SBF | 8 bytes | Bitwise mapping of 64-bit timecode into 8 bytes, lsb first | Leaf | |
| 07 | 02 | 20 | 00 | 00 | 00 | 00 | Setting Date and Time (Characterised Time Period) | Time period(s) characterised by this data set | #REF! | | | Node | |
| 07 | 02 | 20 | 01 | 10 | 00 | 00 | Time period Keyword Thesaurus | Reference to a formally registered thesaurus or a similar authoritative source of temporal keywords. | #REF! ISO 7-bit char string | 32 bytes max | | Leaf | |
| 07 | 02 | 20 | 02 | 10 | 00 | 00 | Time period Keyword | The name of a time period covered by a data set. | #REF! ISO Field char string | 32 bytes max | | Leaf | |
| 07 | 03 | 00 | 00 | 00 | 00 | 00 | Delay | Information about Delay durations | #REF! | | | Node | |
| 07 | 03 | 01 | 00 | 00 | 00 | 00 | Encoding/Decoding | Information about delay durations in encoding or decoding processes | #REF! | | | Node | |

FIG. 35-2

| Line # | SMPTE Label | | | | | | Data Element Name | Japanese Names | Data Element Definition | Type | Value Length | Value Range | Node/Leaf | Defining Document |
|---|---|---|---|---|---|---|---|---|---|---|---|---|---|---|
| 925 | 07 | 03 | 01 | 01 | 00 | 00 | Encoding Delay | Encoding Delay Time | Information about delay durations in encoding processes | #REF! | | | Node | |
| 926 | 07 | 03 | 01 | 02 | 00 | 00 | Decoding Delay | Decoding Delay Time | Information about delay durations in decoding processes | #REF! | | | Node | |
| 927 | 07 | 03 | 02 | 00 | 00 | 00 | Buffer Delay | Buffer Delay Time | Buffer delay per definition in SMPTE (TBA) | #REF! | as per standard | | Leaf | |
| 928 | 07 | 04 | 00 | 00 | 00 | 00 | Latency | Latency Information | Information about response times | #REF! | | | Node | |
| 929 | 07 | 05 | 00 | 00 | 00 | 00 | Temporal shape (Shuttering etc) {PLACEHOLDERS} | Information About Temporal Characteristics | Information about temporal characteristics of processes | #REF! | | | Node | |
| 930 | 07 | 05 | 01 | 00 | 00 | 00 | Shutter characteristics {placeholder} | Shutter Characteristics | Shutter characteristics | #REF! | | | Node | |
| 931 | 07 | 05 | 01 | 01 | 00 | 00 | Shutter speed {placeholder} | Shutter Speed | Shutter speed | #REF! | | | Node | |
| 932 | 07 | 05 | 01 | 02 | 00 | 00 | Shutter Gating {placeholder} | Shutter Gating Characteristics | Shutter Gating characteristics | #REF! | | | Node | |
| 933 | 0E | 00 | 00 | 00 | 00 | 00 | USER ORGANISATION REGISTERED | Class 14: User Data | Class 15 is reserved for user organisation registered metadata | #REF! | | | Node | |
| 934 | 0E | 01 | 00 | 00 | 00 | 00 | Publicly registered user organisation metadata | Co-Used Registered Metadata | | #REF! | | | Node | |
| 935 | 0E | 02 | 00 | 00 | 00 | 00 | Privately registered user organisation metadata | Private Metadata | | #REF! | | | Node | |
| 936 | 0E | 02 | 01 | 00 | 00 | 00 | DoD Metadata | Metadata for U.S. Department of Defence Agencies | Metadata for U.S. Department of Defence agencies | #REF! | | | Node | |
| 937 | 0E | 02 | 02 | 00 | 00 | 00 | UAV Metadata | UAV Metadata | UAV Metadata | #REF! | | | Node | |
| 938 | 0E | 02 | 03 | 00 | 00 | 00 | RC1A Metadata | RC1A Metadata | RC1A Metadata | #REF! | | | Node | |
| 939 | 0E | 02 | 03 | 01 | 00 | 00 | RC1A Closed Caption Set | RC1A Metadata From RC1A Closed Caption | RC1A Metadata Set containing metadata information from analog closed caption | #REF! | | | Node | |
| 940 | 0F | 00 | 00 | 00 | 00 | 00 | EXPERIMENTAL METADATA | Class 15 Experimental Metadata | Class 15 Metadata is for experimental metadata. Users may create their own structures consistent with the metadata Encoding standard. | #REF! | | | Node | |

FIG. 36

ASSET MANAGEMENT SYSTEM AND ASSET MANAGEMENT METHOD

TECHNICAL FIELD

This invention relates to a system and a method for asset management for managing an essence. Also, this invention relates to a production system and a production method for creating a project from an essence. Also, this invention relates to an archiving system and an archiving method for archiving an essence. Also, this invention relates to a distribution system and a distribution method for allotting an essence. Also, this invention relates to an authoring system and an authoring method for creating a package medium from an essence. Also, this invention relates to a production system and a production method for creating a programme from an essence. Further, this invention relates to a production system for creating an essence and a control method thereof.

BACKGROUND ART

Recently, standardization on metadata is going on in SMPTE (Society of Motion Picture and Television Engineers) and the semantics for an essence specifying the contents or a wrapper meaning metadata and the essence combined together have been defined. Moreover, proposals have been made for the KLV (key length value) protocol or the UMID (unique material identifier) as a data structure of metadata and for a metadata dictionary as a collection of specified metadata per se, and the corresponding standardization is also proceeding.

Meanwhile, in a broadcasting station, shortage in programme software is posing a problem due to advent of multiple channels and multi-media, so that it is becoming crucial how the programme software is procured to improve the services as the cost is minimized and as the programme quality, that is the quality of the contents, is maintained. This is tantamount to how video/audio data can be processed efficiency in the sequence of the processing operations from acquisition and preparation until editing, transmission and archiving, such that medium asset management including a structure of an archiving system for re-utilization of past programmes is an incumbent task.

DISCLOSURE OF THE INVENTION

It is therefore an object of the present invention to provide an asset management system and an asset management method for managing the essence so that a sequence of operations from acquisition and formulation until editing, transmission and archiving will be managed efficiently.

It is another object of the present invention to provide a production system and a production method which can create a project from an essence efficiently.

It is another object of the present invention to provide an archiving system and an archiving method which can archive an essence efficiently.

It is another object of the present invention to provide a distribution system and a distribution method which can allot the essence efficiently.

It is another object of the present invention to provide an authoring system and an authoring method which can create a package medium efficiently from an essence.

It is another object of the present invention to provide an asset management system and an asset management method which can manage an essence efficiently.

It is a further object of the present invention to provide a production system for creating an essence efficiently and a control method thereof.

In its one aspect, the present invention provides an asset management system for managing an essence, including means for creating the essence and for generating metadata for explaining the essence when creating the essence, means for archiving the essence and the metadata correlatively with each other, and means for controlling an operation performed on the archived essence based on the metadata to realize asset management for the essence.

In another aspect, the present invention provides an asset management system for managing an essence, including means for generating the information for explaining the essence, means for recording and/or reproducing the essence and the information correlatively with each other, and means for managing and/or controlling a recording and/or reproducing operation of the essence based on the information to effect asset management for the essence.

In another aspect, the present invention provides an asset management system for managing an essence, including means generating the information specifying attributes of the essence, recording the essence and the information correlatively with each other on a recording medium to reproduce the essence from the recording medium and control means for controlling the recording and/or reproducing operations for the essence based on the information to effect asset management for the essence.

In another aspect, the present invention provides an asset management method for managing an essence, including creating the essence and for generating metadata for explaining the essence when creating the essence, correlating the essence and the metadata with each other, and controlling an operation performed on the archived essence based on the metadata to realize asset management for the essence.

In another aspect, the present invention provides an asset management method for managing an essence, including generating the information for explaining the essence and controlling the recording and/or reproducing operation of recording and/or reproducing the essence and the information correlatively with each other based on the information to effect asset management for the essence.

In another aspect, the present invention provides an asset management method for managing an essence, including generating the information specifying attributes of the essence, recording the essence and the information correlatively with each other on a recording medium and controlling the recording and/or reproducing operations for the essence based on the information to effect asset management for the essence.

In its one aspect, the present invention provides a production system for creating a project from an essence; production for creating the essence and for generating metadata for accounting for the essence; and post-production of creating the project from the essence using metadata generated at the time of the production.

In another aspect, the present invention provides a production system for creating a project from an essence; production for creating the essence and for generating metadata for accounting for the essence; and post-production of creating the project from the essence; wherein an operation of the post-production is controlled based on metadata generated at the time of the production.

In another aspect, the present invention provides a production method for A creating a project from an essence; creating the essence and generating metadata used for accounting for the essence; and creating the project from the essence using the metadata.

In another aspect, the present invention provides a production method for creating a project from an essence; creating the essence and generating metadata used for accounting for the essence; and controlling an operation of post-production based on the metadata to create the project from the essence.

In its one aspect, the present invention provides a production system for creating a project from an essence, comprising: pre-production for creating metadata used for accounting for the essence; production for performing an operation for creating the essence, using the metadata; and post-production for creating the project from the essence.

In another aspect, the present invention provides a production system for creating a project from an essence, comprising: a pre-production for creating metadata used for accounting for the essence; a production for creating the essence and for storing the essence and the metadata correlatively with each other on a recording medium; and a post-production for creating the project from the essence; wherein an operation in the production is performed using the metadata generated at the time of the pre-production.

In its one aspect, the present invention provides an archiving system for archiving an essence, comprising: production for creating the essence and for generating metadata used for accounting the essence; archiving means for archiving the essence and the metadata correlatively with each other; and means for controlling the archiving means so that an operation for the essence will be performed using the metadata.

In another aspect, the present invention provides an archiving system for archiving an essence, comprising: production for creating the essence and for generating metadata used for accounting the essence; archiving means for archiving the essence and the metadata correlatively with each other; and controlling means for controlling the archiving means so that asset management for the essence archived by the archiving means will be performed based on the metadata.

In another aspect, the present invention provides a method for archiving an essence, comprising: creating the essence and generating metadata used for accounting the essence; performing an operation for the essence using the metadata; and archiving and essence and the metadata correlatively with each other.

In another aspect, the present invention provides a method for archiving an essence, comprising: creating the essence and generating metadata pertinent to the essence; and performing control based on the metadata so that an asset management for the essence archived will be performed to archive the essence and the metadata correlatively with each other.

In its one aspect, the present invention provides a distribution system for allotting an essence, comprising: a production for creating the essence and for generating metadata pertinent to the essence; a post-production for performing post-production processing on the essence; and distribution means for allotting the essence using metadata generated at the time of the production.

In another aspect, the present invention provides a distribution system for allotting an essence, comprising: a production for creating the essence and for generating metadata pertinent to the essence; a post-production for performing post-production processing on the essence; and distribution means for allotting the essence; wherein an operation of the distribution means is controlled using the metadata used at the time of the production.

In another aspect, the present invention provides a distribution method for allotting an essence, comprising: creating the essence and generating metadata pertinent to the essence; performing post-production processing on the essence; and allotting the essence using metadata generated at the time of the production.

In another aspect, the present invention provides a distribution method for allotting an essence, comprising: creating the essence and generating metadata pertinent to the essence; performing post-production processing on the essence; and controlling an operation of distribution, using the data, to allot the essence.

In its one aspect, the present invention provides an authoring system for creating a package medium from an essence, comprising: a production for creating the essence and for generating metadata pertinent to the essence; a post-production for performing post-production on the essence; and authoring means for creating the package medium from an essence processed with post-production, using metadata generated at the time of the production.

In another aspect, the present invention provides an authoring method for creating a package medium from an essence, comprising: creating the essence and generating metadata pertinent to the essence; performing post-production on the essence; and creating the package medium from an essence processed with post-production using metadata.

In another aspect, the present invention provides an authoring method for creating a package medium from an essence, comprising: generating metadata pertinent to the essence; creating the essence; performing post-production on the essence; and creating the package medium from an essence processed with post-production using the metadata.

In its one aspect, the present invention provides an asset management system for managing an essence, comprising: a pre-production for generating metadata indicating the rights of the essence and; a production for creating the essence; asset management means for performing asset management processing on the essence; and means for controlling the asset management means so that a circulation operation of the essence will be performed based on the metadata.

In another aspect, the present invention provides an asset management system for managing an essence, comprising: means for creating the essence and for generating metadata specifying rights pertinent to the essence; asset management means for performing asset management processing on the essence; and means for controlling the asset management means, based on the metadata, so that a circulating operation of the essence will be performed based on the metadata.

In another aspect, the present invention provides an asset management method for managing an essence, comprising: generating metadata indicating the rights of the essence; creating the essence; and performing control based on the metadata so that a circulating operation of the essence will be performed to effect asset management processing on the essence.

In another aspect, the present invention provides an asset management method for managing an essence, comprising: creating the essence and for generating metadata specifying rights pertinent to the essence; and performing control based on the metadata so that a circulation operation of the essence will be performed to effect asset management processing for the essence.

In its one aspect, the present invention provides a production system for creating a programme from an essence, comprising: a production for creating the essence and for generating UMID (unique material identifier) for discriminating the essence; a post-production for editing the essence for generating the programme; and means for controlling an operation in the post-production based on the UMID.

In another aspect, the present invention provides a production method for creating a programme from an essence, comprising: creating the essence and for generating UMID (unique material identifier) for discriminating the essence; and controlling an operation in the post-production based on the UMID to edit the essence to generate the programme.

In its one aspect, the present invention provides a production system for creating an essence, comprising: means for generating a plurality of metadata which are data pertinent to the essence and which are respectively identified by SMPTE (Society of Motion Picture and Television Engineers) labels; means for receiving the essence and the plural metadata and analyzing the SMPTE labels to extract pre-set metadata from the plural metadata; and means for controlling the processing relevant to the essence based on the extracted metadata.

In another aspect, the present invention provides a control method of a production system for creating an essence, comprising: generating a plurality of metadata which are data pertinent to the essence and which are respectively identified by SMPTE (Society of Motion Picture and Television Engineers) labels; receiving the essence and the plural metadata and analyzing the SMPTE labels to extract pre-set metadata from the plural metadata; and controlling the processing relevant to the essence based on the extracted metadata.

BRIEF DESCRIPTION OF THE INVENTION

Figures 3A, 3B:
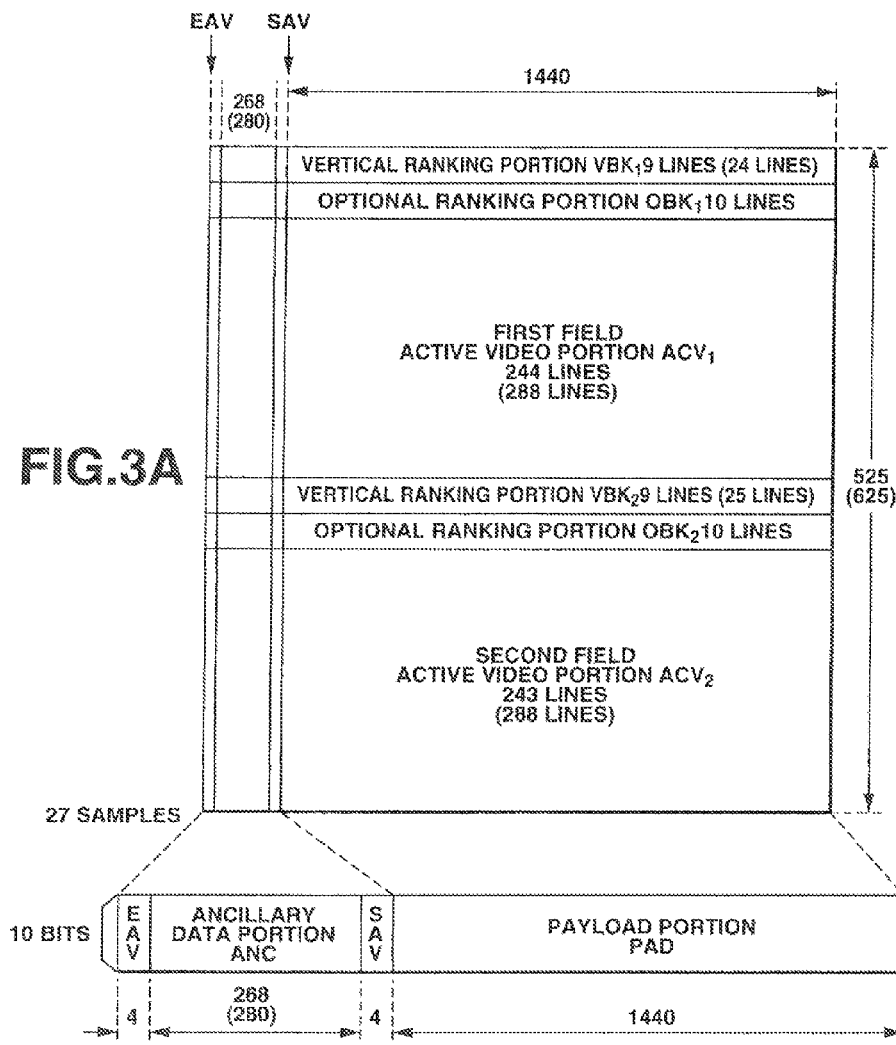

FIGS. 3A and 3B schematically show a data structure of the SDI format.

Figures 4A, 4B:
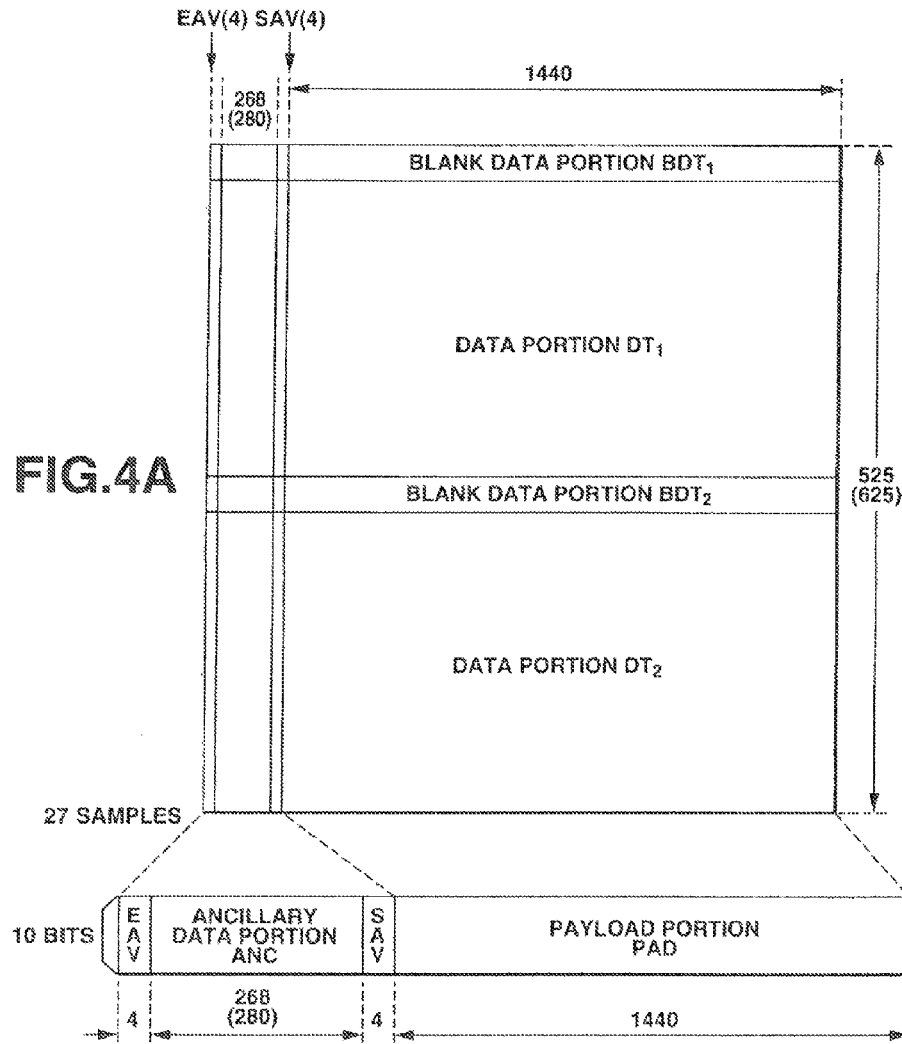

FIGS. 4A and 4B schematically show a data structure of the SDTI format.

Figure 5:
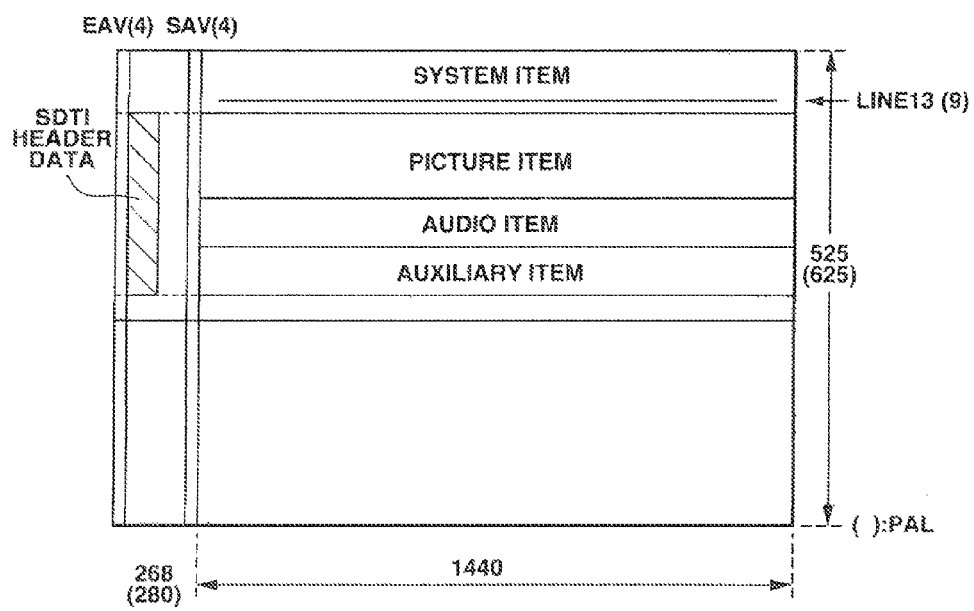

FIG. 5 schematically shows a data structure of the SDTI-CP format.

Figure 6:
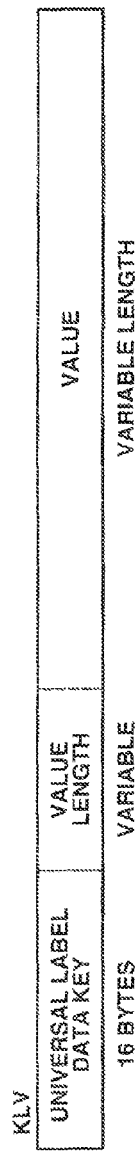

FIG. 6 schematically shows a data structure of the KLV format.

Figure 7:
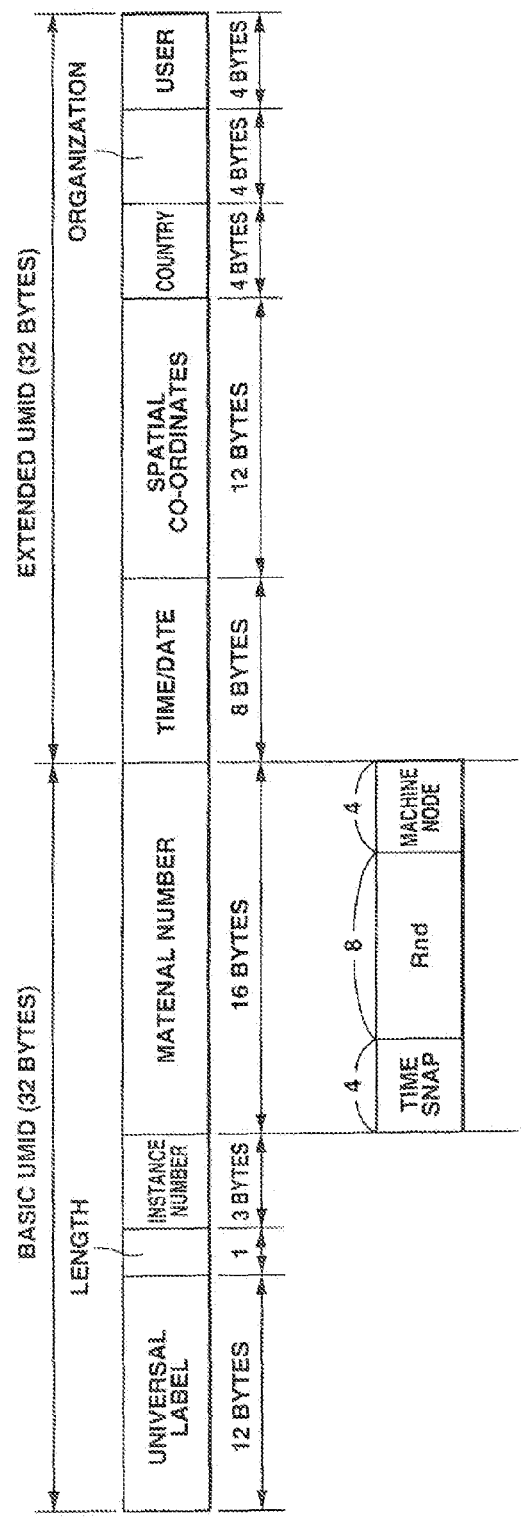

FIG. 7 schematically shows a data structure of UMID.

FIG. 8 shows contents of a metadata dictionary which is a dictionary rule taking a universal label standardized in the SMPTE298M into keys.

Figure 37:
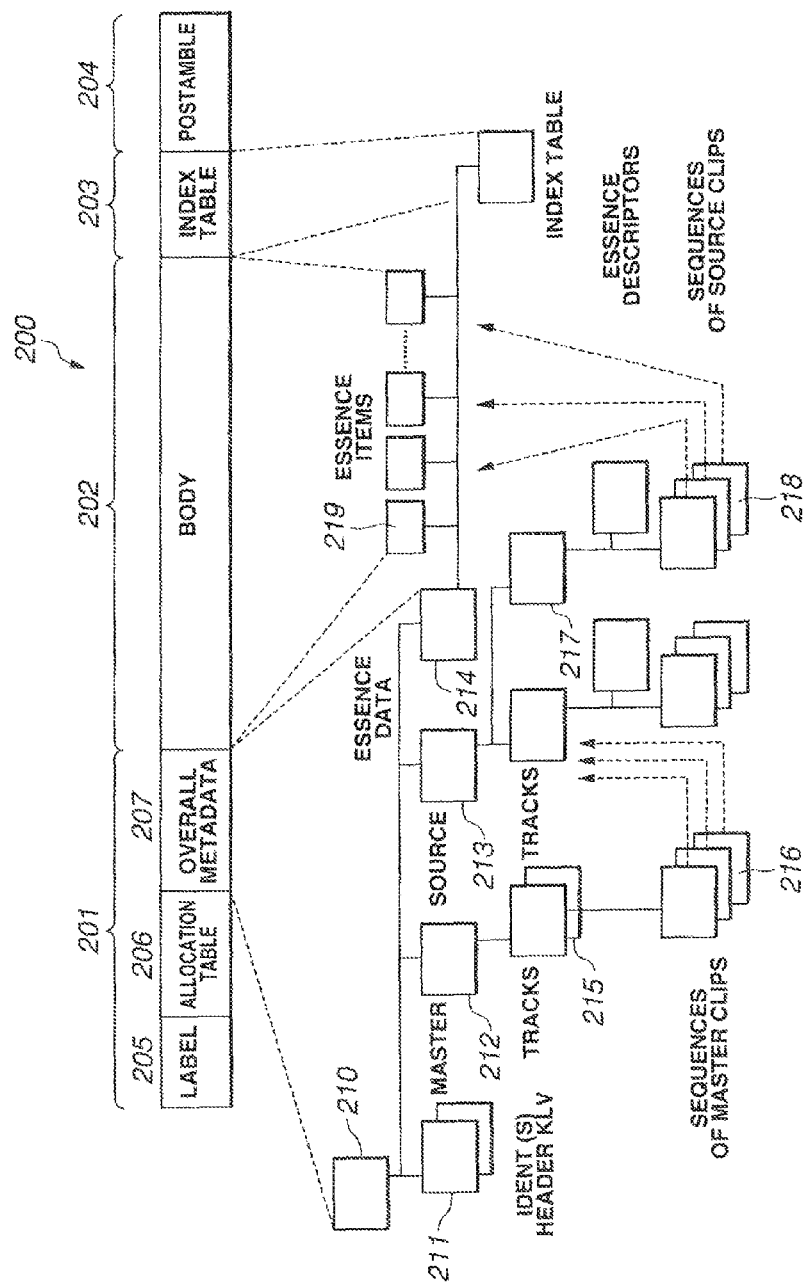

FIG. 9 shows the contents of a metadata dictionary.
FIG. 10 shows the contents of a metadata dictionary.
FIG. 11 shows the contents of a metadata dictionary.
FIG. 12 shows the contents of a metadata dictionary.
FIG. 13 shows the contents of a metadata dictionary.
FIG. 14 shows the contents of a metadata dictionary.
FIG. 15 shows the contents of a metadata dictionary.
FIG. 16 shows the contents of a metadata dictionary.
FIG. 17 shows the contents of a metadata dictionary.
FIG. 18 shows the contents of a metadata dictionary.
FIG. 19 shows the contents of a metadata dictionary.
FIG. 20 shows the contents of a metadata dictionary.
FIG. 21 shows the contents of a metadata dictionary.
FIG. 22 shows the contents of a metadata dictionary.
FIG. 23 shows the contents of a metadata dictionary.
FIG. 24 shows the contents of a metadata dictionary.
FIG. 25 shows the contents of a metadata dictionary.
FIG. 26 shows the contents of a metadata dictionary.
FIG. 27 shows the contents of a metadata dictionary.
FIG. 28 shows the contents of a metadata dictionary.
FIG. 29 shows the contents of a metadata dictionary.
FIG. 30 shows the contents of a metadata dictionary.
FIG. 31 shows the contents of a metadata dictionary.
FIG. 32 shows the contents of a metadata dictionary.
FIG. 33 shows the contents of a metadata dictionary.
FIG. 34 shows the contents of a metadata dictionary.
FIG. 35 shows the contents of a metadata dictionary.
FIG. 36 shows the contents of a metadata dictionary.
FIG. 37 shows the contents of a metadata dictionary.

Figure 38:
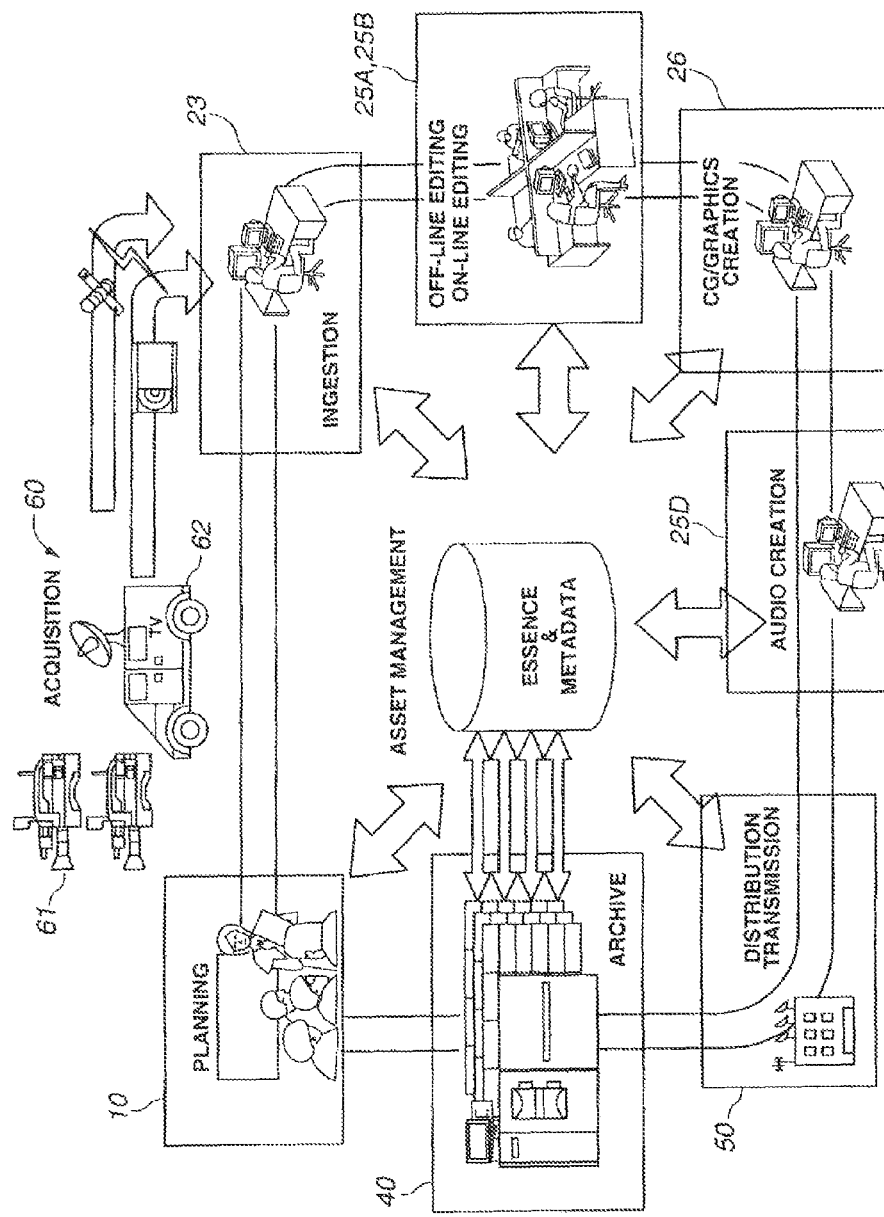

FIG. 38 schematically shows the structure of an asset management system along with the processing sequence of the programme creation and distribution operation in the programme preparation and distribution system.

Figure 39:
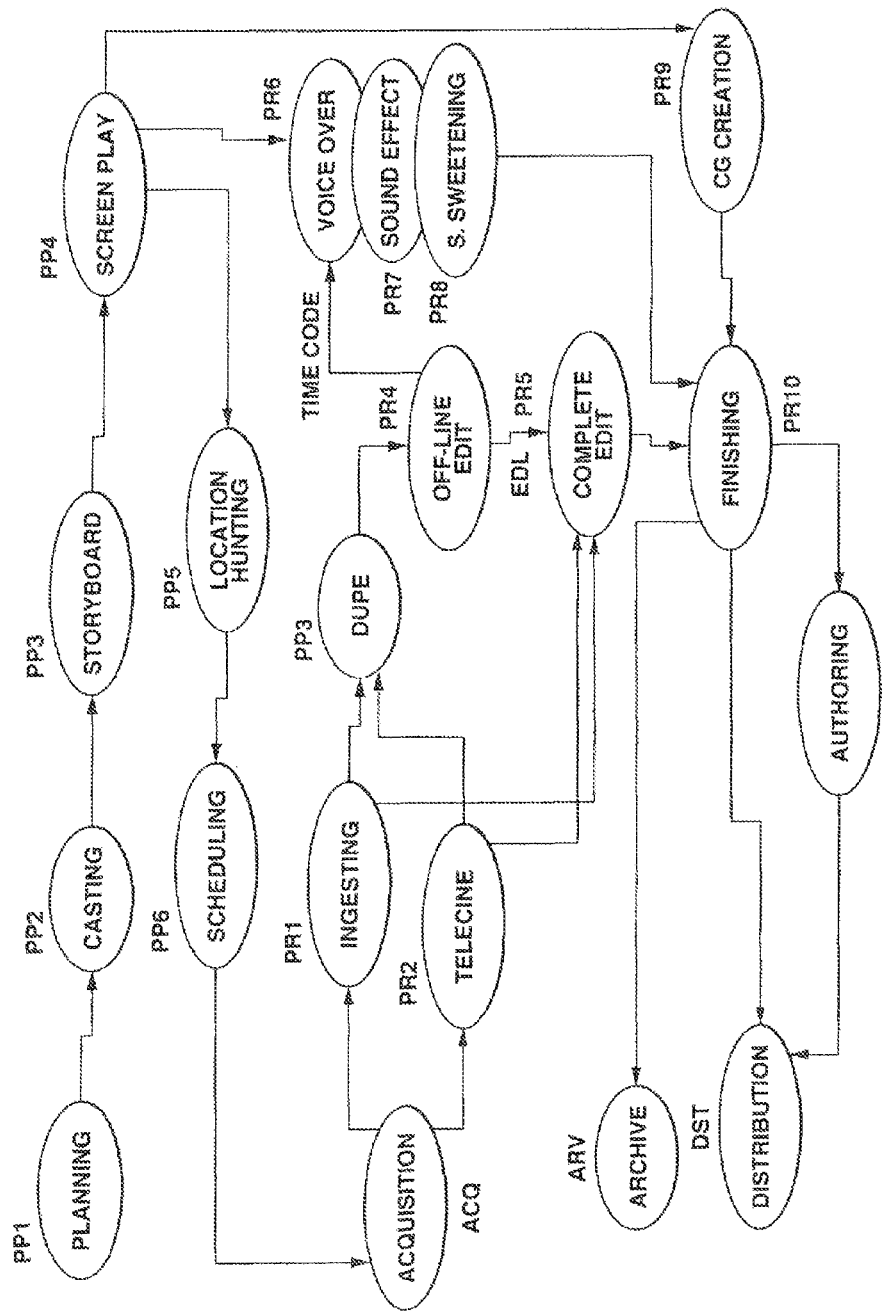

FIG. 39 is a flowchart for illustrating the programme preparation distribution operation in the programme preparation and distribution system.

BEST MODE FOR CARRYING OUT THE INVENTION

Referring to the drawings, preferred embodiment of the present invention are explained in detail.

Figure 1:
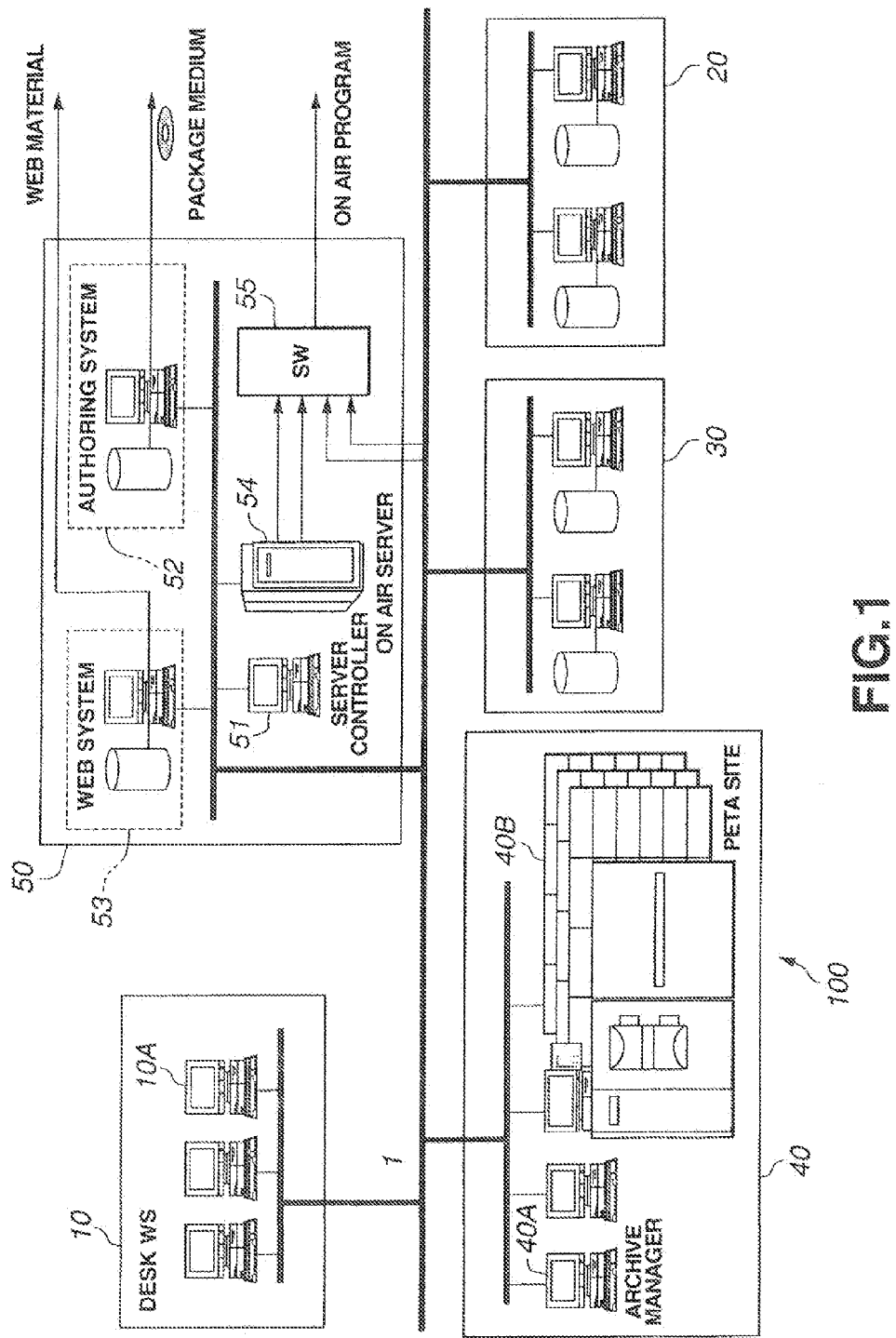
FIG. 1 shows a system structure showing the structure of a programme creation and distribution system embodying the present invention.

The present invention is applied to a programme preparation and distribution system 100 configured as shown for example in FIG. 1.

This programme preparation and distribution system 100 includes a distributed programme editing system 10, connected over a gigabit Ethernet 1, a production system 20, a news system 30, an archive system 40, a programme distribution system 50 and an acquisition system 60 for acquiring the video or audio to be furnished to the production system 20.

The programme preparation and distribution system 100 is a system for so-called pre-production processing prior to shooting in which a producer or a director and the staff members consult as to the programme distribution contents. The persons concerned in preparing a programme are adapted to consult on the programme distribution contents through plural workstations connected to the gigabit Ethernet 1.

Figure 2:
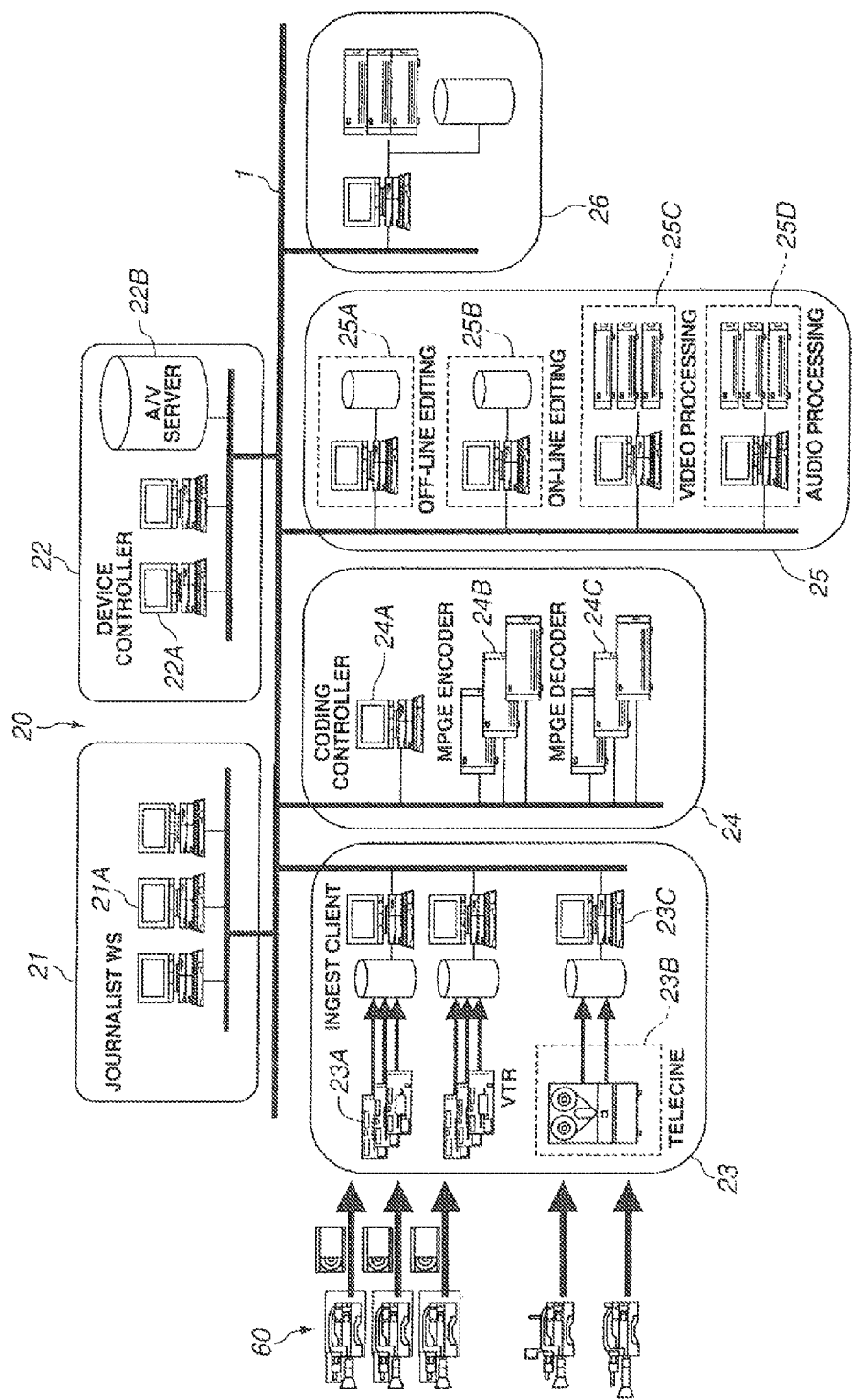
FIG. 2 shows a system structure showing the structure of a production system in the programme creation and distribution system.

The production system 20 is a system for shooting and programme preparation by image or speech collection and includes a recording management system 21 in which recording staff members input necessary items, a production management system 22, an ingest system 23 for storing the video or audio acquired by the acquisition system 60, a coding system 24 for coding processing of the speech or the audio, an editing/processing system 25 for editing the speech or the audio, and a CG creation system 26 for displaying an image in superposition by computer graphics (CG) to crate a weather map or letters, as shown for example in FIG. 2.

The recording management system 21 is made up of plural workstations 21A, connected to the gigabit Ethernet 1, and is adapted to permit a news writer to enter an article through the workstations 21A. The production management system 22 is made up e.g., of a device controller 22A and an A/V server 22B, connected to the gigabit Ethernet 1. The ingest system 23 is made up of a reproducing device 23A for reproducing the video or audio recorded on a video tape, a telecine device 23B for converting an image imaged on a film into video signals, and a plurality of ingest clients 23C connected to the gigabit Ethernet 1, and is configured for storing the video or the audio acquired by the acquisition system 60 through the reproducing device 23A and the telecine device 23B on the ingest clients 23C. The coding system 24 is made up of a coding controller 24A, an MPEG encoder 24B and an MPEG decoder 24C, connected to the gigabit Ethernet 1. The editing/processing system 25 is made up of an off-line editing device 25A, an on-line editing device 25B, a video processing device 25C and an audio processing device 25D.

The news system 30 is a system for collectively managing the news information and manages on-air items and materials, that is manages which material is undergoing which stage of processing.

The archive system 40 is a system preserving video and audio data, and includes an archive manager 40A and a petasite 40B, connected to the gigabit Ethernet 1. In the petasite 40B are preserved essence and metadata.

The programme distribution system 50 includes a server controller 51, an authoring system 52, a web system 53 and an on-air server 54, connected to the gigabit Ethernet 1. The programme distribution system 50 also includes a routing switch 55 for selecting the on-air programme.

The acquisition system 60 is made up of a video camera 61, a relaying car 62 etc.

This programme preparation and distribution system 100 is a picture processing system in which a broadcasting station, a video producing firm etc has the functions of recording the video or the audio, referred to below as material, editing and processing these materials to prepare a picture for distribution, and of preserving the pictures. In the picture processing steps, such as recording, editing or preserving the materials, the supplementary information for discriminating the materials in detail is inputted to the recording medium or a dedicated recording server in the picture processing steps, such as recording, editing or preserving the materials.

As the supplementary information, metadata is used. The metadata denotes data for stating the necessary information for discriminating the materials obtained on recording, such as recording time, recording ID, recording title, or the name of a photographer or a reporter.

In the present programme preparation and distribution system 100, the transmission format used in transmitting video or audio data or the metadata is the SDI (Serial Digital Interface) as a digital transmission format standardized by SMPTE. FIG. 3A shows the structure of the entire SDI format data.

The SDI format includes a 4-dot EAV (End of Video) area, indicating the end of synchronization, a 268-dot AND (ancillary) area, a 4-dot SAV (start of video) area, indicating start synchronization, and a 140-dot active video area, and is made up of 525 lines. The numerals entered in parentheses indicate the values defined in accordance with the PAL (phase alternation line) system.

The active video area includes a 9-line vertical blanking portion ($VBK_1$), a 10-line optional blanking portion ($OBK_1$), a 244-line active video portion ($ACV_1$), a 9-line vertical blanking portion ($VBK_2$), a 10-line optional blanking portion ($OBK_2$) and a 243-line active video area ($ACV_2$).

The SDI is a format for transmitting the non-compression digital data, such as D1 or D2 format, in which audio data is stored in an ancillary area and video data such as D1 or D2 is stored in the active video area. In the SDI format, metadata are transmitted by being inserted into the ancillary area.

FIG. 3B shows one line of the SDI format. In transmission, data with 10 bits per line is transmitted on parallel/serial conversion and transmission path encoding.

As the transmission format for transmitting video, audio and metadata in the picture processing system, there are an SDTI (Serial Digital Transfer Interface) format for transmitting the data compressed by the MPEG system or the DV system, or the SDTI-CP (Serial Digital Transfer Interface—Content Package) format which is further limited from SDTI format, may be used in addition to the above-described SDI format.

FIG. 4A shows a data structure of the SDTI format. Similarly to the SDI format, the SDTI format has a 4-dot EAV (end of video) area, indicating the end synchronization, a 268-dot ANC (ancillary) area and a 4-dot SAV (Start of Video) area, indicating the start synchronization. However, in the SDI format, the active video area, constituted by 525 lines in the SDI format, is defined to be the payload area. It is noted that numerals in parentheses indicate values defined by the PAL (phase alternation line) system.

In the SDTI format, the payload-area has blank data portions ($BDT_1$, $BDT_2$) and data portions ($DT_1$, $DT_2$). However, the number of lines in each data portion is not defined.

FIG. 4B shows a line of the SDTI format. When data is transmitted by the SDTI format, data of 10 bit width per line is transmitted on parallel/serial conversion and transmission path encoding.

In the SDTI format, 53-word SDTI header data, in which to insert the transmission source address, destination address and the line number. CRC etc, is contained in the ancillary area. In the SDTI format, the metadata is inserted into an area of the ancillary area excluding the SDTI header data.

FIG. 5 shows a data area of the SDTI-CP format data structure. The packet structure in the SDTI-CP is further limitation of the SDTI format and modifies the payload structure-to facilitate insertion of variable data.

The data transmitted by the SDTI-CP format includes not only MPEG (Moving Picture Experts Group) 2 video elementary stream, but a variety of data, such as supplementary data, including audio data or metadata, which may be transmitted collectively with the MPEG2 Video Elementary Stream.

The data inserted into the payload is partitioned by "items", while the variable data is included in each item. Specifically, there are four sorts of items, namely a System Item, a Picture Item, an Audio Item and an Auxiliary Item.

The System Item has areas such as System Item Bitmap, Content Package rate, SMPTE Universal Label, Package Metadata Set, Picture Metadata Set, Audio Metadata Set and Auxiliary Metadata Set.

In the SDTI-CP format, metadata is inserted into Package Metadata Set, Picture Metadata Set, Audio Metadata Set and Auxiliary Metadata Set for transmission.

The metadata is the inherent data added and inputted to discriminate materials such as video and audio data, and is transmitted in accordance with the KLV (Key Length Value) consistent with the SMPTE standard and also in accordance with the UMID (Unique Material Identifier) data format.

The KLV format is the data transmitting format having three areas, namely a 16-byte Universal Label Data Key stating the Universal Label Data, a Value Length indicating the data length of metadata stored in the Value area and a Value in which to store the actual metadata corresponding to the SMPTE Dictionary. FIG. 6 shows the KLV format.

The Universal Label Data Key is a data area for applying unique labelling to stored metadata. The Universal Label Data Key is further divided into a UL (Universal Label) Header area, including a 1-byte Object ID, and a 1-byte UL (Universal Label) Size, a UL (Universal Label) Designators area, including a UL (Universal Label) Code, SMPTB Design, Registry Design, Data Design and Reference Version, each being 1-byte, and a 9-byte Data Element Tag area.

The UMID is an identifier uniquely determined for discriminating video data, audio (speech) data and other material data. FIG. 7 shows a UMID data structure.

The UMID is made up of a Basic UMID as ID for discriminating material data made up of a sequence of pictures, speech and metadata, referred to below as contents, and Extended UMID as a signature for discriminating the respective contents in the material data.

The Basic UMID has a 32-byte data area, which is made up of a 12-byte Universal Label area, a 1-byte Length Value area, a 3-byte Instance Number area and a 16-byte material Number area.

The Universal Label area has codes for discriminating digital data stored therein, as standardized in detail in SMPTE-298M. The Length Value area denotes the length of UMID. Since the Basic UMID differs in code length from Extended UMID, the Basic UMID is denoted by 13h and the Extended UMID is denoted by 33h. The Instance Number area indicates whether or not the material data has been processed with overwrite processing or editing processing. The Material Number area has three areas, in which are stored codes for distinguishing material data.

The Time Snap, indicated by 4 bytes, denotes the number of snap clock samples per day. That is, it denotes the time of preparation of the material data in terms of clocks as unit. The 8-byte Rnd (random number) is a random number which prevents duplex numbers from being affixed in case incorrect time is set or in case the network address of an equipment defined by IEEE (The Institute of Electrical and Electronics Engineers) is changed.

On the other hand, the Extended UMID is made up of 8-byte Time/Date Code for discriminating the time and the date of preparation of a material in question, 12-byte Spatial Co-ordinates, defining the correction concerning the time of preparation of the material (time difference information) or the position information represented by the latitude, longitude or altitude, 4-byte Alphanumeric Code (Country) defining the name of a nation 4 by abbreviated alphabetical letters or symbols, 4-byte Alphanumeric Code (Organization) defining a name of an organization, and 4-byte Alphanumeric Code (User) defining the name of a user who prepared a material.

It is noted that metadata indicating the picture size, generation number etc is not contained in the above-described Basic UMID or Extended UMID. In particular, the Material Number is not indicative of the other information concerning the status or the picture of a material. The metadata indicating the picture size or the generation number is transmitted-based on the KLV format.

It is noted that, in a metadata dictionary, which is the dictionary provisions which have taken the universal label standardized in the SMPTE 298M into keys, the metadata having the following data elements are prescribed:

That is, there are prescribed, as names of data elements corresponding to the SMPTE label, class 11D and locators (IDENTIFIERS & LOCATORS), globally unique ID (Globally Unique Identifiers), UMID video (UMID Video), UMID audio (UMID Audio), UMID data (UMID Data), UMID system (UMID System), International Broadcasting Organization ID (International Broadcasting Organization Identifiers), organization division (Organization Identifiers), Programme ID (Programme Identifiers), UPID (UPID), UPN (UPN), media ID (Physical Media Identifier), tape ID (Tape Identifier), EBU ID NO (IBTN), ISO ID (ISO Identifiers), ISO audio visual NO (ISAN), ISO book NO (ISBN), ISO serial NO (ISSN), ISO musical work code (ISWC), ISO printed music NO (ISMN), ISO commercial ID (SCI), ISO recording code (ISRC), ISO report NO (ISRN), ISO term synopsis (ISBD), ISO textual work code (ISTC), digital object ID (DO1), compound ID (Compound IDs), serial item and contribution ID (SICI), serial item and contribution ID (SICI), book item and component ID (SICI), audio visual item and component ID (AICI), distributot ID (PII), object ID (Object Identifiers) and Internet global unique ID (GUID), as shown with #1 to #33 in FIG. 8.

There are also prescribed, as names of data elements corresponding to the SMPTE label (GUID and SMPTE label identifiers), meta data object ID (MobID), details of the object ID (Definition object identifiers), details of the object ID (DefinitionObject identifiers), container version indication (GenerationAUID), CNIR (CNRI Handles), device ID (Device Identifiers), device designation (Device Designation), device preparation (Device Make), device model (Device Model), device serial NO (Device Serial Number), globally unique locators (Globally Unique Locators), unique resource ID (UR locators (and "Identifiers")), unique resource locators (URL), unicord URLstring (URLString), continuation URL (PURL), resource name (URN), media locator (Media locators), local ID (Local Identifiers), administrative identifiers (Administrative identifiers), transmitting ID (Transmission Identifiers) archive identifier (Archive Identifier), item ID (Item ID), accounting reference NO (Accounting Reference), Transmission Billing (Traffic), physical media ID (Physical Media Identifiers), film code (Film codes), reel NO (Reel/Roll number), tape ID (tape number), object ID (Object Identifiers ) and locally unique ID (LUID), as shown with #34 to #66 in FIG. 9.

There are also prescribed, as data element names corresponding to the SMPTE labels, slot ID (SlotID), object text ID (Object text identifiers), name of group (Mob_name), name of slot (SlotName), object name (DefinitionObject_Name), local locators (Local Locators), local media locator (Local Media locators), local file path (Local File Path), film locator (Film Locators), edge code (Edge Code), frame code (Frame Code), key code (Key Code), Ink No (Ink number), segment start code (EdgeCode_Start), proxy locator (Proxy locators), proxy key text (Key text), proxy key frame (Key Frame), proxy key sound (Key Sound), key data (Key data or programme), free writing (Free-form, human readable locator), free writing name (TextLocator_Name), title (Titles), title kind (Title kind), main title.(Main Title), sub-title (Secondary title), series NO (Series number), episode NO (Episode Number), scene number (Scene Number), take NO Cake Number), owner (Unique IPR Identifiers), owner by CISAC (IPI (SUISA/CISAC)), natural person/legal entity (Natural Person/legal entity) and ID by AGICOA (AGICOA/MPAA), as shown with #67 to #99 in FIG. 10.

There are also prescribed, as names of data elements associated with the SMPTE label, AGICOLA ID (AGICOLA/MPAA Identifier), class 2 administration (ADMINISTRATION), supplier (Supplier), source organization (Source Organization), contract NO (Supply contract number), original producer name (Original Producer Name), product (Product), the total number of episodes in a series (Total number of Episodes in a Series), rights (Rights), copyright (Copyright), copyright status (Copyright Status), copyright owner (Copyright Owner), intellectual rights (Intellectual Rights), intellectual rights type (IP type), details of IP rights (IP Rights), legal personalities (Legal personalities), owner (Rights Owner), rights management authority (Rights Management Authority), interested parties (Interested Parties), ancillary information to property rights (IP Rights options), maximum number of usages (Maximum Number of Usages), licence options (Licence options), financial information (Financial information), currency (Currency), payments and costing (Payments and costing), royalty information (Royalty Financial Information), profit information (Income), royalty financial information (Royalty Financial Information), access permission (Permitted Access), access level (Restrictions on Use), security (Security) and degree of technical access (System Access), as shown with #100 to #132 in FIG. 11.

There are also prescribed, as names of data elements associated with the SMPTE label, a user name (Username), a user name (User Name), a password (Password), a password (Password), a motion picture film (Film), a scramble key kind (Scramble key kind), a scramble key value (Scramble key value), a publication outlet (Publication Outlet), a broadcast outlet information (Broadcast), broadcaster (Broadcaster), a name (Name), a channel (Channel), a transmission medium (Transmission Medium), a broadcast region (Broadcast Region), broadcast and repeat statistics (Broadcast and Repeat Statistics), a first broadcast flag (First Broadcast Flag), a repeat number (Repeat Number), a current repeat number (Current repeat number), a previous repeat number (Previous repeat number), a rating (Rating), an audience rating (Audience rating), an audience reach (Audience reach), other ratings (Other ratings), participating parties (Participating parties), representative persons (Persons (Groups and Individuals)), nature of person (Group of individuals) (Nature of Person (Group of individuals)), support and administration (Support and Administration), support and administration staffs (Support/Administration Status)), organizations and public bodies (Organizations or Public Bodies) and kinds of organizations and public bodies (Kind of Organizations or Public Bodies), as shown. with #133 to #165 in FIG. 12.

There are also prescribed, as names of data elements associated with the SMPTE label, a production (Production), a film labo (Contribution Status), support and administration (Support and Administration), a support and administration staff (Support and Administration Status), job function information (Job Function Information), a job function (Job Function), a role (Role/Identity), contact information (Contact Information), contact kind (Contact kind), contact department (Contact Department), representative (Person or Organization Details), person name (Person name), a family name (Family name), a first given name (First Given name), a second given name (Second Given name), a third given name Third Given name),a group name (Group name), a main name (Main name), a supplementary name (Supplementary name), an organization name (Organization name), a main name (Main name), a supplementary organization name (Supplementary organization name), a class 3 interpreter (INTERPRETATIVE), fundamental information (Fundamental), countries (Countries), an ISO 3166 country code (ISO 3166 Country Code System), an ISO 3166 country code (ISO 3166 Country Code System), an ISO language code (ISO language code), an ISO language code (ISO language code), interpretative parameters (Data Interpretations), OS characteristics (Operating system interpretations), a fundamental 4 definitions (Fundamental Dimensions) and length (Length), as shown with #166 to #198 in FIG. 13.

There are also prescribed, as names of data elements associated with the SMPTE label, a length system (Length System), a length system (Length System), a length unit (Length Unit), a length unit (Length Unit), a time system (Time System), a time system (Time System), a time unit (Time Unit), a time unit (Time Unit), a mass (Mass), an energy (Energy), human assigned (Descriptive-Human Assigned), categorization (Categorization), content classification (Content Classification), a type (Type), a genre (Genre), target audience (Target Audience), cataloguing (Cataloguing and Indexing), catalogue history (Catalogue History), current status of metadata (Status of Data Set), current status of metadata (Status of Data Set), ID in use (Cataloguing, Indexing or Thesaurus system used), a theme (Theme), a genre (Genre), a sub-code (Subject Code), a keyword (Keywords), a key frame (Key Frame), key sounds (Key Sounds), key data (Key data), textural description (Textural Description), an abstract (Abstract), a purpose (Purpose) and description (Description), as shown with #199 to #231 in FIG. 14.

There are also prescribed, as names of data elements associated with the SMPTE label, a color descriptor (Color descriptor), a format descriptor (Format descriptor), a stratum (Stratum), a stratum kind (Stratum kind), supplementary information (Supplementary Information), assessments (Assessments), awards (Awards), individual (Individual), a programme (Programme), qualitative values (Qualitative Values), asset values (Asset Values), content value (Content Value), cultural quality (Cultural Quality), aesthetic value (Aesthetic Value), historic value (Historic Value), technical value (Technical Value), other values (Other Values), descriptors (Descriptors (Machine Assigned or Computed)), categorization (Categorization), content classification (Content Classification), cataloguing (Cataloguing and Indexing), catalogue history (Catalogue History), current status of metadata (Status of Data Set), cataloguing (Cataloguing and Indexing), a keyword (Keywords), a key frame (Key Frame), key sounds (Key Sounds), key data (Key data), textural description (Textural Description), a stratum (Stratum), a stratum kind (Stratum kind), a class 4 parameter (PARAMETRIC) and video encoding parameters (Video Essence Encoding Characteristics), as shown with #232 to #264 in FIG. 15.

There are also prescribed, as names of data elements associated with the SMPTE label, video fundamental characteristics (Video Fundamental Characteristics), a video source device (Video Source Device), OE conversion system (Fundamental opto-electronic formulation), gamma characteristics (gamma information), gamma equation (Gamma Equation), gamma (Gamma), luminance equation (Luma Equation), colorimetry code (Colorimetry Code), scanning information (Fundamental sequencing and scanning), a component sequence (Signal Form Code), color frame index (Color Field Code), a vertical rate (Vertical Rate), a frame rate (Frame Rate), image dimensions (Image dimensions), number of lines (Image lines), a total number of lines per frame (Total Lines perframe), active lines/frame (Active Lines per frame), leading lines (Leading Lines), trailing lines (Trailing Lines), horizontal and vertical dimensions (Horizontal and Vertical dimensions), an aspect ratio (Display Aspect Ratio), an image aspect ratio (Image Aspect Ratio), a capture aspect ratio (Capture aspect ratio), a stored height (Stored Height), a stored width (StoredWidth), a sampled height (Sampled Height), a sampled width (Sampled Width), a sampled X offset (Sampled X Offset), a sampled Y offset (Sampled Y Offset), a display height (Display Height), a display width (Display Width), and a display X offset (Display X Offset), as shown with #265 to #297 in FIG. 16.

There are also prescribed, as names of data elements associated with the SMPTE label, a display Y offset (Display Y Offset), video coding characteristics (Video Coding Characteristics), an analogue video system (Analogue Video System), a luminance sampling rate (Luminance Sample Rate), active samples per line (Active Samples per Line), total samples per line (Total Samples per Line), bits per pixel (Bits per Pixel), sampling information (Sampling Information), a sampling hierarchy code (Sampling Hierarchy Code), horizontal sampling ratio (Horizontal Subsampling), color siting (ColorSiting), a rounding method code (Rounding Method Code), a filtering code (Filtering Code), a sampling structure (Sampling Structure), sampling structure code (Sampling Structure Code), a frame layout (FrameLayout), line field information (VideoLineMap), alpha transparency (Alpha-Transparency), a component width (ComponentWidth), black reference level (BlackReferencelevel), white reference level (WhiteReferencelevel), color dynamic range (ColorRange), a pixel layout (PixelLayout), a color palette (Palette), pallet layout (PalletLayout), number of same data in the horizontal direction of original signals (Is Uniform), number of stored neighboring bytes (Is Contiguous), JPEG table (JPEG Table ID), TIFF parameters (TIFFDescriptor Summary), MPEG coding characteristics (MPEG coding characteristics), MPEG-2 coding characteristics (MPEG-2 coding characteristics), field frame type code (Field Frame Type Code) and film parameters (Film parameters), as shown with #298 to #330 in FIG. 17.

There are also prescribed, as names of data elements associated with the SMPTE label, a film to video parameters (Film to Video parameters), field dominance (Field Dominance), frame phase sequence (Framephase sequence), film pulldown characteristics (Film Pulldown characteristics), a pulldown sequence (pulldown sequence), a pulldown phase (Pull down phase), a pulldown kind (Pulldown kind), a pulldown direction (Pulldown Direction), a pulldown phase (Phase Frame), a film frame rate (Film Frame Rate), 24.00 fps (Capture Film Frame Rate), 23.976 fps (Transfer Film Frame rate), special frame rate (FilmDescriptor_Framerate), film characteristics (Film characteristics), film aperture characteristics (Film capture aperture), film color process (Film Color Process), edge code format (CodeFormat), header text (Header), video and film test parameters (Video and Film test parameters), video test parameters (Video test parameters), Test parameters (Test parameters), a test result (real number) (Test Result (real)), test result (integer) (Test Result (integer)), storage alignment (Video digital storage alignment), buffer size on frame storage (Image Alignment Factor), client fill start (Client Fill Start), client fill end (Client Fill End), padding bits (Padding Bits) and audio essence encoding characteristics (Audio Essence Encoding Characteristics), as shown with #331 to #363 in FIG. 18.

There are also prescribed, as names of data elements associated with the SMPTE label, audio fundamental characteristics (Audio Fundamental Characteristics), audio source device (Audio Source Device), fundamental audio formulation (Fundamental audio formulation), audio channel division (Electro-spatial formulation), audio filtering characteristics (Filtering applied), audio reference level (Audio reference level), number of audio channels in mix (Number of audio channels in mix), number of mono channels (Mono channels), number of stereo channels (Stereo channels), number of tracks (Physical Track number), a film sound source (Film sound source), optical track (Optical track), magnetic track (Magnetic track), analogue audio coding characteristics (Analogue Audio Coding Characteristics), an analogue system (Analogue system), audio sampling characteristics (Digital Audio Sampling Characteristics), sample rate (Sample rate), clock frequency (Reference clock frequency), bits per sample (Bits per sample), a rounding law (Rounding law), dither (Dither), audio coding characteristics (Digital Audio Coding Characteristics), a coding law (Coding law), number of layers (Layer number), an average bit rate (Average Bit rate), a fixed bitrate (Fixed bitrate), audio test parameters (Audio test parameters), SNR (Signal to noise ratio), weighting (Weighting), audio summary information (Audio summary information), AIFC format summary (AIFCDescriptor_Summary), WAVEformat summary (WAVEDescriptor_Summary) and an encoding method (Data. Essence Encoding Characteristics), as shown with #364 to #396 in FIG. 19.

There are also prescribed, as names of data elements associated with the SMPTE label, fundamental characteristics (Data Essence Fundamental Characteristics), information of original source signals (Analogue Data Essence Coding Characteristics), analogue data coding (Analogue Data Coding), digital coding characteristics (Digital Data Coding Characteristics), original recording data (Data test parameters), metadata encoding characteristics (Metadata Encoding Characteristics), metadata fundamental characteristics (metadata fundamental characteristics), time code characteristics (Timecode Characteristics), time code kind ((Timecode kind), time code kind ((Timecode kind), a drop frame (Drop), LTC/VITC (Source Type), time code time base (Timecode Timebase), frames/sec (FPS), user bit ON/OFF (Timecode User bit flag), start address (Start), time code sampling rate (TimecodeStream_Sample Rate), time code data itself (Source), time code with sync signal (IncludeSync), analogue metadata information (Analogue Metadata Coding Characteristics), an analogue metadata carrier (Analogue Metadata Carrier), digital metadata information (Digital Metadata Coding Characteristics), digital metadata carrier (Digital Metadata Carrier), metadata test characteristics (Metadata test parameters), system and control Encoding characteristics (System & Control Encoding Characteristics), system and control fundamental characteristics (System & Control Fundamental Characteristics), original analogue signal information (Analogue System & Control Coding Characteristics), analogue system (Analogue System & Control Coding), original digital signal information (Digital System Coding Characteristics), digital metadata information (Digital System Metadata Sampling Characteristics), original signal metadata characteristics (System Metadata test parameters) and general encoding characteristics (general encoding characteristics), as shown with #397 to #429 in FIG. 20.

There are also prescribed, as names of data elements associated with the SMPTE label, general essence encoding characteristics (General Essence Encoding Characteristics), a sampling rate (Samplerate), a length (Length), container encoding characteristics (Container encoding characteristics), byte sequence (ByteOrder), storage medium parameters (Storage Medium parameters), a tape cartridge format (Tape cartridge format), video tape gauge (Videotape gauge and format), tape size (FormFactor), a signal form (VideoSignal), a tape format (TapeFormat), recording length (Length), tape manufacturer (TapeDescriptor_ManufacturerID), a tape model (Model), disc recorder parameters (Disc recorder parameters), disc kind (Disc kind and format), film medium parameters (Film Medium Parameters), film stock manufacturers (Film stock manufacturers), a film stock. type (Film Stock type), perforation information (PerforationPerFrame), a film kind (FilmKind), a film format (FilmFormat), a film aspect ratio (FilmAspectRatio), manufacturer (Manufacturer), a model (Model), a film gauge (Film gauge and format), (Object Characteristics Placeholder)), device characteristics (Device Characteristics), camera characteristics (Camera Characteristics), optical characteristics (Optical Characteristics), focal length (Focal length), a CCD size (Sensor Size), and a lens aperture (Lens Aperture), as shown with #430 to #462 in FIG. 21.

There are also prescribed, as names of data elements associated with, the SMPTE label, a CCD size of original signals (Sensor Type Code), a field of view (Field of View), special lens (Anamorphic lens characteristics), optical test parameters (Optical Test Parameters), sensor characteristics (Optical sensor characteristics), flare characteristics (Flare), microphone characteristics (microphone Characteristics), a sensor type (Sensor type), polar characteristics (Polar characteristics), image characteristics (Image Characteristics), an image category (Image Category), class 5 creation process (PROCESS), process status flag (Process Indicators), fundamental information (Fundamental), shot, clip, segment indication (Integration Indication), a quality flag (Quality Flag), physical instance category (Physical Instance Category), capture (Capture), digital or analogue origination (Digital or analogue origination), microphone position (Microphone Placement techniques), dubbing information (Manipulation), number of times of change (Simple Flagging), copy numbers (Copy Number), a clone number (Clone Number), work in progress flag (Work in Progress Flag), analogue digital mixing (Digital or analogue mix), payload compression hysteresis (Downstream Processing History), a video compression history (Video Compression History), a video compression algorithm (Video Compression Algorithm), compression hysteresis data set (MPEG2 dynamic coding historical dataset), a noise reduction algorithm (Video Noise Reduction Algorithm), and compression (Compression), as shown with #463 to #495 in FIG. 22.

There are also prescribed, as names of data elements associated with the SMPTE label, audio compression history (Audio Compression History), audio compression algorithm (Audio Compression Algorithm), audio compression history data (MPEG-2 Audio Dynamic coding history), a noise reduction algorithm (Audio Noise Reduction Algorithm), a data compression history (Data Compression History), metadata compression history (Metadata Compression History), MPEG process (MPEG processing), splicing metadata (Splicing Metadata), correction of the essence (Enhancement of Modification), correction of video signals (Video processing), description of correction (Enhancement of Modification Description), device designation (Video processor settings (Device-specific)), device kind (Device kind), device parameters (Device parameters), device parameter setting (Device parameter setting), audio processing (Audio processing), description of correction (Enhancement of Modification Description), audio processor settings (Device-specific), a device kind (Device kind), device parameters (Device parameters), device parameter setting (Device parameter setting), correction of data (Data processing), description of correction (Enhancement of Modification Description), data processor settings (Data processor settings (Device-specific)), a device kind (Device kind), device parameters (Device parameters), device parameter setting (Device parameter setting), editing information (Editing Information), editing version information (Editing version information), file format version (Version), editing details (Editing decisions), a file format version (Version), editing details (Editing decisions), contents of change (RelativeScope) and change slot (RelativeSlot), as shown with #495 to #528 in FIG. 23.

There are also prescribed, as names of data elements associated with the SWPTE label, an original signal group (SourceMobSlotID), fade information default (DefFadeType), editing matte information (Editing matte information), editing event information (Editing event information), comment (Event_Comment), event ON/OFF information (ActiveState), edit effect information (Edit effect information), audio fade-in type (FadeInType), audio fade-out type (FadeOutType), control point (ControlPoint_Value), a constant value (ConstantValue_Value), hint 'Edithint), transient information (IsTimeWarp), category information (Category), input segment number (NumberInputs), bypass information (Bypass), editing web information (Editing web information), start (BeginAnchor), end (Endanchor), editing user notes (Editing user notes), tag information (TaggedValue_Name), value information (TaggedValue_Value), class 6 inter-data information (RELATIONAL), relation (Relationship), relation kind (Relatives), correlative values (Essence to Essence), a source material (source material), UMID (Source material UMID), a source material (source material), most recent edit text (Most Recent Edit text), and most recent edit UMID (Most recent edit UMID), as shown with #529 to #561 in FIG. 24.

There are also prescribed, as names of data elements associated with the SMPTE label, metadata to essence (Metadata to Essence), metadata to metadata (Metadata to Metadata), object to object (Object to Object), metadata to object (Metadata to Object), relation to production materials (Related production material), programme support material (Programme support material), relation to advertising material (Programme advertising material), relation to CM (programme commercial material), numerical sequence (Numerical sequence), numerical sequence in sequence (Numerical sequence in sequence), offset information (Relative position in sequence (value)), preview, next information (Relative position in sequence (value)), preview, next information (Relative position in sequence (descriptive)), structural relationship (Relationship structures), relationship in contents (Containing relations), contents themselves (Contains one), a still frame (Still Frame), a hot spot matte (Hot Spot Matte), annotation (Annotation), translation (Rendering), pull-in (InputSegment), Selection (Selected), effect on transition (Operation Group), web addresses (Manufacturing Info), content group (Content), content description (Dictionary), essence description (Essence Description), segment description (Segment), contains set (contains set), parameters (Parameters), alternate segments (Alternates), group (Mobs), and essence data (Essence Data), as shown with #562 to #594 in FIG. 25.

There are also prescribed, as names of data elements associated with the SMPTE label, properties (Properties), locators (Locators), class definition (class definitions), type definition (type definitions), operating definitions (Operation Definitions), parameter definitions (Parameter Definitions), data definitions (Data Definitions), plugin descriptors (Plugin Descriptors), codec descriptions (codec descriptions), container description (Container Definitions), interpreter description (Interpolator Definitions), comments (Comments), contains order set (Contains order set), different format specifications (Choices), input segments (Input Segments), nesting information (NestedScope_Slots), components (Components), locators (Locators), ID lists (Identification List), group slot (Mob_Slots), point values (PointList), contains stream of data (Contains stream of data), data (Data), ID (Sample Index), weak reference relation (Weak reference relation), weak reference to one object (Weak reference to one object), generation (Generation), data definition (Data Definition), operational definition (Operational Definition), source ID (SourceID), kind of effect (Control Point_Type), post-editing ID (Operation Definition-DataDefinition) and control type (Parameter Definition_Type), as shown with #595 to #627 in FIG. 26. There are also prescribed, as names of data elements associated with the SMPTE label, property (Property Definition_Type), category (Category Class), file descriptors (FileDescriptor Class), group name (MobID), container format (Container Format), description on parameters (Definition), parameter types (Parameter_type), interpretation (Interpolation), data type (TaggedValue_Type), strong relevance of objects (Type Definition Strong Object Reference_Referenced Class), weak relevance of objects (Type Definition. Weak Object Reference_Referenced Class), underline element type (Type Definition PixedArray_Element Type), variable array element type (Type Definition PixedArray_Element Type), fixed array element type (Type Definition VariableArray_Element Type), description on element type (Type Definition String_Element Type), a string element (Type Definition String_Element Type), a stream element (Type Definition Stream_Element Type), weak reference set (Set of weak references), plugin descriptors (Plugin Descriptors), parameters (ParametersDefined, data definitions (Data Definitions), an ordered set of weak references (Ordered set of weak references), degradation of properties (Degrade To), member types (Member Types), class relations (Class Relations), parent class (Parent class), parent class (Parent class), child class (Child class), instances of class (Instance of class), an object class (Object Class), and metadata object definitions (Metadata object definitions), as shown with #628 to #660 in FIG. 27.

There are also prescribed, as names of data elements associated with the SMPTE label, property (Property definition), hint (Is Searchable), essential/optional (Is Optional), default conditions (Default Value), local ID (local Identification), type definition (Type definition), size (Size), specified size (Is Signed), element name (TypeDefinitionEnumeration_Element Names), element name (Type Definition Enumeration_Element Values), number of arrays (Element Count), member names (Member Names), name of extension (Type Definition Extendible Enumeration_Element Names), name of extension (Type Definition Extendible Enumeration_Element Vales), instance description (Instance descriptions), description (Description), container definitions (Container definitions), essence labels (Essence Is Identified), code objects (Related Code Objects), plugin code objects (Relations to plugin code objects), name (Name), plug-n (Plugin Descriptor_Identification), description (Description), version number (Version Number), a version string (Version String), manufacturers (Manufacturer), manufacturer ID (Manufacturer ID), platforms (Platform), platform versions (Min Platform Version), platform OS versions (Max Platform Version), plugin engines (Engine), mini engine version(MinEngine Version) and max engine version(MaxEngine Version), as shown with #661 to #693 in FIG. 28.

There are also prescribed, as names of data elements associated with the SMPTE label, API plugin (Plugin API), mini plugin of API (Mini Plugin API), max plugin API (Max Plugin API), software (Software Only), accelerator (Accelerator), authentication (Authentication), relation to application codes (Relation to application code objects), company name (Company Name), product name (Product Name), product number (Product ID), a product version (Product Version), product version string (Product Version String), a toolkit version Toolkit Version), a platform (Platform), class 7 space time (SPATIO-TEMPORAL), position and space vectors (Position and Space Vectors), an image coordinate system (Image Coordinate System), map datum used (Map Datum Used), an absolute position (Absolute Position), local datum absolute position (Local Datum Absolute Position), local datum absolute position accuracy (Local Datum Absolute Position Accuracy (m)), a device code (device altitude (m)), a device code (device altitude (meters, concise)), device latitude (Device Latitude (degrees)), device latitude (Device Latitude (degrees, concise)), device longitude (Device Longitude (degrees)), device longitude (Device Longitude (degrees, concise)), device size (X) (device X Dimension(m)), device size (Y) (device.Y Dimension(m)), a subject-absolute position (Subject Absolute Position) and frame position accuracy (Frame Position Accuracy (m)), as shown with #694 to #726 in FIG. 29.

There are also prescribed, as names of data elements associated with the SMPTE label, a frame centrelatitude (Frame Centre Latitude (degrees), a frame centre latitude (Frame Centre Latitude (degrees, concise), a frame centre longitude (Frame Centre Longitude (degrees), a frame centre longitude (Frame Centre Longitude (degrees, concise), a frame centre longitude (Frame Centre Longitude (degrees), a frame centre latitude longitude (Frame Centre Lat-Long), a relative position (Relative Position), a local datum relative position (Local Datum Relative Position), local datum relative position accuracy (Local Datum Relative Position Accuracy), a device relative position (Device Relative Position), device relative position accuracy (Device Relative Position Accuracy), a device relative position (X) (Device Relative Position X (meters)), a device relative position (Y) (Device Relative Position Y (meters)), a device relative position (Z) (Device Relative Position Z (meters)), a device relative position (Device Relative Position), subject relative positional accuracy (Subject Relative Positional Accuracy (meters)), image position information (Image Position Information), a position within viewed image x coordinate (pixels) (position within viewed image x coordinate (pixels)), a position within viewed image y coordinate (pixels) position within viewed image y source image centre (x pixel), source image centre (x pixel) (Source image centre x coordinate (pixels)), source image centre (y pixel) (Source image centre y coordinate (pixels)), a view port image centre (x pixel) (Viewport image e centre x coordinate (pixels)), a view port image centre (y pixel) (Viewport image centre y coordinate (pixel (y pixel)s)), rate and direction of positional change (Rate and Direction of Positional Change), device rate and direction of positional changes (Device Rate and Direction of Positional Changes), an absolute device rate and direction of positional changes (Absolute Device Rate and Direction of Positional Changes), device movement speed (Device Absolute Speed (meters/sec)), device heading (Device AbsoluteHeading (degrees)), relative device rate and direction of positional change (Relative Device Rate and Direction of Positional Change), device relative speed (Device Relative Speed (meters/sec)), device relative setting (Device Relative Setting (degrees)), subject rate and direction of positional change (Subject Rate and Direction of Positional Change), absolute subject rate and direction of positional change (absolute subject rate and direction of positional change) and subject absolute speed (meters/sec)), as shown with #727 to #759 in FIG. 30.

There are also prescribed, as names of data elements associated with the SMPTE label, subject absolute heading (subject absolute heading (degrees)), subject absolute heading (Subject Absolute Heading (degrees)), relative subject rate and direction of positional change (Relative Subject Rate and Direction of Positional Change), subject relative speed (Subject Relative Speed (meters/sec)), subject relative heading (subject relative heading (degrees)), angular specifications (angular specifications), device angles (Device angles), sensor roll angle (degrees) (Sensor Roll Angle (degrees)),an angle to north (Angle to North (degrees)), an obliquity angle (Obliquity Angle (degrees)), subject angles (Subject Angles (degrees)), distance measurements (Distance Measurements), a device to subject distance (Device to Subject Distance), a slant range (slant range (meters)), distance (Dimensions), subject dimensions (Subject Dimensions), a target width (Target Width), essence positions (Studio and Location Dimensions), media dimensions (Media Dimensions),a physical media length (Physical Media Length (meters)), image size (Image Dimensions), pan and scan image dimensions (Pan and Scan Image Dimensions), a viewport height (Viewport height), a viewport width (Viewport width), abstract locations (Abstract Locations), place names (Place Names), gazetteer used (Gazetteer used), specified names (Place keyword), country codes (Country Codes), object country code (Object Country Code), country code of shoot (Country Code of Shoot), country code of setting (Country Code of Setting (Characterised Place)), country code of copyright license (Country Code of Copyright License) and country code of IP license (Country Code of IP License), as shown with #760 to #792 in FIG. 31.

There are also prescribed, as names of data elements associated with the SMPTE label, regions in a country (Regions), regions of object (Region of Object), regions of shoot (Regions of Shoot), regions of setting (region of setting (Characterised Place)), region or area of Copyright License (Region or Area of Copyright License), region or area of IP License (Region or Area of IP License), a postal address (Postal Address), room numbers (Room Number), street number or building name (Street Number or Building Name), streets (Street), a postal town (Postal Town), city (City), state or province or county (State or Province or County), postal code (Postal Code), country (Country), setting addresses (Setting Address (Characterised Place)), setting room numbers (setting room number), setting street number or building name (Setting Street Number or Building name), setting streets (Setting Street), setting towns (Setting Town), setting city (Setting City), setting state of province or county, (Setting State of Province or County), a Setting postal code (Setting Postal Code), setting country (Setting Country), setting description (Setting Description), electronic addresses (ElectronicAddress), telephone number (Telephone Number), fax number (FAX Number), e-mail address (e-mail address), date and time information (Date and Time) and material date and time (Material Date and Time), as shown with #793 to #825 in FIG. 32.

There are also prescribed, as names of data elements associated with the SMPTE label, operational date and time (Operational Date-Time Stamps), creation date and time (Creation Date-Time Stamps), creation date and time (Creation Date-Time Stamps), last modified data and time (Last Modified Date-Time Stamps), user defined date and time (User Defined Date-Time Stamps), user defined date and time (User Defined Date-Time Stamps), absolute date and time (Absolute Date and Time), start date and time (Start Date and Time), end date and time (End Date and Time), segment start date and time (Segment Start Date and Time), segment end date and time (Segment End Date and Time), relative date and time (Relative Date and Time), media start date and time (Start Date and Time), media end date and time (End Date and Time), segment start date and time (Segment Start Date and Time), segment end date and time (Segment End Date and Time), time interval (Material Durations), absolute time interval (Absolute Durations), time duration of contents (Time Duration), segment time duration (Segment Duration), frame counts (Frame Count), segment frame counts (Segment frame count), textless black duration (Textless Black Duration), relative durations (Relative Durations), time duration (Time Duration), segment duration (Segment Duration), film frame interval (Frame Count), segment frame count (Segment frame count), rights date and time (Rights Date and Time), copyrights date and time (Copyright Date and Time), IP rights date and time (IP rights date and times) and license date and time (License date and times), as shown with #826 to #858 in FIG. 33.

There are also prescribed, as names of data elements associated with the SMPTE label, option start date and time (Option start date and time), license end date and time (License end date and time), option end date and time (Option end date and time), rights durations (Rights Durations), copyrights durations (Copyrights Durations), IP rights durations (IP Rights Durations), license durations (License durations), optional durations (Option duration), cataloguing date and time (Cataloguing date and time), creation date and time (Creation date and time), last modified date and time (Last Modified), event date and time (Event Date and Time), absolute date and time of event (Absolute Date and Time), start date and time of event (Start Date and Time), project start date and time (Project Mission Start Date and Time), scene start date and time (Scene Start Date and Time), shot start date and time (Shot Start Date and Time), broadcast start date and time (Broadcast Start Date and Time), absolute end times (Absolute end times), project mission end date and time (Project Mission End Date and Time), scene end date and time (Scene End Date and Time), shot end date and time (Shot End Date and Time), broadcast end date and time (Broadcast End Date and Time), relative date and time (Relative Date and Time), event relative start date and time (Relative Start Times), project relative start date and time (Project Mission Start Date and Time), scene relative start date and time (Scene Start Date and Time), shot relative start date and time (Shot Start Date and Time), broadcast relative start date and time (Broadcast Start Date and Time), relative end time (Relative End Times), project relative end date and time (Project Mission End Date and Time), scene relative end date and time (Scene End Date and Time) and shot relative end date and time (Shot End Date and Time), as shown with #859 to #891 in FIG. 34.

There are also prescribed, as names of data elements associated with the SMPTE label, relative broadcast end date and time (Broadcast End Time), event duration information (Event Durations), absolute duration information (Absolute Durations), absolute event time duration (time Duration), relative durations (Relative Durations), relative event. time durations (Time Duration), editing date and time (Editing Date and Time), editing length (Length), editing position (Position), relative start time (StartTime), speech fade-in length (FadeInLingth), speech fade-out-length (Fade Out Length), cut point standard (Cut Point), time standard (Time), last edit date and time (last Modified), ID of last modified results) (LastModified), last creation date and time (Last Modified), ID of last modified results (Last Modified), date and time of last creation (Creation Time), speech soft cut default standard (Default Fade Edit Unit), event time unit standard (Event Mob Slot_Edit Rate), slot time unit standard (Timeline Mob Slot_EditRate), date of final correction (Identification_Date), slot origin (Origin), process date and time (Process Date and time), technical modification date and time (Technical Modification date and time), simple correction date and time (Editorial Modification date and time), broadcast date and time (Broadcast Date and Time), cassation date and time (Cassation Date and Time), setting date and time (Characterised Time Period), term of validity of keywords (Time Period Keyword Thesaurus), time unit of keyword (Time Period of Keyword), delay time (Delay) and the encoding/decoding information (Encoding/Decoding Information), as shown with #892 to #924 in FIG. 35.

There are also prescribed, as names of data elements associated with the SMPTE label, encoding delay (Encoding Delay), decoding delay (Decoding Delay), buffer delay (Buffer Delay), latency information (Latency), temporal information (Temporal Shape (Shuttering etc) (PLACEHOLDER)), shutter characteristics (Shutter characteristics (placeholder)), shutter speed (Shutter speed (placeholder)), shutter gating characteristics (Shutter Gating (placeholder)), class 14 user data (USER ORGANIZATION REGISTERED), publicly registered user organization metadata (publicly registered user organization metadata), private metadata (Privately registered user organization metadata), metadata for US Department of Defence Agency (DoD Metadata), UAV metadata (UAV metadata), RQ1A metadata (RQ1A metadata), RQ1A closed caption metadata (RQ1A closed caption Set) and class 15 experimental metadata (experimental metadata), as shown with #925 to #940 in FIG. 36.

In this programme preparation and distribution system, essence data and metadata are converted into the MXF file format when transmitted on the gigabit Ethernet 1. For example, there are occasions wherein the video essence recorded on a recording medium becomes a sole MXF file or a sole MXF file is prepared from a sole video programme, wherein the unit of the essence can be freely set depending on the application.

A metadata MXF file 200 is made up of a preamble portion 201 for stating metadata, a main portion (body portion) 202 for stating the essence data, an index portion 203 containing an index table and a postamble unit 204, as shown in FIG. 37.

The preamble portion 201 is made up of a universal label 205, an allocation table 206 and an overall metadata area 207. The universal label 205 of this metadata MXF file 200 has the same syntax structure as the universal label of the KLV coding. The allocation table 206 is a table on which is registered the allocation information of each object in the overall metadata area 207.

The overall metadata area 207 is an area in which is stated metadata registered in a metadata dictionary which is the dictionary provision in which the universal label standardized in the SMPTE 298M is taken into keys. A Header_Object 210 is a root object for indicating each object of this overall metadata area 207. Specifically, there are provided in the node of this Header_Object 210 Identification_Object 211, Master_Metadata_Object 212, Source_Metadata_Object 213 and Essence_Data_Object 214. Since the master essence is made up of plural sorts of source essences, metadata concerning the master essence and metadata concerning the source essence are expressed by another object in this overall metadata area 207.

The Master_Metadata_Object 212 is an object containing metadata for explaining the properties of each essence contained in this metadata MXF file 200 and pointers for pointing to a Master_Timeline_Track_Objects 215. The Master_Timeline_Track_Objects 215 is an object which defines and explains tracks contained in this metadata MXF file 200 and which points to a Master_Clip_Object 216. A track herein means a unit set from one essence sort, such as video or audio, to another, whilst clip means an editing clip provided for respective in- and out-points in essence editing and has a unit different from that of a scene. The Master_Clip_Object 216 is an object containing metadata indicating which source material is being used, and also containing a pointer indicating the Source_Metadata_Objet 213.

The Source_Metadata_Objet 213 is an object provided for each source essence constituting a master essence and is an object containing metadata concerning the source essence and a pointer indicating a Source_Timeline_Track_Object 217. The Source_Timeline_Track_Object 217 is an object set from one track of each source essence to another and includes metadata concerning each track and a pointer for indicating a Source_Clip_Object 218. The Source_Clip_Object 218 is an object set from one clip contained in each track constituting each source essence, and includes metadata concerning the clip and a pointer for indicating an Essence_Clip 219. Therefore, the Essence_Clip 219 is an object containing data of clips constituting the essence.

In this programme preparation and distribution system 100, programme preparation and distribution processing is carried out in accordance with a work flow shown in FIGS. 38 and 39.

That is, in the work flow of this programme preparation and distribution system 100, the pre-production processing executed by the distributed programme editing system 10 is shown as a programme planning processing PLN in which an acquisition processing ACQ is carried out by the acquisition system 60 and the material storage (ingestion) processing ING, editing processing ED, CG generating processing (CG creation) processing CGC and audio creation processing AUC are carried out to prepare a distribution programme. On the distribution programme, so prepared, the program distribution processing DST and the programme archiving processing are executed by the programme distribution system 50 and by the archive system 40, respectively.

In this programme preparation and distribution system 100, metadata indicating the variable information is generated from project to project, from medium to medium, from scene to scene or from frame to frame, to realize an asset management by controlling the archive system 40 depending on metadata.

Among the metadata generated from project to project, there are metadata indicating variable information, such as main title (Main Title), secondary title (Secondary Title (Sub-Title)), series (Series Number), episodes (Episode), original (Original Bock/Title), author (Original Author/Writer), director (Director), right (Right) or copyright (Copyright).

Among metadata generated from medium to medium, there are metadata indicating variable information, such as real (roll) number (Real Number (Roll Number)), or frame rate (Frame rate).

Among metadata generated from scene to scene, there are metadata indicating the variable information, such as performers (Cast Actor/Actress), elements (Elements), screen play (Screen Play), scene description (Scene Description), sets (Set), properties (Properties), unit/crew/staff (Unit/Crew/Staff), camera setup data (Camera Setup Data), writing information (Writing Info), video format (Video Format), audio format (Audio Format), audio channel assignment (Audio Channel Assignment), motion capture data (motion capture data), comment (Comment), telecine data (Telecine Data), composers of sound track (SoundTrack(Music)), song writers (Song Writer), an arranger (Arranger), compositing information (Compositing Info), visual effect (Visual Effects), sound effects (Sound. Effects), V-Chip information (V-chip information) or generation (Generation (Number of copies)).

Among metadata generated from frame to frame, there are metadata indicating variable information, such as scene number (Scene Number), shot number (Shot Number), take number (Take Number), OK shot/NG shot (OK shot/NG shot), UMID (video) (UMID for video essence), UMID (audio) (UMID for audio essence), UMID (others) (UMID for Others), places (Places), GPS latitude (GPS Latitude), GPS longitude (GPS Longitude), GPS altitude (GPS Altitude), camera ID (Camera ID), camera lens (Camera Lens Data), lens ID (Lens ID), focus (Focus), zoom (Zoom), iris (Iris), tripod angle information (Tripod), tripod ID (Head ID), pan (Pan), tilt (Tilt), roll (Roll), dolly position information (Dolly), arm height (Arm Height), position (Travel) and closed caption (Closed Caption).

In the pre-production step executed by the distributed programme editing system 10, planning processing PP1, casting (Casting) processing PP2, storyboard processing PP3, screen play processing PP4, location hunting processing PP5 and scheduling processing PP6, are carried out.

In the planning processing PP1 for inspecting the programme contents, there are generated metadata such as main title (Main Title), secondary title (Secondary Title (Sub-Title)), series (Series Number), episodes (Episode), original (Original Bock/Title), author (Original Author/Writer), director (Director), element (Element), comment (Comment), composer (Composer) of sound track (soundtrack (Music)), song writers (Song Writer), arrangers (Arranger), rights (Right), copyright (Copyright) or V-Chip information (V-Chip info). In the stage of the casting processing PP2, metadata indication the information determining the performers, metadata indicating the variable information such as performers (Cast Actor/Actress) or unit/crew/staff (Unit/Crew/Staff) is generated. In the stage of the storyboard processing PP3 for inspecting the programme contents, there are generated metadata such as scene number (Scene Number), shot number (Shot Number), set (Set), properties (properties), video format (Video Format), frame rate (Frame rate), audio format (Audio format) or audio channel assignment (Audio Channel Assignment). In the stage of screen play processing PP4 of ascertaining the screen play, there are generated metadata such as screen play (Screen Play), scene description (Scene Description), place (Place) and closed caption.

The metadata indicating variable information such as main title (Main Title), secondary title (Secondary Title (Sub-Title)), series (Series Number), episodes (Episode), original (Original Bock/Title), author (Original Author/Writer) or director (Director), are generated after the project and are utilized for the casting (Casting) processing PP2, storyboard processing PP3, screen play processing PP4, location hunting processing PP5 and scheduling processing PP6; while being utilized for the acquisition processing ACQ by the acquisition system 60, authoring processing (Authoring) by the production system 20, programme distribution processing DST by the programme distribution system 50 or the programme archiving processing ARV by the archive system 40.

The variable metadata, generated by the distributed programme editing system 10 in the pre-production stage, are transmitted over the gigabit Ethernet 1 to the archive system 40 for storage in a petasite 40B of the archive. system 40. The production system 20, new system 30, archive system 40, programme distribution system 50 and the acquisition system 60 are able to capture the variable metadata stored in the petasite 40B of the archive system 40 over the gigabit Ethernet 1 as necessary.

Meanwhile, there are occasions wherein the variable metadata, generated in the pre-production stage, are modified and rewritten in the variable processing stages which will be explained subsequently.

The acquisition system 60 takes the metadata required for acquisition equipments, that is shot devices, to execute the acquisition processing ACQ.

In the acquisition processing ACQ, executed by the acquisition system 60, metadata indicating the real (roll) number (Real Number (Roll Number)), scene number (Scene Number), take number (Take Number), OK shot/NG shot (OK shot/NG shot), UMID (video) (UMID for video essence), UMID (audio) (UMID for audio essence), UMID (data) (UMID for data essence), UMID (others), (UMID for Others), camera setup data (Camera Setup Data), camera ID (Camera ID), camera lens (Camera Lens Data), lens ID (Lens ID), focus (Focus), zoom (Zoom), iris (Iris), tripod angle information (Tripod), tripod ID (Head ID), pan (Pan), tilt (Tilt), roll (Roll), dolly position information (Dolly), arm height (Arm Height) or position (Travel), are generated.

The variable metadata, generated in the acquisition processing stage by the acquisition system 60, is supplied along with the image and speech information, obtained on acquisition, to the production system 20.

The production system 20 executes an ingesting (Ingesting) processing PR1, telecine (Telecine) processing PR2, dupe (Dupe) processing PR3, off-line editing (Offline Editing) processing PR4, complete edit (Complete Edit) processing PR5, voice over (Voice Over) processing PR6, sound effect (Sound Effect) processing PR7, sound sweetening (Sound Sweetening) processing PR8, CG creation (CG Creation) processing PR9 and finishing (Finishing) processing PR10.

The ingesting (Ingesting) processing PR1 in the production system 20 stores the variable metadata generated on acquisition by the acquisition system 60 along with the video or audio information. The telecine processing PR2 converts the video or audio information recorded on the film obtained by the acquisition system 60 into television signals. The off-line editing processing PR4 performs material editing operations on the video and audio data (material data), based on the information concerning the material added as metadata, to prepare an editing decision list (EDL) which is the metadata derived from the editing results. The editing results indicate the in- and out-points on the recording medium and the information concerning the edit points represented by the real number 1 or the time code. The present complete edit (Complete Edit) processing PR5 executes complete editing on the material stored by the telecine processing PR2 using the EDL prepared by the off-line editing processing PR4. The finishing (Finishing) processing PR9 completes the distributed programme using the video and audio data completely edited by the complete editing processing PR5 and an audio material processed with voice over (Voice Over) processing PR5. There are occasions wherein the CG picture prepared by the CG creation (CG Creation) processing CGC or the material stored in the archive system 40 is used at this time.

The programme distribution system 50 executes the authoring processing of distributing the distribution programme completed by the finishing (Finishing) processing PR9 as a package medium or the distribution processing of distributing the programme over a radio network or a wired network.

The programme preparation and distribution system 100 of the above-described structure inputs, in the pre-production stage executed by the distributed program editing system 10 and in the casting processing PP2 such metadata as main title (Main Title), secondary title (Secondary Title (Sub-Title)), series (Series Number), episodes (Episode), original (Original Bock/Title), author (Original Author/Writer), director (Director), composer. (Composer) of sound track (SoundTrack(Music)), song writers (Song Writer) or arrangers (Arranger), to a computer or a portable telephone device, and sends to the production system 20 the input metadata co-packed with the video or audio information obtained on acquisition by the acquisition system 60, to perform timing designation of flowing the staff roll in the off-line editing processing PR4 in the production system 20 to automatically generate, characters consistent with the. metadata co-packed with the audio or video information to effect complete edit processing PR5.

In this programme preparation and distribution system 100, a database is constructed in which the archive system 40 manages metadata in a concentrated fashion along with the essence such as video and audio data. By the distributed programme editing system 10, the metadata inputted at the planning processing PP1 and at the casting processing PP2 is registered in the database managed in a concentrated fashion by an archival manager 40A of the archive system 40, at the same time as a tag specifying the registered metadata is issued. This tag is co-packed with the video and audio information obtained on acquisition by the acquisition system 60. In the production system 20, the timing to flow the staff roll is specified during the off-line processing PR4 in the production system 20. In accordance with the specified timing, the metadata is taken out from the database pointed by the tag co-packed with the video information or the audio information to generate the corresponding character automatically to effect complete editing processing.

That is, with the present programme preparation and distribution system 100, it is possible to construct a supporting system of automatically generating the character of the staff roll using the metadata.

In this programme preparation and distribution system 100, the GPS data indicating the place, position or time of acquisition is inputted as metadata in the stage of the acquisition processing ACQ by the acquisition system 60 and the input metadata is co-packed with the audio or video information obtained on acquisition by this acquisition system 60. At the off-line editing processing PR4 in the production system 20, an editor is able to execute temporal programme distribution without the editor becoming conscious of the presence of the GPS data. At the CG creation processing PR9, retrieval is made from the database showing a separately provided database, using tag data indicating the position or time co-packed in the video or audio information to output map graphics to complete the programme employing the map graphic by the complete editing processing PR5.

In this case, as when automatically generating the character, the metadata indicating the position or time can be registered in the database managed in a concentrated fashion by the archival manager 40A of the archive system 40 to support the CG creation processing PR9.

That is, in this programme preparation and distribution system 100, the GPS data and map data can be matched to each other, using metadata, to construct the CG creation supporting system.

If it is attempted to prepare contents using the VTR, a large amount of a material video tape is produced in acquisition. For example, if a 30-minute document is to be created, 50 to 100 material tapes are produced and necessary cuts are selected therefrom and connected together to prepare contents.

Thus, in this programme preparation and distribution system 100, metadata of such items as UMID (video) (UMID for video essence), reminiscent of contents acquired in the material tape (UMID for video essence), UMID (audio) (UMID for audio essence), UMID (data) (UMID for data essence), UMID (others) (UMID for others), reel (roll) number (Real Number (Roll Number), tape ID (Tape ID), tape number (Tape IDNumber), object ID (object ID), main title (Main Title), secondary title (Secondary Title (Sub-Title)), series (Series Number), episodes (Episode), metadata to essence (Metadata to Essence), locators (Locators) or essence descriptions (Essence Descriptions), are co-packed and recorded along with the video or audio information. This enables the production system 20 to read out the metadata at the time of reproduction to retrieve the cuts as necessary from the material tape quickly, using the read-out metadata as clue. In this case, metadata of items reminiscent of the contents recorded in the material tape is co-packed with the video or audio information and recorded in synchronism in a video frame or the contents of tens to hundreds of video tapes are collected and recorded on a controllable external recording medium.

That is, in this programme preparation and distribution system 100, a supporting system can be constructed in which the labor in tape screening operations can be diminished with the aid of metadata.

Moreover, in this programme preparation and distribution system 100, metadata of items concerning the telecine, such as vertical rate (Vertical rate), a frame rate (Frame Rate), total number of lines/frame (Total lines per Frame), active lines/frame (Active Lines per Frame), aspect ratio (D)isplay Aspect Ratio), image aspect,ratio (ImageAspectRatio), stored height (Stored Height), sample, height (Sample Height), sample width (Sample Width), sample X offset (SampledX Offset), sample Y offset (SampledY Offset), display width (Display Width), displayX Offset (DisplayX Offset) or video coding characteristics (Video Coding Characteristics) are co-packed and recorded along with the video or audio information. In this manner, in the complete edit processing PR5, output trimming positions can be calculated using metadata recorded in keeping with the output format after the editing operation following the output format to obtain an output.

Also, in this programme preparation and distribution system 100, the essence data and metadata when transmitted on the gigabit Ethernet 1 are converted to the MXF file format, such that, in the editing operation by the production system 20, the status of the material used in the editing operation is stated as hysteresis in the header information. The contents makeup can be comprehended from the header information. The Clip_object, for example, terms the scene or cut a clip and indicates the time code indicating the temporal beginning or end, as described above. The contents are a set of clips. By sequentially searching the information indicated by the clip in the chronological sequence, it is possible to know the time code as a chapter candidate. Since the number of ultimate chapters is smaller than the number of change points of clips, the entire chapters can be determined by selecting only necessary ones of candidate chapters.

Thus, in this programme preparation and distribution system 100, in distributing the contents prepared by the production system 20 by mediums, such as DVD or LD, the MFX file headers are searched for packages, the editing operations of which has been completed by the production system 20, the MFX file headers are searched to list up candidates of chapter points and the chapter points ahead and in back of the candidates are viewed to select only necessary chapter points to convert the format for distributing the contents to the mediums, such as DVD or LD, by way of authoring processing. That is, in this authoring system 52, authoring processing of the editing video programme is performed from the metadata specifying the logical structure of the video programme.

In addition, in this programme preparation and distribution system 100, in which the information such as rights concerning performers from scene to scene (Rights), copyright (Copyright), intellectual rights Intellectual Rights), owners (Rights Owner), payments and costing information (Payments and costing), is logged and recorded simultaneously as metadata, it is possible to trace clips if such clips are sliced.

According to the present invention, in which the essence is created, metadata for describing the essence is generated when creating the essence, the essence and the metadata are correlated with each other, and the operation to be performed on the archived essence is controlled based on the metadata to perform the asset management on the essence, it is possible to process a sequence of operations from the acquisition and preparation to the editing, sending out and archiving efficiently.

Moreover, according to the present invention, in which the essence is created, metadata for explaining the essence is generated, the essence and the metadata are archived in relation with each other, and the metadata is used to control the operation performed on the archived essence, asset management may be performed on the essence.

Also, according to the present invention, in which metadata for explaining the essence is generated and the essence and the metadata are controlled based on the above-mentioned information to effect the asset management on the essence, it is possible to realize efficient processing of a sequence of operations from acquisition and creation to the editing, sending out and archiving.

In addition, according to the present invention, in which the information specifying the attributes of the essence, the essence and the information are recorded correlatively with each other on a recording medium and the recording and/or reproducing operations for reproducing the essence from the recording medium is controlled based on the above-mentioned information, to perform the asset management on the essence, it is possible to realize efficient processing of a sequence of operations from acquisition and creation to the editing, sending out and archiving.

Furthermore, according to the present invention, in which metadata for specifying the attributes of the essence or metadata or identifying the essence is generated, and the operation of archiving the essence correlatively with the metadata is controlled using the metadata, to perform the asset management for the essence, it is possible to realize efficient processing of a sequence of operations from acquisition and creation to the editing, sending out and archiving.

According to the present invention, by creating an essence and generating metadata used for accounting for the essence, it is possible to create the project from the essence efficiently using the metadata.

Also, according to the present invention, by creating an essence, generating metadata used for accounting for the essence, and controlling an operation of post-production based on the metadata, it is possible to create the project from the essence efficiently.

Also, according to the present invention, by creating an essence, generating metadata used for accounting for the essence, and performing an operation of post-production correlatively with the metadata, it is possible to create the project from the essence efficiently.

Also, according to the present invention, by creating an essence and generating metadata used for identifying the essence, it is possible to create the project from the essence efficiently using the metadata generated at the time of the production.

Also, according to the present invention, by creating an essence, generating metadata used for identifying the essence, and controlling an operation of post-production based on the metadata, it is possible to create the project from the essence efficiently.

Further, according to the present invention, by creating an essence, generating metadata used for identifying the essence, and performing an operation of post-production correlatively with the metadata, it is possible to create the project from the essence efficiently.

According to the present invention, by generating metadata for accounting for the essence, performing an operation of the production using the metadata, and creating the essence, it is possible to create the project from the essence efficiently.

Also, according to the present invention, by generating metadata for accounting for the essence, creating the essence and storing the essence and the metadata correlatively with each other on a recording medium, and performing an operation of production using the metadata, it is possible to create the project from the essence efficiently.

According to the present invention, by creating the essence and generating metadata used for accounting the essence, and performing control based on the metadata so that an asset management for the essence archived will be performed to archive the essence and the metadata correlatively with each other, it is possible to archive the essence efficiently.

Also, according to the present invention, in a method for archiving an essence, by creating the essence and generating metadata used for accounting the essence, performing an operation for the essence using the metadata, and archiving and essence and the metadata correlatively with each other, it is possible to archive the essence efficiently.

Also, according to the present invention, in a method for archiving an essence, by creating the essence and generating metadata used for accounting the essence, and controlling a reproducing operation for the essence. archived, using the metadata, the essence and the metadata are archived correlatively with each other. Thus, it is possible to archive the essence efficiently.

Also, according to the present invention, in a method for archiving an essence, by creating the essence and generating metadata used for accounting the essence, and controlling a retrieving operation for the essence archived, using the metadata, the essence and the metadata are archived correlatively with each other. Thus, it is possible to archive the essence efficiently.

Also, according to the present invention, in a method for archiving an essence, by creating the essence and generating metadata pertinent to the essence, and performing control, using the metadata, so that an operation for the essence archived will be performed, the essence and the metadata are archived correlatively with each other. Thus, it is possible to archive the essence efficiently.

Also, according to the present invention, in a method for archiving an essence, by creating the essence and generating metadata pertinent to the essence, and performing control based on the metadata so that an asset management for the essence archived will be performed, the essence and the metadata are archived correlatively with each other. Thus, it is possible to archive the essence efficiently.

Also, according to the present invention, in a method for archiving an essence, by creating the essence and generating metadata pertinent to the essence, and controlling a reproducing operation for the essence archived, using the metadata, the essence and the metadata are archived correlatively with each other. Thus, it is possible to archive the essence efficiently.

Also, according to the present invention, in a method for archiving an essence, by creating the essence and generating metadata pertinent to the essence, and controlling a retrieving operation for the essence archived, using the metadata, the essence and the metadata are archived correlatively with each other. Thus, it is possible to archive the essence efficiently.

According to the present invention, by creating the essence and generating metadata pertinent to the essence, and performing post-production processing on the essence; it is possible to allot the essence efficiently using metadata generated at the time of the production.

Also, according to the present invention, by creating the essence and generating metadata pertinent to the essence, performing post-production processing on the essence, and controlling an operation of distribution, using the data, it is possible to allot the essence efficiently.

Also, according to the present invention, in a distribution method for allotting an essence, by creating the essence and generating metadata used for accounting for the essence, and performing post-production processing on the essence, it is possible to allot the essence efficiently, using the metadata generated at the time of the production.

Further, according to the present invention, in a distribution method for allotting an essence, by creating the essence and generating metadata used for accounting for the essence, performing post-production processing on the essence, and controlling an operation of the distribution, using the metadata used at the time of the production, it is possible to allot the essence efficiently.

According to the present invention, by creating the essence and generating metadata pertinent to the essence, performing post-production on the essence, and creating the package medium from an essence processed with post-production using metadata, it is possible to create a package medium efficiently from an essence.

Also, according to the present invention, by generating metadata pertinent to the essence, creating the essence, performing post-production on the essence, and creating the package medium from an essence processed with post-production using the metadata, it is possible to create a package medium efficiently from an essence.

Also, according to the present invention, by creating the essence and generating metadata used for accounting for the essence, and creating the package medium from an essence processed with post-production, using the metadata, it is possible to create a package medium efficiently from an essence.

Further, according to the present invention, by generating metadata used for accounting for the essence, creating the essence; performing post-production on the essence, and creating the package medium from an essence processed with post-production, using metadata generated at the time of the pre-production, it is possible to create a package medium efficiently from an essence.

According to the present invention, by generating metadata indicating the rights of the essence, and performing control based on the metadata so that a circulating operation of the essence will be performed, asset management processing is effected on the essence. Thus, it is possible to manage the essence efficiently.

Also, according to the present invention, by generating metadata specifying rights pertinent to the essence, and performing control based on the metadata so that a circulation operation of the essence will be performed, asset management processing is effected on the essence. Thus, it is possible to manage the essence efficiently.

Also, according to the present invention, by generating metadata specifying rights pertinent to the essence, and performing control based on the metadata so that a re-utilizing operation of the essence will be performed, asset management processing is effected on the essence. Thus, it is possible to manage the essence efficiently.

Also, according to the present invention, by creating the essence and generating metadata specifying rights pertinent to the essence, and performing control based on the metadata so that a re-utilizing operation of the essence will be performed, asset management processing is effected on the essence. Thus, it is possible to manage the essence efficiently.

According to the present invention, by creating the essence and for generating UMID (unique material identifier) for discriminating the essence, controlling an operation in the post-production based on the UMID, and editing the essence, the programme is generated. Thus, it is possible to create the programme efficiently from the essence.

Also, according to the present invention, by creating the essence and for generating UMID (unique material identifier) for discriminating the essence, controlling an archiving operation of archiving an essence generated by production processing and/or an essence processed with post-production based on the UMID, and editing the essence, the programme is generated. Thus, it is possible to create the programme efficiently from the essence.

According to the present invention, by generating a plurality of metadata which are data pertinent to the essence and which are respectively identified by SMPTE (Society of Motion Picture and Television Engineers) labels, receiving the essence and the plural metadata and analyzing the SMPTE labels to extract pre-set metadata from the plural metadata, and controlling the processing relevant to the essence based on the extracted metadata, it is possible to create the essence efficiently.

Also, according to the present invention, by generating a plurality of metadata which are data pertinent to the essence and which are respectively identified by SMPTE (Society of Motion Picture and Television Engineers) labels, receiving the essence and the plural metadata and analyzing the SMPTE labels to extract pre-set metadata from the plural metadata, and controlling the production processing performed on the essence based on the extracted metadata, it is possible to create the essence efficiently.

Also, according to the present invention, by generating a plurality of metadata which are data pertinent to the essence and which are respectively identified by SMPTE (Society of Motion Picture and Television Engineers) labels, receiving the essence and the plural metadata and analyzing the SMPTE labels to extract pre-set metadata from the plural metadata, and controlling the post-production processing performed on the essence based on the extracted metadata, it is possible to create the essence efficiently.

Also, according to the present invention, by generating a plurality of metadata which are data pertinent to the essence and which are respectively identified by SMPTE (Society of Motion Picture and Television Engineers) labels, receiving the essence and the plural metadata and analyzing the SMPTE labels to extract pre-set metadata from the plural metadata, and controlling the archiving processing performed on the essence based on the extracted metadata, it is possible to create the essence efficiently.

Further, according to the present invention, by generating a plurality of metadata which are data pertinent to the essence and which are respectively identified by SMPTE (Society of Motion Picture and Television Engineers) labels, receiving the essence and the plural metadata and analyzing the SMPTE labels to extract pre-set metadata from the plural metadata, and controlling an operation for asset management performed on the essence based on the extracted metadata, it is possible to create the essence efficiently.

The invention claimed is:

1. An asset management system for managing an essence, comprising:
　　acquisition means for acquiring video and audio data used to create the essence;
　　creating means for creating said essence and for generating metadata for explaining said essence when creating said essence;
　　archiving means for archiving said essence and the metadata correlatively with each other;
　　controlling means for controlling an operation performed on the archived essence based on said metadata to realize asset management for said essence,
　　　wherein the archiving means issues and archives a tag indicating position or time of acquisition executed by the acquisition means and being co-packed in the video or audio data; and retrieving means for retrieving the metadata according to the tag,
wherein the metadata is retrieved to automatically generate characters consistent with the metadata.

2. An asset management system for managing an essence, comprising:
acquisition means for acquiring video and audio data used to generate the essence;
generating means for generating the information for explaining said essence;
recording means for recording and/or reproducing said essence and the information correlatively with each other;
managing means for managing and/or controlling a recording and/or reproducing operation of said essence based on said information to affect asset management for said essence,
wherein the recording means issues and records a tag indicating position or time of acquisition executed by the acquisition means and being co-packed in the video or audio data; and
retrieving means for retrieving the recorded information according to the tag,
wherein the recorded information is retrieved to automatically generate characters consistent with the metadata.

3. An asset management system for managing an essence, comprising:
acquisition means for acquiring video and audio data used to generate the essence;
generating means for generating the information specifying attributes of said essence;
recording means for recording said essence and the information correlatively with each other on a recording medium to reproduce said essence from said recording medium;
control means for controlling the recording and/or reproducing operations for said essence based on said information to affect asset management for said essence,
wherein the recording means issues and records a tag indicating position or time of acquisition executed by the acquisition means and being co-packed in the video or audio data; and
retrieving means for retrieving the recorded attributes according to the tag,
wherein the recorded attributes is retrieved to automatically generate characters consistent with the metadata.

4. An asset management method, executed by a processor, for managing an essence, comprising:
an acquisition step of acquiring video and audio data used to create the essence;
a creating step of creating said essence and for generating metadata for explaining said essence when creating said essence;
an associating step of associating said essence and the metadata with each other;
a controlling step of controlling an operation performed on the archived essence based on said metadata to realize asset management for said essence,
wherein the associating step issues and archives a tag indicating position or time of acquisition executed by the acquisition step and being co-packed in the video or audio data; and
a retrieving step of retrieving the metadata according to the tag,
wherein the metadata is retrieved to automatically generate characters consistent with the metadata.

5. An asset management method, executed by a processor, for managing an essence, comprising:
an acquisition step of acquiring video and audio data used to generate the essence;
a generating step of generating the information for explaining said essence;
a controlling step of controlling the recording and/or reproducing operation of recording and/or reproducing said essence and the information correlatively with each other based on said information to affect asset management for said essence,
wherein the generating step issues and records a tag indicating position or time of acquisition executed by the acquisition step and being co-packed in the video or audio data; and
a retrieving step of retrieving the recorded information according to the tag,
wherein the recorded information is retrieved to automatically generate characters consistent with the metadata.

6. An asset management method, executed by a processor, for managing an essence, comprising:
an acquisition step of acquiring video and audio data used to generate the essence;
a generating step of generating the information specifying attributes of said essence;
a recording and controlling step of recording said essence and the information correlatively with each other on a recording medium and controlling the recording and/or reproducing operations for said essence based on said information to affect asset management for said essence,
wherein the generating step issues and records a tag indicating position or time of acquisition executed by the acquisition step and being co-packed in the video or audio data; and
a retrieving step of retrieving the recorded attributes according to the tag,
wherein the recorded attributes is retrieved to automatically generate characters consistent with the metadata.

7. A production system for creating a project from an essence, comprising:
acquisition means for acquiring video and audio data used to create the essence;
production means for creating said essence and for generating metadata for accounting for said essence;
post-production means for creating said project from said essence using metadata generated at the time of said production,
wherein the production means issues and archives a tag indicating position or time of acquisition executed by the acquisition means and being co-packed in the video or audio data; and
retrieving means for retrieving the metadata according to the tag,
wherein the metadata is retrieved to automatically generate characters consistent with the metadata.

8. A production system for creating a project from an essence, comprising:
acquisition means for acquiring video and audio data used to create the essence;
production means for creating said essence and for generating metadata for accounting for said essence;
post-production means for creating said project from said essence;
wherein an operation of said post-production is controlled based on metadata generated at the time of said production, wherein the production means issues and archives a tag indicating position or time of acquisition executed by the acquisition means and being co-packed in the video or audio data; and
retrieving means for retrieving the metadata according to the tag,
wherein the metadata is retrieved to automatically generate characters consistent with the metadata.

9. A production method, executed by a processor, for creating a project from an essence, comprising the steps of:
acquiring video and audio data used to create the essence;
creating said essence and generating metadata used for accounting for said essence;
creating said project from said essence using said metadata,
wherein the essence and metadata generating step issues and archives a tag indicating position or time of acquisition executed by the acquiring step and being co-packed in the video or audio data; and
retrieving the metadata according to the tag,
wherein the metadata is retrieved to automatically generate characters consistent with the metadata.

10. A production method, executed by a processor, for creating a project from an essence, comprising the steps of:
acquiring video and audio data used to create the essence;
creating said essence and generating metadata used for accounting for said essence;
controlling an operation of post-production based on said metadata to create said project from said essence,
wherein the essence and metadata generating step issues and archives a tag indicating position or time of acquisition executed by the acquiring step and being co-packed in the video or audio data; and
retrieving the metadata according to the tag,
wherein the metadata is retrieved to automatically generate characters consistent with the metadata.

11. A production system for creating a project from an essence, comprising:
acquisition means for acquiring video and audio data used to create the essence;
pre-production means for creating metadata used for accounting for said essence;
production means for performing an operation for creating said essence, using said metadata;
post-production means for creating said project from said essence,
wherein the pre-production means issues and archives a tag indicating position or time of acquisition executed by the acquisition means and being co-packed in the video or audio data; and
retrieving means for retrieving the metadata according to the tag,
wherein the metadata is retrieved to automatically generate characters consistent with the metadata.

12. A production system for creating a project from an essence, comprising:
acquisition means for acquiring video and audio data used to create the essence;
pre-production means for creating metadata used for accounting for said essence;
production means for creating said essence and for storing said essence and the metadata correlatively with each other on a recording medium;
post-production means for creating said project from said essence,
wherein an operation in said production is performed using the metadata generated at the time of said pre-production,
wherein the pre-production means issues and archives a tag indicating position or time of acquisition executed by the acquisition means and being co-packed in the video or audio data; and
retrieving means for retrieving the metadata according to the tag,
wherein the metadata is retrieved to automatically generate characters consistent with the metadata.

13. An archiving system for archiving an essence, comprising:
acquisition means for acquiring video and audio data used to create the essence;
production means for creating said essence and for generating metadata used for accounting said essence;
archiving means for archiving said essence and the metadata correlatively with each other;
controlling means for controlling said archiving means so that an operation for said essence will be performed using said metadata,
wherein the production means issues and archives a tag indicating position or time of acquisition executed by the acquisition means and being co-packed in the video or audio data; and
retrieving means for retrieving the metadata according to the tag,
wherein the metadata is retrieved to automatically generate characters consistent with the metadata.

14. An archiving system for archiving an essence, comprising:
acquisition means for acquiring video and audio data used to create the essence;
production means for creating said essence and for generating metadata used for accounting said essence;
archiving means for archiving said essence and the metadata correlatively with each other;
controlling means for controlling said archiving means so that asset management for said essence archived by said archiving means will be performed based on said metadata,
wherein the production means issues and archives a tag indicating position or time of acquisition executed by the acquisition means and being co-packed in the video or audio data; and
retrieving means for retrieving the metadata according to the tag,
wherein the metadata is retrieved to automatically generate characters consistent with the metadata.

15. A method, executed by a processor, for archiving an essence, comprising the steps of:
acquiring video and audio data used to create the essence;
creating said essence and generating metadata used for accounting said essence;
performing an operation for said essence using said metadata;
archiving and essence and the metadata correlatively with each other,
wherein the essence and metadata creating step issues and archives a tag indicating position or time of acquisition executed by the acquiring step and being co-packed in the video or audio data; and
retrieving the metadata according to the tag,
wherein the metadata is retrieved to automatically generate characters consistent with the metadata.

16. A method, executed by a processor, for archiving an essence, comprising the steps of:
acquiring video and audio data used to create the essence;
creating said essence and generating metadata used for accounting said essence;
performing control based on said metadata so that an asset management for said essence archived will be performed to archive said essence and the metadata correlatively with each other,
wherein the essence and metadata creating step issues and archives a tag indicating position or time of acquisition executed by the acquiring step and being co-packed in the video or audio data; and
retrieving the metadata according to the tag,
wherein the metadata is retrieved to automatically generate characters consistent with the metadata.

17. A distribution system for allotting an essence, comprising:
acquisition means for acquiring video and audio data used to create the essence;
production means for creating said essence and for generating metadata pertinent to said essence;
prost-production means for performing post-production processing on said essence;
distribution means for allotting said essence using metadata generated at the time of said production,
wherein the production means issues and archives a tag indicating position or time of acquisition executed by the acquisition means and being co-packed in the video or audio data; and
retrieving means for retrieving the metadata according to the tag,
wherein the metadata is retrieved to automatically generate characters consistent with the metadata.

18. A distribution system for allotting an essence, comprising:
acquisition means for acquiring video and audio data used to create the essence;
production means for creating said essence and for generating metadata pertinent to said essence;
post-production means for performing post-production processing on said essence;
distribution means for allotting said essence,
wherein an operation of said distribution means is controlled using the metadata used at the time of said production, and
wherein the production means issues and archives a tag indicating position or time of acquisition executed by the acquisition means and being co-packed in the video or audio data; and
retrieving means for retrieving the metadata according to the tag,
wherein the metadata is retrieved to automatically generate characters consistent with the metadata.

19. A distribution method, executed by a processor, for allotting an essence, comprising the steps of:
acquiring video and audio data used to create the essence;
creating said essence and generating metadata pertinent to said essence;
performing post-production processing on said essence;
allotting said essence using metadata generated at the time of said production,
wherein the essence and metadata creating step issues and archives a tag indicating position or time of acquisition executed by the acquiring step and being co-packed in the video or audio data; and
retrieving the metadata according to the tag,
wherein the metadata is retrieved to automatically generate characters consistent with the metadata.

20. A distribution method, executed by a processor, for allotting an essence, comprising the steps of:
acquiring video and audio data used to create the essence;
creating said essence and generating metadata pertinent to said essence;
performing post-production processing on said essence;
controlling an operation of distribution, using said data, to allot said essence,
wherein the essence and metadata creating step issues and archives a tag indicating position or time of acquisition executed by the acquiring step and being co-packed in the video or audio data; and
retrieving the metadata according to the tag,
wherein the metadata is retrieved to automatically generate characters consistent with the metadata.

21. An authoring system for creating a package medium from an essence, comprising:
acquisition means for acquiring video and audio data used to create the essence;
production means for creating said essence and for generating metadata pertinent to said essence;
post-production means for performing post-production on said essence;
authoring means for creating said package medium from an essence processed with post-production, using metadata generated at the time of said production,
wherein the production means issues and archives a tag indicating position or time of acquisition executed by the acquisition means and being co-packed in the video or audio data; and
retrieving means for retrieving the metadata according to the tag,
wherein the metadata is retrieved to automatically generate characters consistent with the metadata.

22. The authoring system according to claim 21
wherein said authoring means performs authoring processing for an editing video program from metadata indicating the logical structure of a video program.

23. An authoring method, executed by a processor, for creating a package medium from an essence, comprising the steps of:
acquiring video and audio data used to create the essence;
creating said essence and generating metadata pertinent to said essence;
performing post-production on said essence;
creating said package medium from an essence processed with post-production using metadata, and
wherein the essence and metadata creating step issues and archives a tag indicating position or time of acquisition executed by the acquiring step and being co-packed in the video or audio data; and
retrieving the metadata according to the tag,
wherein the metadata is retrieved to automatically generate characters consistent with the metadata.

24. An authoring method, executed by a processor, for creating a package medium from an essence, comprising the steps of:
acquiring video and audio data used to generate the essence;
generating metadata pertinent to said essence;
creating said essence; performing post-production on said essence;
creating said package medium from an essence processed with post-production using said metadata, wherein the metadata generating step issues and archives a tag indicating position or time of acquisition executed by the acquiring step and being co-packed in the video or audio data; and retrieving the metadata according to the tag, wherein the metadata is retrieved to automatically generate characters consistent with the metadata.

25. An asset management system for managing an essence, comprising:

acquisition means for acquiring video and audio data used to generate the essence;

pre-production means for generating metadata indicating the rights of said essence;

production means for creating said essence;

asset management means for performing asset management processing on said essence;

controlling means for controlling said asset management means so that a circulation operation of said essence will be performed based on said metadata, wherein the pre-production means issues and archives a tag indicating position or time of acquisition executed by the acquisition means and being co-packed in the video or audio data; and retrieving means for retrieving the metadata according to the tag, wherein the metadata is retrieved to automatically generate characters consistent with the metadata.

26. An asset management system for managing an essence, comprising:

acquisition means for acquiring video and audio data used to create the essence;

creating means for creating said essence and for generating metadata specifying rights pertinent to said essence;

asset management means for performing asset management processing on said essence;

controlling means for controlling said asset management means, based on said metadata, so that a circulating operation of said essence will be performed based on said metadata, wherein the creating means issues and archives a tag indicating position or time of acquisition executed by the acquisition means and being co-packed in the video or audio data; and retrieving means for retrieving the metadata according to the tag, wherein the metadata is retrieved to automatically generate characters consistent with the metadata.

27. An asset management method, executed by a processor, for managing an essence, comprising the steps of:

acquiring video and audio data used to generate the essence;

generating metadata indicating the rights of said essence;

creating said essence;

performing control based on said metadata so that a circulating operation of said essence will be performed to affect asset management processing on said essence, wherein the metadata generating step issues and archives a tag indicating position or time of acquisition executed by the acquiring step and being co-packed in the video or audio data; and retrieving the metadata according to the tag, wherein the metadata is retrieved to automatically generate characters consistent with the metadata.

28. An asset management method, executed by a processor, for managing an essence, comprising the steps of:

acquiring video and audio data used to create the essence;

creating said essence;

generating metadata specifying rights pertinent to said essence;

performing control based on said metadata so that a circulation operation of said essence will be performed to affect asset management processing for said essence, wherein the metadata generating step issues and archives a tag indicating position or time of acquisition executed by the acquiring step and being co-packed in the video or audio data; and retrieving the metadata according to the tag, wherein the metadata is retrieved to automatically generate characters consistent with the metadata.

29. A production system for creating a program from an essence, comprising:

acquisition means for acquiring video and audio data used to create the essence;

production means for creating said essence and for generating UMID (unique material identifier) for discriminating said essence;

post production means for editing said essence for generating said program;

controlling means for controlling an operation in said post-production based on said UMID, wherein the metadata generating step issues and archives a tag indicating position or time of acquisition executed by the acquisition means and being co-packed in the video or audio data; and retrieving means for retrieving the UMID according to the tag, wherein the UMID is retrieved to automatically generate characters consistent with the metadata.

30. A production method, executed by a processor, for creating a program from an essence, comprising the steps of:

acquiring video and audio data used to create the essence;

creating said essence;

generating UMID (unique material identifier) for discriminating said essence;

controlling an operation in said post-production based on said UMID to edit said essence to generate said program, wherein the UMID generating step issues and archives a tag indicating position or time of acquisition executed by the acquiring step and being co-packed in the video or audio data; and retrieving the created UMID according to the tag, wherein the created UMID is retrieved to automatically generate characters consistent with the metadata.

31. A production system for creating an essence, comprising:

acquisition means for acquiring video and audio data used to generate the essence;

generating means for generating a plurality of metadata which are data pertinent to said essence and which are respectively identified by SMPTE (Society of Motion Picture and Television Engineers) labels;

receiving means for receiving said essence and said plural metadata and analyzing said SMPTE labels to extract pre-set metadata from said plural metadata;

controlling means for controlling the processing relevant to said essence based on the extracted metadata, wherein the generating means issues and archives a tag indicating position or time of acquisition executed by the acquisition means and being co-packed in the video or audio data; and retrieving means for retrieving the plurality of metadata according to the tag, wherein the plurality of metadata is retrieved to automatically generate characters consistent with the metadata.

32. A control method, executed by a processor, of a production system for creating an essence, comprising the steps of:
- acquisition means for acquiring video and audio data used to generate the essence;
- generating a plurality of metadata which are data pertinent to said essence and which are respectively identified by SMPTE (Society of Motion Picture and Television Engineers) labels;
- receiving said essence and said plural metadata and analyzing said SMPTE labels to extract pre-set metadata from said plural metadata;
- controlling the processing relevant to said essence based on the extracted metadata,
   - wherein the generating step issues and archives a tag indicating position or time of acquisition executed by the acquisition means and being co-packed in the video or audio data; and
- retrieving the plurality of metadata according to the tag,
- wherein the plurality of metadata is retrieved to automatically generate characters consistent with the metadata.

* * * * *